United States Patent [19]

Kinjo

[11] Patent Number: 5,629,752
[45] Date of Patent: May 13, 1997

[54] METHOD OF DETERMINING AN EXPOSURE AMOUNT USING OPTICAL RECOGNITION OF FACIAL FEATURES

[75] Inventor: Naoto Kinjo, Kanagawa, Japan

[73] Assignee: Fuji Photo Film Co., Ltd., Kanagawa, Japan

[21] Appl. No.: 549,181

[22] Filed: Oct. 27, 1995

[30] Foreign Application Priority Data

| Oct. 28, 1994 | [JP] | Japan | 6-265850 |
| Oct. 31, 1994 | [JP] | Japan | 6-266598 |
| Oct. 5, 1995 | [JP] | Japan | 7-258977 |

[51] Int. Cl.$^6$ ............ G03B 27/32; G03B 27/73; G03B 27/80
[52] U.S. Cl. ............ 355/35; 355/40; 355/77; 382/118; 382/274
[58] Field of Search ............ 355/18, 32, 35, 355/38, 67, 68, 69, 70, 71, 77, 40; 382/118, 274, 174, 162, 190, 254

[56] References Cited

U.S. PATENT DOCUMENTS

| 3,652,991 | 3/1972 | Dietrich | 340/146.3 |
| 4,055,833 | 10/1977 | Rothfjell | 340/146.3 |
| 4,754,487 | 6/1988 | Newmuis | 382/2 |
| 5,012,522 | 4/1991 | Lambert | 382/2 |
| 5,029,312 | 7/1991 | Goennes | 355/38 |
| 5,278,921 | 1/1994 | Nakamura et al. | 382/18 |
| 5,337,164 | 8/1994 | Yabe et al. | 358/487 |
| 5,410,609 | 4/1995 | Kado et al. | 382/2 |
| 5,563,960 | 10/1996 | Shapiro | 382/239 |

FOREIGN PATENT DOCUMENTS

| 63-80242 | 4/1988 | Japan | G03B 27/32 |
| 4-346332 | 12/1992 | Japan | G03B 27/73 |

*Primary Examiner*—Arthur T. Grimley
*Assistant Examiner*—Herbert V. Kerner
*Attorney, Agent, or Firm*—Sughrue, Mion, Zinn, Macpeak & Seas

[57] ABSTRACT

In a method of determining an exposure amount, image data is fetched, and an image is divided into a plurality of regions by binarization or another technique, a shape pattern representing a contour of the head of a human figure is detected, and a face candidate region is set in accordance with the detected pattern. Next, a shape pattern representing a contour of the face of the human figure, a shape pattern representing an internal structure of the face of the human figure, and a shape pattern representing a contour of the body of the human figure are detected respectively. The consistency of a face candidate region is determined consecutively by the detected patterns, and a region having the highest probability of being a region corresponding to the face of the human figure is determined. The above processing is carried out a plurality of times while a threshold for binarization and parameters for controlling the relative fineness of the division of the image are varied. The data on the finally determined facial region is outputted as a result of determination.

31 Claims, 29 Drawing Sheets

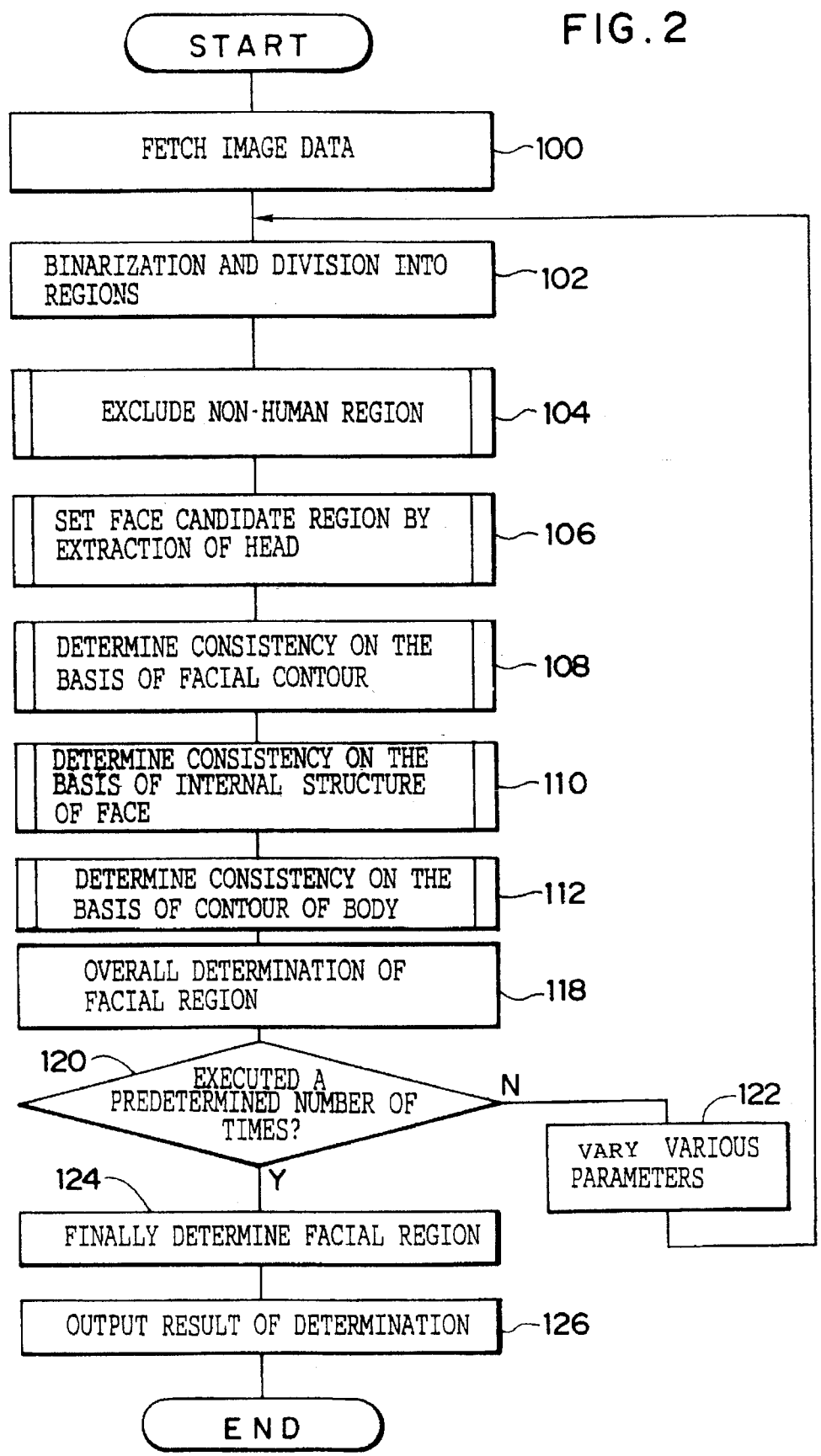

ORIGINAL IMAGE

TRACING OF CONTOUR OF BLACK REGION EXTRACTED BY BINARIZATION

CALCULATION OF CURVATURE OF CONTOUR

EXTRACTION OF CONCAVE PORTION AND CONVEX PORTION

CALCULATION OF CHARACTERISTIC QUANTITIES OF CONCAVE PORTION AND CONVEX PORTION

DETERMINATION OF HEAD

SETTING OF FACE CANDIDATE REGION

SETTING OF RANGE OF SEARCH

EXTRACTION OF CONCAVE PORTION AND CONVEX PORTION IN RANGES OF SEARCH

EXTRACTION OF PAIR SERVING AS CANDIDATE FOR FACIAL CONTOUR

DETERMINATION OF SIMILARITY OF AXIAL SYMMETRY

DETERMINATION OF SIMILARITY OF AXIAL SYMMETRY

SEARCH OF BOUNDARY WITH THE HEAD

EXTRACTION OF BLACK REGIONS
SERVING AS CANDIDATES FOR EYES

DETERMINATION OF SIMILARITY
OF AXIAL SYMMETRY OF PAIR OF
BLACK REGIONS

SETTING OF RANGE OF SEARCH

RANGES FOR SEARCHING BODILY CONTOUR

EXTRACTION OF CONCAVE PORTIONS AND CONVEX PORTIONS IN RANGES OF SEARCH

DETERMINATION OF SIMILARITY OF AXIAL SYMMETRY

| 1 | 1 | 1 |
|---|---|---|
| 0 | 0 | 0 |
| -1 | -1 | -1 |

0° DIRECTION

| -1 | 0 | 1 |
|---|---|---|
| -1 | 0 | 1 |
| -1 | 0 | 1 |

90° DIRECTION

| 0 | 1 | 1 |
|---|---|---|
| -1 | 0 | 1 |
| -1 | -1 | 0 |

-45° DIRECTION

| -1 | -1 | 0 |
|---|---|---|
| -1 | 0 | 1 |
| 0 | 1 | 1 |

45° DIRECTION

ORIGINAL IMAGE

EXTRACTION AND DIVISION OF CONCAVE PORTIONS AND CONVEX PORTIONS

EXTRACTION OF PAIR SERVING AS CANDIDATE FOR FACIAL CONTOUR

SETTING OF FACE CANDIDATE REGION

EXTRACTION OF BLACK REGIONS SERVING AS CANDIDATES FOR EYES

SETTING OF FACE CANDIDATE REGION

LINES EXTRACTED BY PREPROCESSING

SETTING OF FACE CANDIDATE REGION

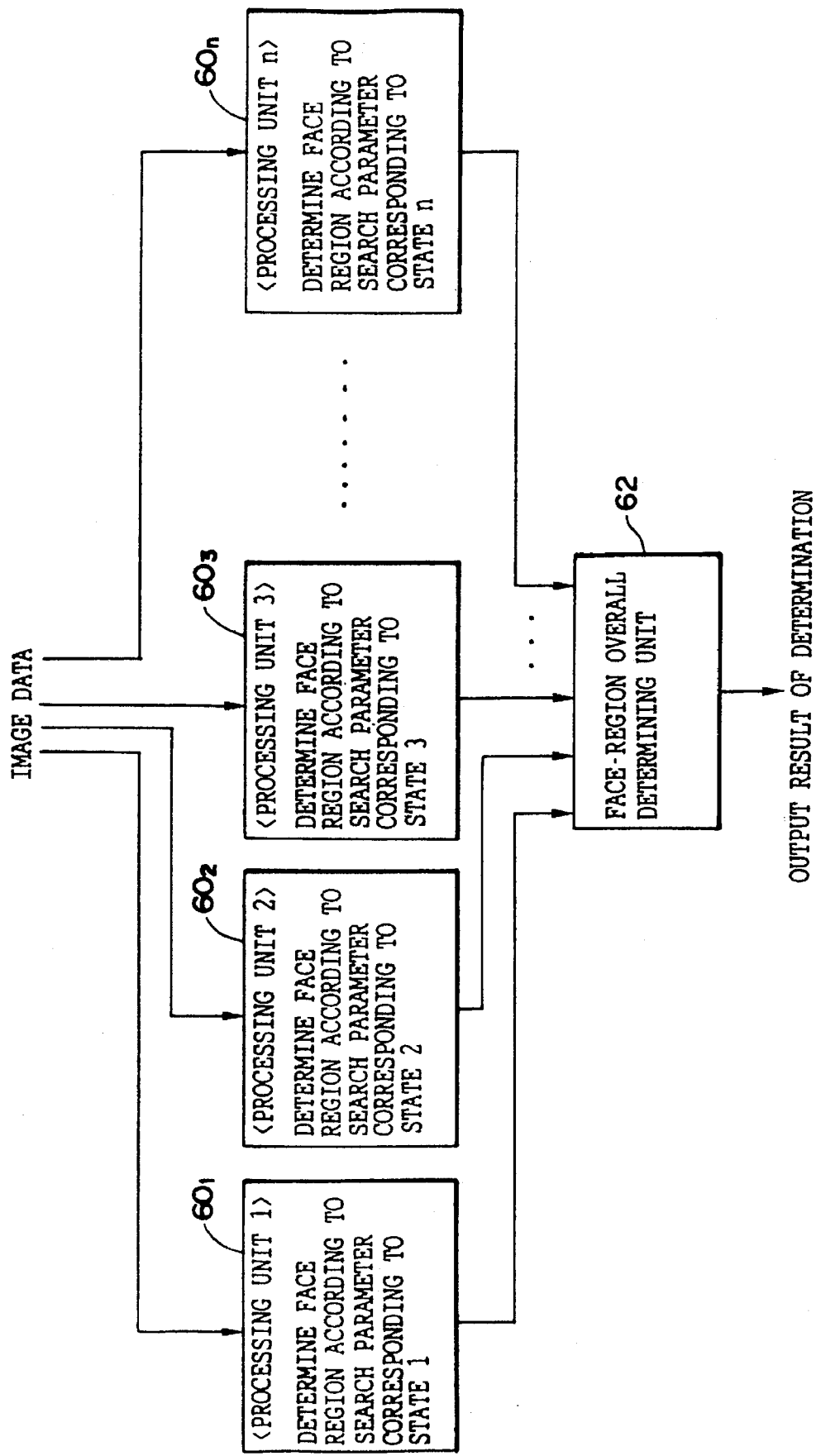

METHOD OF DETERMINING AN EXPOSURE AMOUNT USING OPTICAL RECOGNITION OF FACIAL FEATURES

BACKGROUND OF THE INVENTION

1. Field of the Invention

The present invention relates to a method of determining an exposure amount and a method of extracting a figure, and more particularly to a method of determining an exposure amount by deciding a region corresponding to the face of a human figure which is present in an original image and determining an exposure amount such that the decided region is printed in an appropriate color, and to a method of extracting a figure so as to extract from an image a region in which a figure to be extracted is present.

2. Description of the Related Art

The portion which attracts the most attention of viewers when appreciating a portrait photograph is the face of the human figure. Therefore, when an original image of a human figure recorded on a film or the like is printed onto a photographic printing paper or the like, it is necessary to determine an exposure amount such that the color of the face of the human figure is printed in an appropriate color.

For this reason, in Japanese Patent Application Laid-Open No. 80242/1988 the present applicant has proposed the following method of determining an exposure amount: On the basis of the experiential rule that a portrait photograph has a high probability of a human figure being located in a substantially central portion of the image, the film image is divided into a plurality of regions which are predetermined in a fixed manner, and each region is weighted so that the weight of the region located in a substantially central portion of the image becomes heavy. A weighted mean value of the densities of three colors in each region is calculated, and an exposure amount is determined on the basis of the weighted mean value. With this method, there has been a problem in that although if the human figure is actually located in the vicinity of the substantially central portion of the image, it is possible to obtain an exposure amount for printing the human figure in an appropriate color, if the human figure is located at a position far removed from the central portion of the image, it is impossible to obtain an appropriate exposure amount.

In addition, the present applicant has proposed the following technique (refer to Japanese Patent Laid-Open No. 346332/1992): A color original image is divided into a multiplicity of pixels, and each pixel is separated into three colors and is photometrically measured. A histogram concerning hue values (and saturation values) is prepared on the basis of the data obtained by photometry, and the histogram thus prepared is divided into the respective rectangles. A determination is made as to which of the divided rectangles the pixels belong, so as to classify the pixels into groups corresponding to the divided rectangles. The color original image is divided into a plurality of regions for each group (so-called clustering), a region corresponding to the face of a human figure among the plurality of regions is estimated, and an exposure amount is determined on the basis of the photometric data of the estimated region.

Further, Japanese Patent Laid-Open No. 160993/1994 discloses techniques in which, in order to improve the accuracy of extracting a region corresponding to the face of a human figure, a region contiguous to outer edges of the image is determined as being a background region, and is excluded, and an extracted region is formed as line graphics, and a determination is made as to whether or not the extracted region is a region corresponding to the face of a human figure, on the basis of the shape of a neighboring region located in the vicinity of the extracted region as well as the shape of the extracted region.

With the above-described techniques, however, if a skin-colored region, such as the ground and the trunk of a tree, is present in the original image, and the hue and saturation of the skin-colored region are similar to the hue and saturation of the region corresponding to the face of the human figure in the original image, there is a possibility of such a skin-colored region being erroneously determined as being a region corresponding to the face of a human figure. In addition, if this skin-colored region is contiguous to a region corresponding to the face of a human figure, the skin-colored region cannot be separated from the region corresponding to the face of a human figure, thereby making it impossible to separate the original image into proper ranges of regions. With the above-described prior art, there has been a problem in that since processing is carried out on the premise that one of the divided regions is a region corresponding to the face of a human figure, if the original image cannot be divided into proper ranges of regions, the region corresponding to the face of a human figure is erroneously determined, thereby making it impossible to obtain an exposure amount for printing the face of the human figure appropriately.

Further, the above-described problem of the erroneous determination of the region to be extracted in the event that the original image cannot be divided into proper ranges of regions applies not only to the extraction of the region corresponding to the face of a human figure, but also to the case in which a region where a particular figure is present is extracted from the image. In other words, there has been a problem in that even if the color and the like of a particular figure to be extracted are known in advance, the region where the particular figure is present cannot be extracted properly in cases where a region whose hue and saturation are similar to those of the particular figure is present in the image, or such a region is contiguous to a region corresponding to the particular figure.

SUMMARY OF THE INVENTION

In view of the above-described circumstances, it is an object of the present invention to provide a method of determining an exposure amount which makes it possible to extract only a region corresponding to the face of a human figure in an original image without being affected by the colors of the region corresponding to the face of the human figure in the original image and its neighboring region, thereby to determine an exposure amount for printing that region appropriately.

Another object of the present invention is to provide a method of extracting a figure which makes it possible to appropriately extract a figure subject to extraction which is present in an image without being affected by the colors of a region where the figure subject to extraction is present and its neighboring region.

To these ends, in accordance with a first aspect of the present invention, there is provided a method of determining an exposure amount, comprising the steps of: searching a first shape pattern which is present in an original image and is peculiar to a first portion of a human figure; setting a region estimated to correspond to a face of the human figure, in accordance with a size and a direction of the searched first shape pattern and a positional relationship between the face of the human figure and the first portion; determining a region having a high probability of being a region corresponding to the face of the human figure in the original image, by searching whether or not a second shape pattern peculiar to at least one second portion different from the first portion of the human figure is present in a range of search set in accordance with the set size and direction of the first shape pattern in the original image and a positional relationship between the face of the human figure and the second portion; and determining an exposure amount for printing the original image onto a printing material on the basis of at least one of a color and a density of the determined region.

In accordance with a second aspect of the present invention, in the first aspect of the invention, the first shape pattern and the second shape pattern include at least one of a shape pattern representing a contour of the head of the human figure, a shape pattern representing a contour of the face of the human figure, a shape pattern representing an internal structure of the face of the human figure, and a shape pattern representing a contour of the body of the human figure.

In accordance with a third aspect of the present invention, in the first aspect of the invention, the search of the first shape pattern and the second shape pattern is effected by dividing the original image into a plurality of regions each consisting of a plurality of pixels whose densities or colors are identical or similar, and by using contours of the plurality of regions.

In accordance with a fourth aspect of the present invention, in the first aspect of the invention, the search of the first shape pattern and the second shape pattern is effected by detecting an edge which is present in the original image, by determining a center line of the detected edge, and by using the determined center line.

In accordance with a fifth aspect of the present invention, in the first aspect of the invention, prior to the search of the first shape pattern, a region having a low probability of corresponding to the human figure in the original image is excluded from a subject of search of the first shape pattern.

In the first aspect, a first shape pattern which is present in an original image and is peculiar to a first portion of a human figure is searched, and a region estimated to correspond to a face of the human figure is set in accordance with a size and a direction of the searched first shape pattern and a positional relationship between the face of the human figure and the first portion. It should be noted that the first shape pattern may be either plural or singular, and, as described in the second aspect, it is possible to use at least one of a shape pattern representing a contour of the head of the human figure, a shape pattern representing a contour of the face of the human figure, a shape pattern representing an internal structure of the face of the human figure, and a shape pattern representing a contour of the body of the human figure. In particular, if consideration is given to the fact that there is a possibility that some shape patterns of the various portions of the human figure may not be detected depending on the original image, a plurality of shape patterns may be set as the first shape patterns, and each of them may be searched.

For instance, a region corresponding to the head (hair) of a human figure in an original image generally includes in its contour a convex portion of a predetermined curvature corresponding to the top of the head of the human figure and a concave portion of a predetermined curvature corresponding to a boundary between the head and the face of the human figure below the convex portion. For this reason, with respect to the head of the human figure, as a peculiar shape pattern representing the contour of the head, it is possible to use, for instance, a convex portion having a degree of a circular curve falling within a predetermined range and a concave portion having a degree of a circular curve falling within a predetermined range. The above shape pattern is set as a first shape pattern, and if the shape pattern is detected in the original image, a region estimated to correspond to the face of the human figure can be extracted, for example, as follows.

That is, the face of a person is located at a position adjacent to the lower side (the concave portion side of the aforementioned shape pattern) of the head, and its size is substantially proportional to the size of the head, and its direction coincides with the direction of the head. In addition, the contour of the face of a person is generally elliptical. Accordingly, if the aforementioned shape pattern is detected in the original image, an elliptical region can be set with a size and a direction corresponding to the size and direction of the detected shape pattern and at a position corresponding to the positional relationship between the face and the head of the person (at a position adjacent to the concave portion side of the detected shape pattern), and that region can be set as a region estimated to correspond to the face of a human figure.

Thus, in the extraction processing according to the first aspect of the present invention, a region estimated to correspond to the face of a human figure is set in correspondence with the size and direction of the first shape pattern peculiar to the first portion of the human figure detected from the original image as well as the positional relationship between the face of the human figure and the first portion. Therefore, it is possible to appropriately set a region estimated to correspond to the face of a human figure without being affected by the colors and the like of the region corresponding to the face of the human figure and its neighboring region. In addition, even if a skin-colored region having a contour similar to that of a facial region is included in the original image although it may not be a region corresponding to the face of the human figure, such a region can be prevented from being determined erroneously that it is a region corresponding to the face of the human figure.

In addition, if the region set by using the first shape pattern as described above coincides with a region corresponding to the face of the human figure, there is a high possibility that a shape pattern peculiar to another portion different from the first portion of the human figure is present in the vicinity of the set region. For this reason, in the first aspect of the present invention, after a region estimated to correspond to the face of the human figure, a search is carried out as to whether or not a second shape pattern peculiar to at least one second portion different from the first portion of the human figure is present within a range of search which is set in correspondence with the size and direction of the set region in the original image and the positional relationship between the face of the human figure and the second portion, thereby to determine a region having a high probability of being a region corresponding to the face of the human figure in the original image.

It should be noted that the second shape pattern may also be either plural or singular, and, as described in the second aspect, it is possible to use at least one of a shape pattern representing the contour of the head of the human figure, a shape pattern representing the contour of the face of the human figure, a shape pattern representing an internal structure of the face of the human figure, and a shape pattern representing the contour of the body of the human figure.

If a second shape pattern is detected within the range of search set in correspondence with the size and direction of the set region in the original image and the positional relationship between the face of the human figure and the second portion, it can be determined that there is a high probability that the set region is a region corresponding to the face of a human figure. Thus, since, with respect to a region which is estimated to correspond to the face of a human figure set by using the first shape pattern, the presence of the second shape pattern is searched in the range of search corresponding to that region, even if the first shape pattern is detected by chance in the non-human area in the original image, the region determined on the basis of the shape pattern detected by chance can be prevented from being determined erroneously as being a region corresponding to the face of a human figure. In addition, in a case where a plurality of regions estimated to correspond to the face of a human figure are set by the first shape pattern, the use of the second shape pattern makes it possible to determine a region having the highest probability of corresponding to the face of a human figure.

In the present invention, since the exposure amount is determined on the basis of data which represents at least one of the color or density of a region which is thus determined, it is possible to determine an exposure amount such that the region corresponding to the face of a human figure can be printed appropriately. In addition, with respect to the second shape pattern, since a search is carried out in correspondence with the size and direction of the region which is set as a region estimated to correspond to the face of a human figure and within a range of search set in correspondence with the positional relationship between the face of the human figure and the second portion, it is possible to reduce the processing time as compared with the case where a search is carried out with respect to each shape pattern by using the overall image as a subject of search. Hence, it is possible to extract at high speed a region having a high probability of being a region corresponding to the face of a human figure.

Incidentally, as described in the third aspect, the search of a shape pattern can be effected by dividing the original image into a plurality of regions each consisting of a plurality of pixels whose densities or colors are identical or similar, and by using contours of the plurality of regions. If the image is divided into a plurality of regions as described above, it is possible to obtain a plurality of regions having a high probability that shape patterns peculiar to various portions of a human figure, such as a boundary between the human figure and the background, are included. Accordingly, shape patterns peculiar to the various portions of a human figure can be detected efficiently from the contours of the plurality of regions.

As disclosed in Japanese Patent Laid-Open No. 346332/ 1992, the division of an original image can be effected as follows: A unidimensional histogram concerning hue values or a two-dimensional histogram concerning hue values and saturation values are determined on the basis of photometric data on three colors for each pixel in the original image. The histogram thus prepared is divided into the respective rectangles, and a determination is made as to which of the divided rectangles the pixels belong, so as to classify the pixels into groups corresponding to the divided rectangles. The original image is thus divided into a plurality of regions for each group. In addition, among the pixels constituting the original image, those pixels which have a large difference in the density or color difference with neighboring pixels may be set as a boundary of a region so as to divide the original image into a plurality of regions. Further, the original image may be divided into a plurality of regions by performing binarization, or the division may be effected by carrying out the binarization a plurality of times by using a plurality of thresholds having different values, or the original image may be divided into a plurality of regions by a combination of the above methods.

In the present invention, the regions divided as described above are used for detecting various shape patterns, and the setting of a region estimated to correspond to the face of a human figure is effected in correspondence with the size, direction, and the like of the first shape pattern detected from the original image, as described earlier. Accordingly, even if some of the plurality of shape patterns could not be detected from the contours of the plurality of regions, it is possible to set a region estimated to correspond to the face of a human figure. Additionally, it is unnecessary for one of the plurality of divided regions to coincide with a region corresponding to the face of a human figure as in the conventional manner.

In addition, as described in the fourth aspect, the search of the shape pattern may be effected by detecting an edge which is present in the original image, by determining a center line of the detected edge, and by using the determined center line. Incidentally, the detection of the edge can be effected by performing differentiation or the like concerning the density or color with respect to the respective pixels, and the center line of the edge can be determined by processing such as a known thinning technique or ridge detection. With respect to edges which are present in the image, there is a high probability that shape patterns peculiar to various portions of the human figure are included, so that shape patterns peculiar to the various portions of the human figure can be detected efficiently in the same way as in the third aspect.

Some images are provided with regions with a feature which can be determined to have a low probability of being a region corresponding to a human figure. For instance, a region whose ratio of a linear portion occupied in a contour is greater than or equal to a predetermined value has a high probability of being a region representing an artificial object. In addition, although a human body is substantially axially symmetrical about an imaginary line dividing the human body into left- and right-hand halves, but a region whose symmetry is less than or equal to a predetermined value has a low probability of being a region corresponding to a human figure. Also, a region in which the number of concave and convex portions is greater or equal to a predetermined value can be determined to have a low probability of being a region corresponding to a human figure. Further, since a human figure has a high probability of being positioned in a substantially central portion of the image, a region whose ratio of contact with an outer edge of the image is greater than or equal to a predetermined value can also be determined to be located in a peripheral portion of the image, so that the probability of such a region corresponding to a human figure is low.

In addition, in a case where the contrast of the density within a region is less than or equal to a predetermined value, there is a high possibility that such a region represents an object having a flat or a substantially smooth surface, and the probability of such a region being a region corresponding to the face, in particular, of a human figure is low. Further, in the case of a region whose density changes with a predetermined pattern or whose density shows a repetition of a predetermined pattern of change, such a region can be determined to have a low probability of being a region corresponding to a human figure. Thus, a region having a high probability of not corresponding to any portion of a human figure is set as a region of having a low probability of corresponding to the face of a human figure. As also described in the fifth aspect of the present invention, if, prior to the search of the first shape pattern, a region having a low probability of corresponding to the human figure in the original image is excluded from a subject of search of the first shape pattern, the time required for the search processing of the first shape pattern can be reduced, thereby making it possible to effect the processing at an even higher speed.

In accordance with a sixth aspect of the present invention, there is provided a method of determining an exposure amount, comprising the steps of: searching a plurality of kinds of shape patterns which are present in an original image and are peculiar to particular portions of a human figure; setting a plurality of regions estimated to correspond to a face of the human figure, in accordance with a size and a direction of each of the searched shape patterns and a positional relationship between the face of the human figure and each of the particular portions; weighting the set regions by using as subjects of search the plurality of shape patterns peculiar to the particular portions of the human figure; determining a region having a highest probability of being a region corresponding to the face of the human figure in the original image, on the basis of ranges of the plurality of regions set as regions to be estimated to correspond to the face of the human figure and weighting factors imparted to the respective regions; and determining an exposure amount for printing the original image onto a printing material on the basis of at least one of a color and a density of the determined region.

In accordance with a seventh aspect of the present invention, in the sixth aspect, the shape patterns peculiar to the particular portions of the human figure include a shape pattern representing a contour of the head of the human figure, a shape pattern representing a contour of the face of the human figure, a shape pattern representing an internal structure of the face of the human figure, and a shape pattern representing a contour of the body of the human figure.

In accordance with an eighth aspect of the present invention, in the sixth aspect, the search of each of the shape patterns is effected by dividing the original image into a plurality of regions each consisting of a plurality of pixels whose densities or colors are identical or similar, and by using contours of the plurality of regions.

In accordance with a ninth aspect of the present invention, in the sixth aspect, the search of each of the shape patterns is effected by detecting an edge which is present in the original image, by determining a center line of the detected edge, and by using the determined center line.

In accordance with a 10th aspect of the present invention, in the sixth aspect, a weighting factor with a positive sign is imparted to the set region estimated to correspond to the face of the human figure, a region having a low probability of corresponding to the face of the human figure in the original image is determined, and a weighting factor with a negative sign is imparted to the determined region.

In the sixth aspect of the present invention, a plurality of kinds of shape patterns which are present in an original image and are peculiar to particular portions of a human figure are searched, and a plurality of regions estimated to correspond to a face of the human figure are set in accordance with the size and direction of each of the searched shape patterns and a positional relationship with the detected shape pattern. Incidentally as also described in the seventh aspect, as the shape patterns peculiar to the particular portions of the human figure, it is possible to use a shape pattern representing the contour of the head of the human figure, a shape pattern representing the contour of the face of the human figure, a shape pattern representing an internal structure of the face of the human figure, and a shape pattern representing the contour of the body of the human figure.

For instance, a region corresponding to the head (hair) of a human figure in an original image generally includes in its contour a convex portion of a predetermined curvature corresponding to the top of the head of the human figure and a concave portion of a predetermined curvature corresponding to a boundary between the head and the face of the human figure below the convex portion. For this reason, with respect to the head of the human figure, as a peculiar shape pattern representing the contour of the head, it is possible to use, for instance, a convex portion having a degree of a circular curve falling within a predetermined range and a concave portion having a degree of a circular curve falling within a predetermined range. If the above shape pattern is detected in the original image, a region estimated to correspond to the face of the human figure can be set, for example, as follows.

That is, the face of a person is located at a position adjacent to the lower side (the concave portion side of the aforementioned shape pattern) of the head, and its size is substantially proportional to the size of the head, and its direction coincides with the direction of the head. In addition, the contour of the face of a person is generally elliptical. Accordingly, if the aforementioned shape pattern representing the contour of the head is detected in the original image, an elliptical region can be set with a size and a direction corresponding to the size and direction of the detected shape pattern and at a position corresponding to the positional relationship between the face and the head of the person, and that region can be set as a region estimated to correspond to the face of a human figure.

Thus, in the above-described sixth aspect of the present invention, a region estimated to correspond to the face of a human figure is set in correspondence with the size and direction of the first shape pattern peculiar to each of various portions of the human figure detected from the original image as well as the positional relationship with the detected shape pattern. Therefore, it is possible to appropriately set a region estimated to correspond to the face of a human figure without being affected by the colors and the like of the region corresponding to the face of the human figure and its neighboring region. In addition, even if a skin-colored region having a contour similar to that of a facial region is included in the original image although it may not be a region corresponding to the face of the human figure, such a region can be prevented from being determined erroneously that it is a region corresponding to the face of the human figure.

Further, in the sixth aspect of the present invention, a weighting factor is imparted to a region estimated to correspond to the face of a human figure set on the basis of each shape pattern detected by using as a subject of search each of the plurality of kinds of shape patterns peculiar to various portions of a human figure. Then, a region having a highest probability of being a region corresponding to the face of the human figure in the original image is determined on the basis of ranges of the plurality of regions set as regions to be estimated to correspond to the face of the human figure. Thus, as the processing is carried out a plurality of times by using as subjects of search the plurality of shape patterns peculiar to the various portions of the human figure, even if a predetermined shape pattern is detected by chance in the non-human area in the original image, the region determined on the basis of the shape pattern detected by chance can be prevented from being determined erroneously as being a region corresponding to the face of a human figure. Since an exposure amount for printing the original image onto a printing material is determined on the basis of at least one of a color and a density of the region thus determined, the exposure amount can be determined such that a region corresponding to the face of a human figure can be printed appropriately.

As described in the eighth aspect of the present invention, the search of each of the shape patterns can be effected by dividing the original image into a plurality of regions each consisting of a plurality of pixels whose densities or colors are identical or similar, and by using contours of the plurality of regions. If the image is divided into a plurality of regions as described above, it is possible to obtain a plurality of regions having a high probability that shape patterns peculiar to various portions of a human figure, such as a boundary between the human figure and the background, are included in contours. Hence, it is possible to efficiently detect shape patterns peculiar to the various portions of the human figure from the contours of the plurality of regions.

As disclosed in Japanese Patent Laid-Open No. 346332/1992, the division of an original image can be effected as follows: A unidimensional histogram concerning hue values or a two-dimensional histogram concerning hue values and saturation values are determined on the basis of photometric data on three colors for each pixel in the original image. The histogram thus prepared is divided into the respective rectangles, and a determination is made as to which of the divided rectangles the pixels belong, so as to classify the pixels into groups corresponding to the divided rectangles. The original image is thus divided into a plurality of regions for each group. In addition, among the pixels constituting the original image, those pixels which have a large difference in the density or color difference with neighboring pixels may be set as a boundary of a region so as to divide the original image into a plurality of regions. Further, the original image may be divided into a plurality of regions by performing binarization, or the division may be effected by carrying out the binarization a plurality of times by using a plurality of thresholds having different values, or the original image may be divided into a plurality of regions by a combination of the above methods.

In the present invention, the regions divided as described above are used for detecting a plurality of shape patterns peculiar to various portions of a human figure, and the setting of a region estimated to correspond to the face of a human figure is effected in correspondence with the size and direction of the shape pattern detected from the original image as well as the positional relationship with the detected shape pattern, as described earlier. Accordingly, even if some of the plurality of shape patterns could not be detected from the contours of the plurality of regions, it is possible to set a region estimated to correspond to the face of a human figure. Additionally, it is unnecessary for one of the plurality of divided regions to coincide with a region corresponding to the face of a human figure as in the conventional case.

In addition, as described in the ninth aspect, the search of the shape pattern may be effected by detecting in advance an edge which is present in the original image, by determining a center line of the detected edge, and by using the determined center line. Incidentally, the detection of the edge can be effected by performing differentiation or the like concerning the density or color with respect to the respective pixels, and the center line of the edge can be determined by processing such as a known thinning technique or ridge detection. With respect to edges which are present in the image, there is a high probability that shape patterns peculiar to various portions of the human figure are included, so that shape patterns peculiar to the various portions of the human figure can be detected efficiently in the same way as in the eighth aspect.

Some images are provided with regions with a feature which can be determined to have a low probability of being a region corresponding to a human figure. For instance, a region whose ratio of a linear portion occupied in a contour is greater than or equal to a predetermined value has a high probability of being a region representing an artificial object. In addition, although a human body is substantially axially symmetrical about an imaginary line dividing the human body into left- and right-hand halves, but a region whose symmetry is less than or equal to a predetermined value has a low probability of being a region corresponding to a human figure. Also, a region in which the number of concave and convex portions is greater or equal to a predetermined value can be determined to have a low probability of being a region corresponding to a human figure. Further, since a human figure has a high probability of being positioned in a substantially central portion of the image, a region whose ratio of contact with an outer edge of the image is greater than or equal to a predetermined value can also be determined to be located in a peripheral portion of the image, so that the probability of such a region corresponding to a human figure is low.

In addition, in a case where the contrast of the density within a region is less than or equal to a predetermined value, there is a high possibility that such a region represents an object having a flat or a substantially smooth surface, and the probability of such a region being a region corresponding to the face of a human figure is low. Further, in the case of a region whose density changes with a predetermined pattern or whose density shows a repetition of a predetermined pattern of change, such a region can be determined to have a low probability of being a region corresponding to a human figure. Accordingly, as also described in the 10th aspect, if a weighting factor with a positive sign is imparted to the set region estimated to correspond to the face of the human figure, a region having a low probability of corresponding to the face of the human figure in the original image is determined, and a weighting factor with a negative sign is imparted to the determined region, then the probability with which a region corresponding to the face of a human figure is extracted as a region having the highest probability of corresponding to the face of a human figure improves further.

In accordance with an 11th aspect of the present invention, there is provided a method of extracting a figure, comprising the steps of: setting in advance a plurality of partial shape patterns on the basis of a plurality of characteristic partial shapes constituting a figure subject to extraction; effecting for each of the plurality of partial shape patterns the searching of the partial shape pattern which is present in an image and the setting of a candidate region in which a particular portion or the whole of the figure subject to extraction is estimated to be present in the image, in accordance with a size and a direction of the searched partial shape pattern and a position of the partial shape represented by the partial shape pattern in the figure subject to extraction; determining for each of the set candidate regions the consistency as a region in which the particular portion or the whole of the figure subject to extraction is present, on the basis of a relationship with each of the detected partial shape patterns; determining a candidate region having a high probability of the particular portion or the whole of the figure subject to extraction being present, on the basis of the consistency determined for each of the candidate regions; and extracting the candidate region determined to have the high probability of the particular portion or the whole of the figure subject to extraction being present.

In the method of extracting a figure according to the 12th aspect of the present invention, in the 11th aspect, states of the figure subject to extraction in the image are classified in advance into a plurality of states; a plurality of kinds of parameters are set in advance for each of the plurality of partial shape patterns in correspondence with respective ones of the plurality of classified states as parameters defining search conditions at the time of searching the partial shape patterns; by using each of the plurality of kinds of parameters corresponding to the plurality of states, processing is effected for performing the search of a partial shape pattern and the setting of a candidate region for each of the plurality of partial shape patterns, for determining consistency for each of the set candidate regions, and for determining and extracting a candidate region having a high probability of the particular portion or the whole of the figure subject to extraction being present; or if it is determined that there is no candidate region having the high probability of the particular portion or the whole of the figure subject to extraction being present as a result of effecting the processing by using a parameter corresponding to a predetermined one of the plurality of states, the processing is repeated by using another one of the parameters corresponding to a state different from the predetermined state, and if is determined that there is a candidate region having the high probability of the particular portion or the whole of the figure subject to extraction being present, the processing ends.

In the method of extracting a figure according to the 13th aspect of the present invention, in the 11th aspect, the states of the figure subject to extraction in the image include at least one of the size of the figure subject to extraction in the image, the direction of the figure subject to extraction in the image, and the direction of an object represented by the figure subject to extraction.

In the 11th aspect of the present invention, a plurality of partial shape patterns are set in advance on the basis of a plurality of characteristic partial shapes constituting a figure subject to extraction which is present in the image. Incidentally, the figure subject to extraction is not confined to a figure representing a person, but may be a figure representing a non-human object, such as an artificial object. However, in a case where a figure representing a person as a figure subject to extraction is used, as the partial shape patterns, in the same way as in the seventh aspect, it is possible to use a shape pattern representing the contour of the head of the human figure, a shape pattern representing the contour of the face of the human figure, a shape pattern representing an internal structure of the face of the human figure, a shape pattern representing the contour of the body of the human figure, and the like.

Next in the 11th aspect of the present invention, the searching of the partial shape pattern which is present in an image, and the setting of a candidate region in which a particular portion or the whole of the figure subject to extraction is estimated to be present in the image, are effected for each of the plurality of partial shape patterns in accordance with a size and a direction of the searched partial shape pattern and a position of the partial shape represented by the partial shape pattern in the figure subject to extraction. As a result, in the same way as in the sixth aspect, a candidate region where a particular portion or the whole of the figure subject to extraction is estimated to be present can be set appropriately without being affected by the colors or the like of the region where the particular portion or the whole of the figure subject to extraction is present and its neighboring region. Incidentally, as a particular portion of the figure subject to extraction, if a figure representing a person is used as the figure subject to extraction, it is possible to use a portion corresponding to the face of a human figure.

In addition, next in the 11th aspect of the present invention, the consistency as a region in which the particular portion or the whole of the figure subject to extraction is present is determined for each of the set candidate regions, on the basis of relationships (e.g., the sizes of the candidate region and the partial shape pattern, their directions, their positional relationships, etc.) with each of the detected partial shape patterns. Then, a candidate region having a high probability of the particular portion or the whole of the figure subject to extraction being present is determined on the basis of the consistency determined for each of the candidate regions. The candidate region determined to have the high probability of the particular portion or the whole of the figure subject to extraction being present is extracted.

Thus, the consistency as a region in which a particular portion or the whole of the figure subject to extraction is present is determined for each candidate region, and a candidate region having a high probability of the particular portion or the whole of the figure subject to extraction being present is determined, as described above. Accordingly, even if the candidate region set on the basis of a result of detection of a certain partial shape pattern is not a region where the figure subject to extraction is not present, the figure subject to extraction which is present in the image can be extracted appropriately, without extracting such a region as a region having a high probability that the particular portion or the whole of the face candidate region is present, and without being affected by the colors or the like of the region where the particular portion or the whole of the figure subject to extraction is present and its neighboring region.

A partial shape of the figure subject to extraction in the image changes according to a state of the figure subject to extraction in the image (e.g., the size of the figure subject to extraction in the image, the direction of the object represented by the figure subject to extraction, and the like). Therefore, in a case where the state of the figure subject to extraction in the image is not fixed, it is necessary to set search conditions at the time of searching the partial shape pattern, such that the partial shape of the figure subject to extraction in various states can be detected as the partial shape pattern. However, if the range of the partial shape to be detected as a partial shape pattern is enlarged, a multiplicity of patterns are detected as the partial shape pattern. In addition, there is a problem in that the number of patterns which are erroneously detected as the partial shape pattern increases despite the fact that their shape is not actually a partial shape of the figure subject to extraction, thereby resulting in a substantial increase in the processing time.

For this reason, in the 12th aspect of the present invention, states of the figure subject to extraction in the image are classified in advance into a plurality of states, and a plurality of kinds of parameters are set in advance for each of the plurality of partial shape patterns in correspondence with respective ones of the plurality of classified states as parameters defining search conditions at the time of searching the partial shape patterns. Incidentally, as the states of the figure subject to extraction in the image, as also described in the 13th aspect of the present invention, it is possible to cite the size of the figure subject to extraction in the image, the direction of the figure subject to extraction in the image, the direction of an object represented by the figure subject to extraction, and the like. In the above, since the search conditions (parameters defining them) are set for each kind of the figure subject to extraction in the image, the range of the partial shape to be detected as a partial shape pattern is narrowed down in each search condition. Hence, if searches are made by using individual search conditions, partial shape patterns of the figure subject to extraction in a particular state can be searched in a very short time.

Then, after the plurality of kinds of parameters have been set, the searching of the partial shape pattern and the setting of a candidate region are effected for each of the plurality of partial shape patterns. Then, if a plurality of processing units are provided for effecting processing for performing the search of a partial shape pattern and the setting of a candidate region for each of the plurality of partial shape patterns, for determining consistency for each of the set candidate regions, and for determining and extracting a candidate region having a high probability of the particular portion or the whole of the figure subject to extraction being present, the aforementioned items of processing are effected in parallel by using the respective ones of the plurality of kinds of parameters corresponding to the respective states. As a result, overall, it is possible to effect the above processing by using the respective ones of the plurality of kinds of the parameters. Hence, a candidate region having a high probability of a particular portion or the whole of the figure subject to extraction being present can be extracted in a very short time irrespective of the state of the figure subject to extraction in the image.

On the other hand, if it is determined that there is no candidate region having the high probability of the particular portion or the whole of the figure subject to extraction being present as a result of effecting the processing by using a parameter corresponding to a predetermined one of the plurality of states, the processing may be repeated by using another one of the parameters corresponding to a state different from the predetermined state, and if is determined that there is a candidate region having the high probability of the particular portion or the whole of the figure subject to extraction being present, the processing may end. In this case, the respective items of processing corresponding to the respective states are effected in series; however, there is a high possibility that a candidate region having a high probability of the particular portion or the whole of the figure subject to extraction being present can be extracted before all the processing corresponding to the respective states is completed. Accordingly, the figure subject to extraction can be extracted in a short time as compared with a case where a plurality of parameters for the search conditions are not set in correspondence with the states of the figure subject to extraction in the image.

In addition, if an arrangement is provided such that searches are carried out consecutively by starting with a parameter corresponding to a state of a higher frequency of appearance in correspondence with the frequency of appearance of the figure subject to extraction in the image, the time required for extracting the figure subject to extraction can be further reduced.

The above and other objects, features and advantages of the present invention will become more apparent from the following detailed description of the invention when read in conjunction with the accompanying drawings.

BRIEF DESCRIPTION OF THE DRAWINGS

FIG. 2 is a flowchart illustrating a main routine of facial-region extraction processing which is executed by a facial-region extracting unit;

FIG. 26 is a schematic block diagram illustrating an example of the configuration of a facial-region extracting unit for executing the facial-region extraction processing.

DESCRIPTION OF THE PREFERRED EMBODIMENTS

Figure 1:
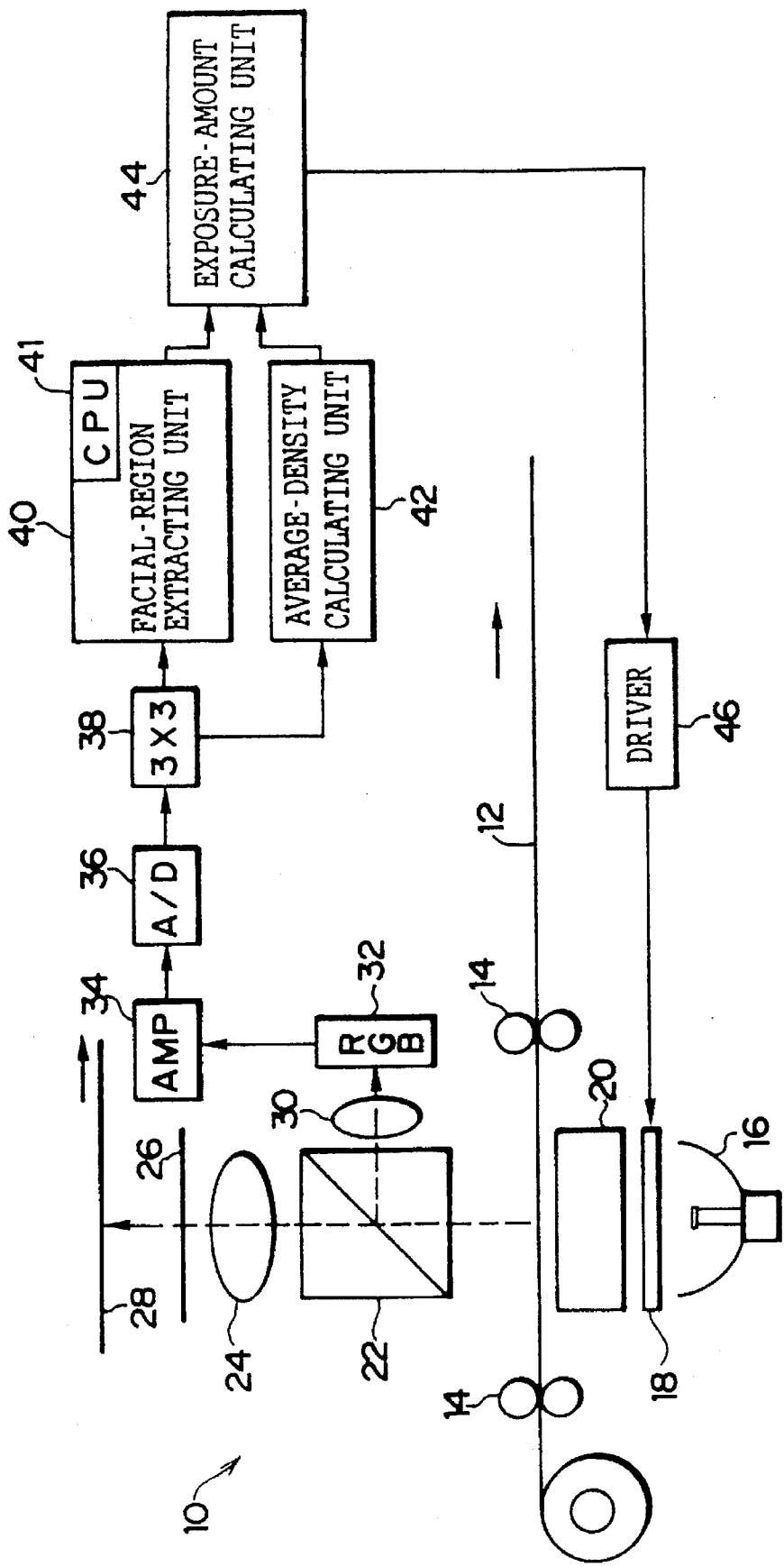
FIG. 1 is a schematic diagram of a photographic printer in accordance with a first embodiment.

Hereafter, a detailed description of the present invention will be made with reference to the drawings. FIG. 1 shows a photographic printer 10 to which the present invention is applicable. The photographic printer 10 has transport rollers 14 for transporting a negative film 12. A light source 16, a color compensating filter 18 such as a light-adjusting filter, and a diffusion box 20 are consecutively arranged below a transporting passage of the negative film 12. Meanwhile, a distributing prism 22 for distributing the light transmitted through the negative film 12 in two directions is disposed above the transporting passage of the negative film 12. A projection optical system 24, a black shutter 26, and color paper (photographic printing paper) serving as a copying material are consecutively arranged along one of the optical paths distributed in the two directions by the distributing prism 22. Meanwhile, a projection optical system 30 and a CCD image sensor 32 are consecutively arranged along the other optical path. The CCD image sensor 32 divides the overall image (one frame) recorded on the negative film 12 into a multiplicity of pixels (e.g., 256×256 pixels), and effects photometry by separating each pixel into three colors, R (red), G (green), and B (blue).

An amplifier 34 for amplifying a signal outputted from the CCD image sensor 32, an analog-digital (A/D) converter 36, and a 3×3 matrix circuit 38 for correcting the sensitivity of the CCD image sensor 32 are consecutively connected to a signal output terminal of the CCD image sensor 32. The 3×3 matrix circuit 38 is constituted by a microprocessing unit (MPU), and is connected to a facial-region extracting unit 40 in which a program for realizing facial-region extraction processing, which will be described later, is stored in advance in a ROM, and an average-density calculating unit 42 for calculating the average density of the overall image, respectively. In addition, the facial-region extracting unit 40 and the average-density calculating unit 42 are connected to an exposure-amount calculating unit 44. The exposure-amount calculating unit 44 is connected to the color compensating filter 18 via a driver 46 for driving the color compensating filter 18.

Next, a description will be given of the operation of the first embodiment. The light emitting from the light source 16 is transmitted through the color compensating filter 18, the diffusion box 20, and the negative film 12, is distributed by the distributing prism 22, and is made incident upon the CCD image sensor 32 via the projection optical system 30. Incidentally, the black shutter 26 is closed at this time. By using the incident light, the CCD image sensor 32 divides the overall image into a multiplicity of pixels, effects photometry by separating each pixel into the three colors, R, G, and B, and outputs a photometric data signal. After the photometric data signal is amplified by the amplifier 34, and is converted into a digital signal by the A/D converter 36, the photometric data signal is subjected to the sensitivity correction by the 3×3 matrix circuit 38, and is supplied to the facial-region extracting unit 40 and the average-density calculating unit 42, respectively, as image data.

The average-density calculating unit 42 calculates the average density of the overall image. As will be described later in detail, the facial-region extracting unit 40 estimates a portion corresponding to the face of a human figure in the image, and outputs the photometric data on the three colors, R, G, and B, of that portion. The exposure-amount calculating unit 44 calculates an exposure amount by using the photometric data on the three colors outputted from the facial-region extracting unit 40 and the average density outputted from the average-density calculating unit 42. The color compensating filter 18 is moved by means of the driver 46 so that the image on the negative film 12 is printed on the color paper 28 by the calculated exposure amount, and the image is printed by opening and closing the black shutter 26.

It should be noted that the average density of the overall image calculated by the average-density calculating unit 42 is not essential information in the calculation of the exposure amount by the exposure-amount calculating unit 44, so that the average-density calculating unit 42 may be omitted, and the exposure-amount calculating unit 44 may calculate the exposure amount by using only the photometric data on the three colors outputted from the facial-region extracting unit 40.

Next, referring to the flowchart shown in FIG. 2, a description will be given of the facial-region extraction processing which is executed by the CPU 41 of the facial-region extracting unit 40. In Step 100, the image data is fetched from the 3×3 matrix circuit 38.

Figure 8A:
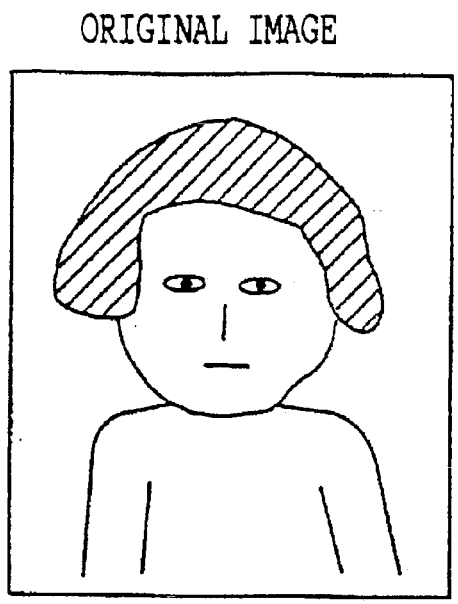
FIG. 8A is an image diagram illustrating an original image for explaining the details of the face-candidate-region setting processing based on the extraction of the head.
Figure 8B:
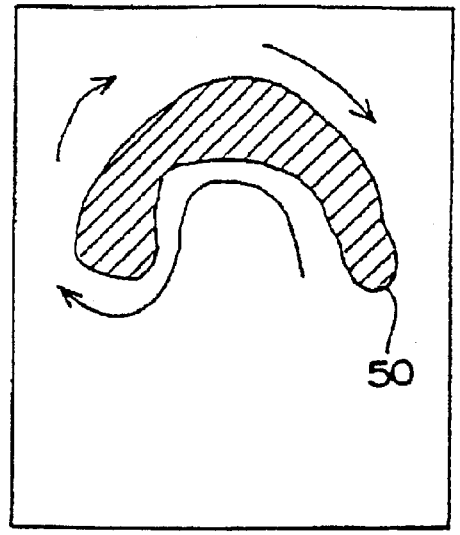
FIG. 8B is an image diagram illustrating the tracing of a contour of a black region extracted by binarization for explaining the details of the face-candidate-region setting processing based on the extraction of the head.

In Step 102, as an example of the method of dividing the original image into a plurality of regions, the image data is binarized by a predetermined threshold. Hereafter, a description will be given of an example of a positive image. As a result of this binarization, the original image is divided into regions each constituted by pixels having densities greater than the threshold (these regions will be referred to as the black regions) and regions each constituted by pixels having densities less than or equal to the threshold (these regions will be referred to as the white regions). As a result, in the original image shown in FIG. 8A, for instance, a plurality of black regions, including a black region 50 corresponding to the hair portion of the human figure in the original image, as shown in FIG. 8B, are extracted. Further, in Step 102, the respective regions are numbered so as to discriminate the plurality of black regions and white regions thus divided.

Figure 3A:
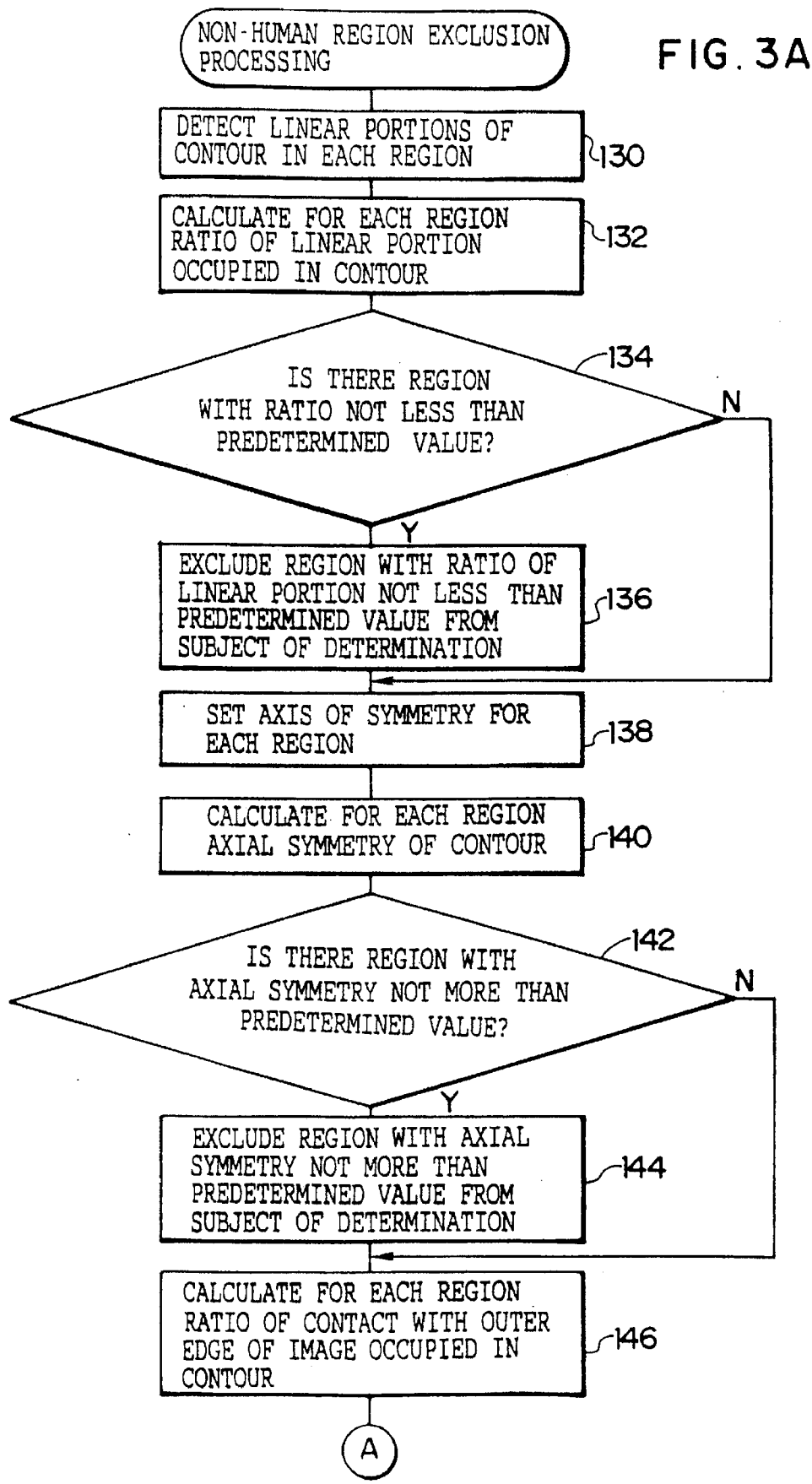
FIGS. 3A and 3B are a flowcharts illustrating non-human region determination processing.
Figure 3B:
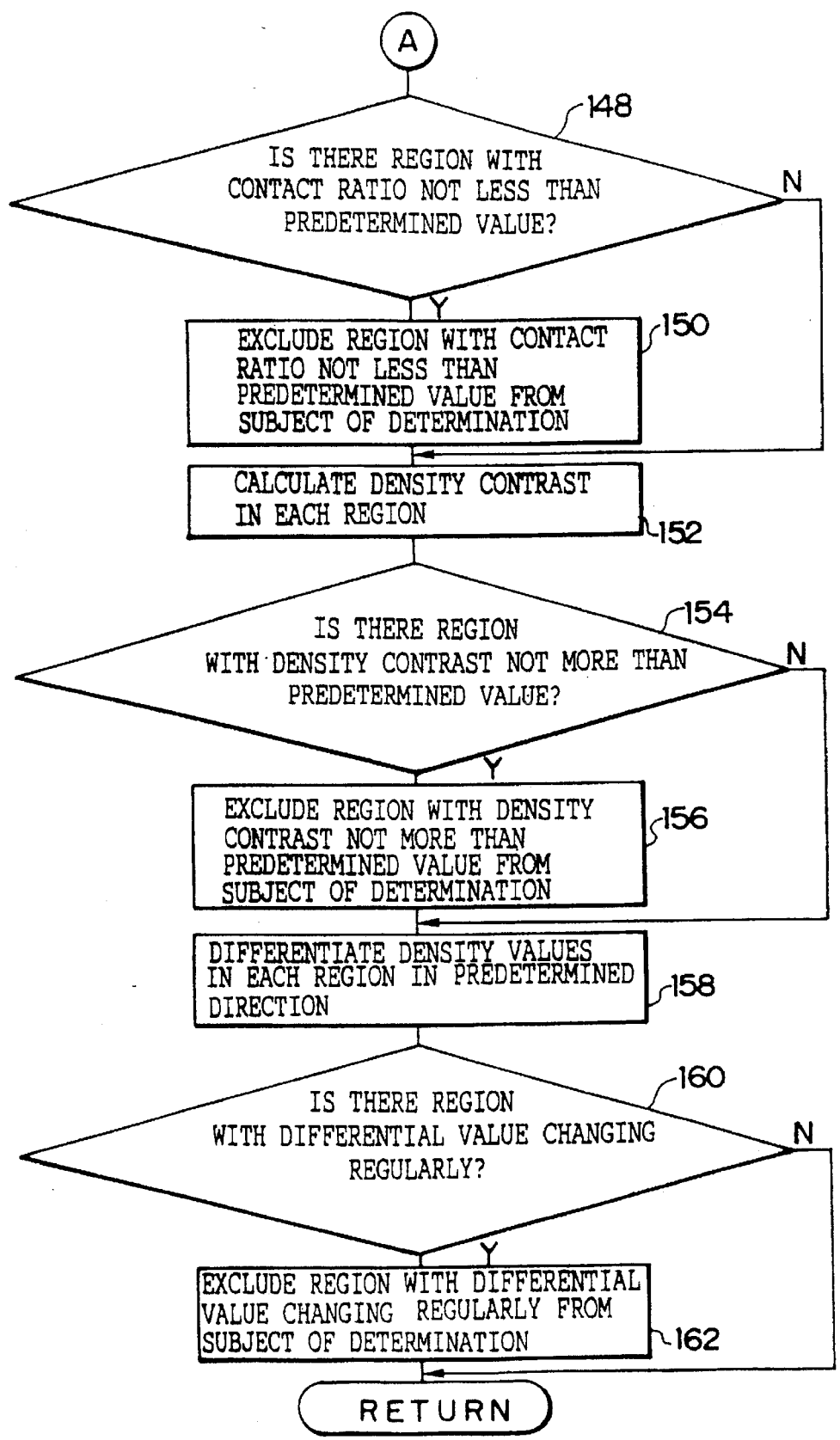

In Step 104, non-human region determination (non-human area exclusion) processing is carried out. Referring to the flowcharts shown in FIGS. 3A and 3B, a description will be given of the non-human region determination processing. In Step 130, linear portions of a contour are detected with respect to the respective black regions and white regions extracted by binarization in Step 102 in the flowchart shown in FIG. 2. In Step 132, the ratio of the linear portion occupied in the contour is calculated for each region. In Step 134, a determination is made as to whether or not there is a region whose ratio mentioned above is greater than or equal to a predetermined value. In the case of the region whose ratio of the linear portion occupied in the contour is greater than or equal to the predetermined value, there is a high probability that such a region represents an artificial object, and it can be determined that the probability of such a region being a region corresponding to a human figure is low. For this reason, if YES is the answer in the determination in Step 134, the region whose ratio of the linear portion is greater than or equal to the predetermined value is excluded in Step 136 from the subject of determination of a region representing the contour of the head of a human figure, which will be described later, (i.e., the relevant region is excluded from the subject of search of a first shape pattern). Then, the operation proceeds to Step 138.

In Step 138, with respect to each region, an axis of symmetry extending in a vertical direction of the image is set in the vicinity of a central portion, as viewed in the left-and-right direction of the image, of each region. In Step 140, the similarity of axial symmetry with respect to the axis of symmetry set in the above is calculated for each region. Incidentally, the method of calculating the similarity of axial symmetry will be described later. In Step 142, a determination is made as to whether or not there is a region whose similarity of axial symmetry is less than or equal to a predetermined value. Generally, the human body is substantially axially symmetrical with respect to an imaginary line which divides the human body into left and right parts, so that it can be determined that, in the case of a region whose similarity of axial symmetry is less than or equal to a predetermined value, the probability of such a region being a region corresponding to a human figure is low. For this reason, if YES is the answer in the determination in Step 142, the region whose similarity of axial symmetry is less than or equal to the predetermined value is excluded in Step 144 from the subject of determination of the region representing the contour of the head of the human figure. Then, the operation proceeds to Step 146.

In Step 146, the ratio of contact of the contour with an outer edge of the image is calculated for each region. In Step 148, a determination is made as to whether or not there is a region whose contact ratio is greater than or equal to a predetermined value. It can be determined that the region whose contact ratio is greater than or equal to a predetermined value is located in a peripheral portion of the image. However, since there is a high probability that a human figure is generally located in a substantially central portion of the image, it can be determined that the probability of the region whose contact ratio is greater than or equal to the predetermined value being a region corresponding to the human figure is low. For this reason, if YES is the answer in the determination in Step 148, the region whose ratio of contact with an outer edge of the image is greater than or equal to the predetermined value is excluded in Step 150 from the subject of determination of the region representing the contour of the head of a human figure. Then, the operation proceeds to Step 152.

In Step 152, the contrast (the difference between a maximum density value and a minimum density value) of the density in each region is calculated. In Step 154, a determination is made as to whether or not there is a region whose density contrast is less than or equal to a predetermined value. If the contrast of the density within the region is less than or equal to the predetermined value, there is a high possibility that such a region represents an object having a flat or a substantially smooth surface, and the probability of such a region being a region corresponding to a human figure is low. For this reason, if YES is the answer in the determination in Step 154, the region whose density contrast is less than or equal to the predetermined value is excluded in Step 156 from the subject of determination of the region representing the contour of the head of a human figure. Then, the operation proceeds to Step 158.

In Step 158, density values of the respective pixels in the regions are differentiated along a plurality of mutually different directions (e.g., the left-and-right direction, the vertical direction, and directions inclined by ±45° with respect to the left-and-right direction). In Step 160, a determination is made as to whether or not there is a region in which differential values in at least one of the plurality of directions change regularly. In this determination, YES is given as the answer in the case of the region whose density changes with a predetermined pattern or the region whose density shows a repetition of a predetermined pattern of change. Since it can be determined that such a region has a low probability of being a region corresponding to a human figure, if YES is the answer in the determination in Step 160, the region in which differential values change regularly is excluded in Step 162 from the subject of determination of the region representing the contour of the head of a human figure. This completes the non-human region determination processing, and the operation proceeds to Step 106 in the flowchart shown in FIG. 2.

In the ensuing Step 106, face-candidate-region setting processing based on the extraction of the head is carried out. In this processing, as a shape pattern (a first shape pattern) peculiar to the head as a first portion of a human figure, a shape pattern representing the contour of the head of a human figure is searched to set a face candidate region. Hereafter, a description will be given with reference to the flowchart shown in FIG. 4.

Figure 8C:
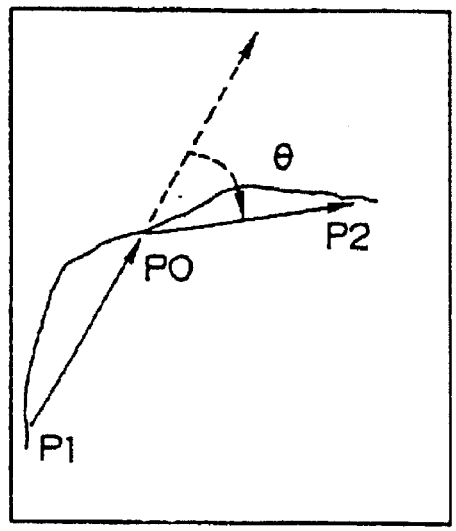
FIG. 8C is an image diagram explaining the calculation of a curvature of a contour for explaining the details of the face-candidate-region setting processing based on the extraction of the head.

In Step 172, one of the black regions which were not excluded in the above-described non-human area exclusion processing is fetched from among the plurality of black regions extracted by the binarization described earlier. In Step 174, the contour of the fetched black region is traced, and the curvature of the contour is calculated. For instance, if it is assumed that a multiplicity of black regions are extracted by performing binarization with respect to the original image shown in FIG. 8A, and that a black region 50 shown in FIG. 8B is fetched from among them, then the contour can be traced clockwise, as shown in FIG. 8B. In addition, the curvature can be calculated as follows: As shown in FIG. 8C, vectors are consecutively set (in FIG. 8C, a vector P1P0 and a vector P0P2) such that each of the vectors has a predetermined length, is oriented in a direction substantially along the aforementioned tracing direction, and has both a starting point and a terminating point adjoining the contour of the black region. Then, an angle θ serving as the curvature can be calculated by the inner product of the adjacent vectors. In addition, the orientation of the angle θ (positivity or negativity of the sign) can be determined by the outer product of the vectors.

At this time, it is assumed that an angle calculation formula is set in such a manner as to give a negative value when the contour of the black region is curved rightwardly with respect to the tracing direction, and to give a positive value when it is curved leftwardly with respect thereto. For instance, FIG. 8C shows a portion of the contour of the black region which is curved rightwardly with respect to the tracing direction, and the angle θ assumes a negative value.

It should be noted that the length of each vector may be fixed, or may be changed in correspondence with the peripheral length of the contour of the black region. In addition, the calculation of a curvature may be carried out a plurality of times, and the length of the vector may be altered in steps each time the calculation is made.

Figure 8D:
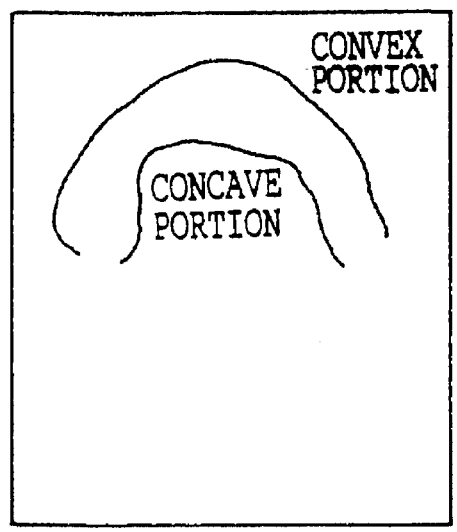
FIG. 8D is an image diagram illustrating the extraction of a concave portion and a convex portion for explaining the details of the face-candidate-region setting processing based on the extraction of the head.

In an ensuing Step 176, a black region having in its contour both a concave portion, which is estimated to correspond to a boundary between the head and the face of a human figure, and a convex portion, which is estimated to correspond to the top of the head of the human figure, is extracted as a shape pattern representing the contour of the head of a human figure on the basis of the curvatures of the contour of the black region calculated above. The concave portion and the convex portion can be determined on the basis of the tracing direction and the orientation of the angle θ (positivity or negativity of the sign) determined earlier. That is, the portion where the sign of the angle θ is reversed is the boundary between the concave portion and the convex portion, and it can be determined that the relevant portion is a concave portion if the sign of the angle θ is positive when the contour is traced clockwise, and that the relevant portion is a convex portion if the sign is negative. Consequently, the concave portion and the convex portion in the contour of the black region can be extracted as shown in FIG. 8D by way of example.

Figure 9A:
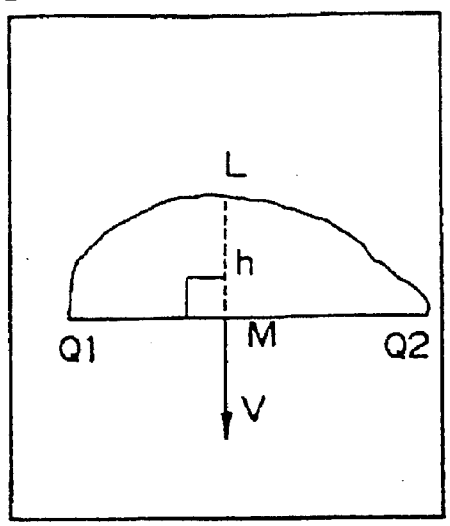
FIG. 9A is an image diagram explaining the calculation of characteristic quantities of a concave portion and a convex portion for illustrating the details of the consistency determination processing based on the extraction of the head.

In Step 178, the respective characteristic quantities of the concave portion and the convex portion extracted above are calculated. In this embodiment, the degree of a circular curve, which is calculated as described below, is used. Namely, as shown in FIG. 9A, assuming that the length of a curve constituting the concave portion or the convex portion is L, the distance between opposite end points Q1 and Q2 of the concave portion or the convex portion is M, and an the height of the concave portion or the convex portion with respect to a straight line connecting the opposite end points Q1 and Q2 is h, then L÷M and h÷M are calculated in terms of the degree of a circular curve. In addition, a directional vector V is calculated as a vector oriented in the direction in which the concave portion or the convex portion is open.

In Step 180, by using the characteristic quantities calculated above, a determination is made as to whether or not the black region can be determined to be the head (hair portion) of a human figure, i.e., whether or not the probability of the black region being the head of a human figure is high. In this determination, YES is given as the answer in the following cases: a case where the concave portion and the convex portion of the contour having the degrees of a circular curve each falling within a predetermined range are respectively extracted from the contour of the black region, a case where the ratios of the lengths of the concave portion and the convex portion to the peripheral length of the contour of the black region respectively fall within predetermined ranges, and a case where the evaluation of consistency as the head of a human figure is high on the basis of the position and the direction. The evaluation of consistency, for example, can be effected as described below. First, the consistency is evaluated in the units of the concave portion and the convex portion in the following procedure.

(1) Three arbitrary points (e.g., three points including opposite end points and a central point of the curve, but not located on the identical straight line) are selected, a circle passing through the respective selected three points is assumed, and a central point of the circle is determined.

(2) The distance between the central point of the circle and each of the pixels constituting the curve of the concave portion or the convex portion is determined, and the curve is evaluated as having consistency if the variations in the distance are less than or equal to a predetermined value. It should be noted that if the variations are Greater than the predetermined value, such a curve is excluded from the subject of evaluation, or the curve is further divided at the portion having a large curvature, and the processing is effected again.

Next, the consistency of both the concave portion and the convex portion is evaluated as follows.

Figure 9B:
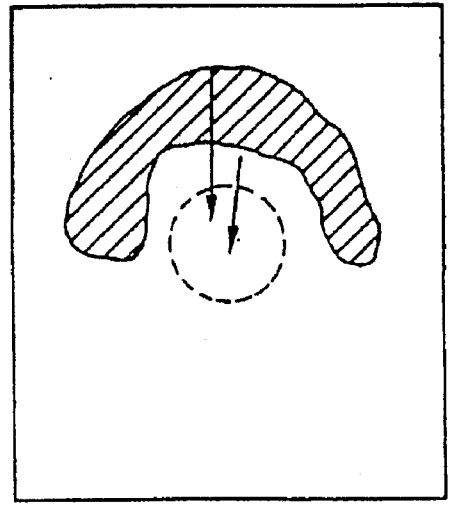
FIG. 9B is an image diagram explaining the determination of the head for illustrating the details of the consistency determination processing based on the extraction of the head.
Figure 9C:
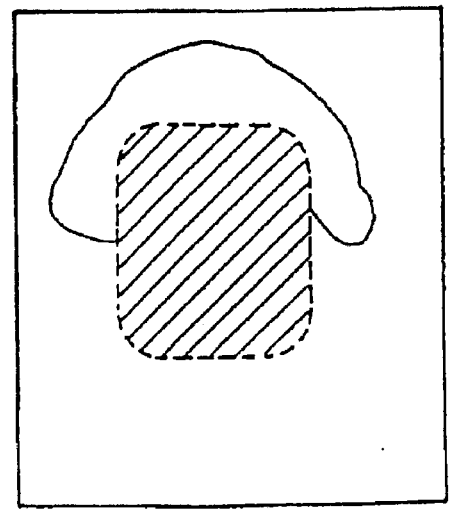
FIG. 9C is an image diagram explaining the setting of a face candidate region for illustrating the details of the consistency determination processing based on the extraction of the head.

(1) An overall central point and an overall central area (the area of a circular shape having a radius determined by an average of the lengths of the respective curves, and an area shown by the broken line in FIG. 9B) are set by using the centers of gravity of the central points of the aforementioned circles determined for the respective curves of the concave portion and the convex portion. It is evaluated that the consistency as the head of a human figure is high in a case where the central points determined for the respective curves fall within the overall central area, or central axes (directional vectors V or their extension lines) of the respective curves converge in that central area.

Alternatively, instead of the evaluation according to the procedure (1) described above, it is evaluated that the consistency as the head of a human figure is high in a case where the variations in the distance between the central point of the aforementioned circle and each of the pixels constituting the curve of the concave portion or the convex portion are less than or equal to a predetermined value, in the same way as the procedure (2) described above.

Then, if YES is the answer in the determination in Step 180, since in a boundary portion between the hair and the face of a human figure, the hair is formed in a concave shape in most cases, in Step 182, an elliptical region inscribing the concave portion is set as a face candidate region (a region estimated to correspond to the face of a human figure) on the basis of the size of the concave portion of the contour of the black region and its central position. After Step 182 is executed, the operation proceeds to Step 186. On the other hand, if NO is the answer in the determination in Step 180, the operation proceeds to Step 186 without performing processing.

In Step 186, a determination is made as to whether or not the aforementioned processing has been effected with respect to all the black regions extracted by binarization. If NO is the answer in the determination in Step 186, the operation returns to Step 172 to repeat Steps 172 to 186. If YES is the answer in the determination in Step 186, the face-candidate-region setting processing based on the extraction of the head ends, and the operation proceeds to Step 108 in the flowchart shown in FIG. 2.

Figure 5:
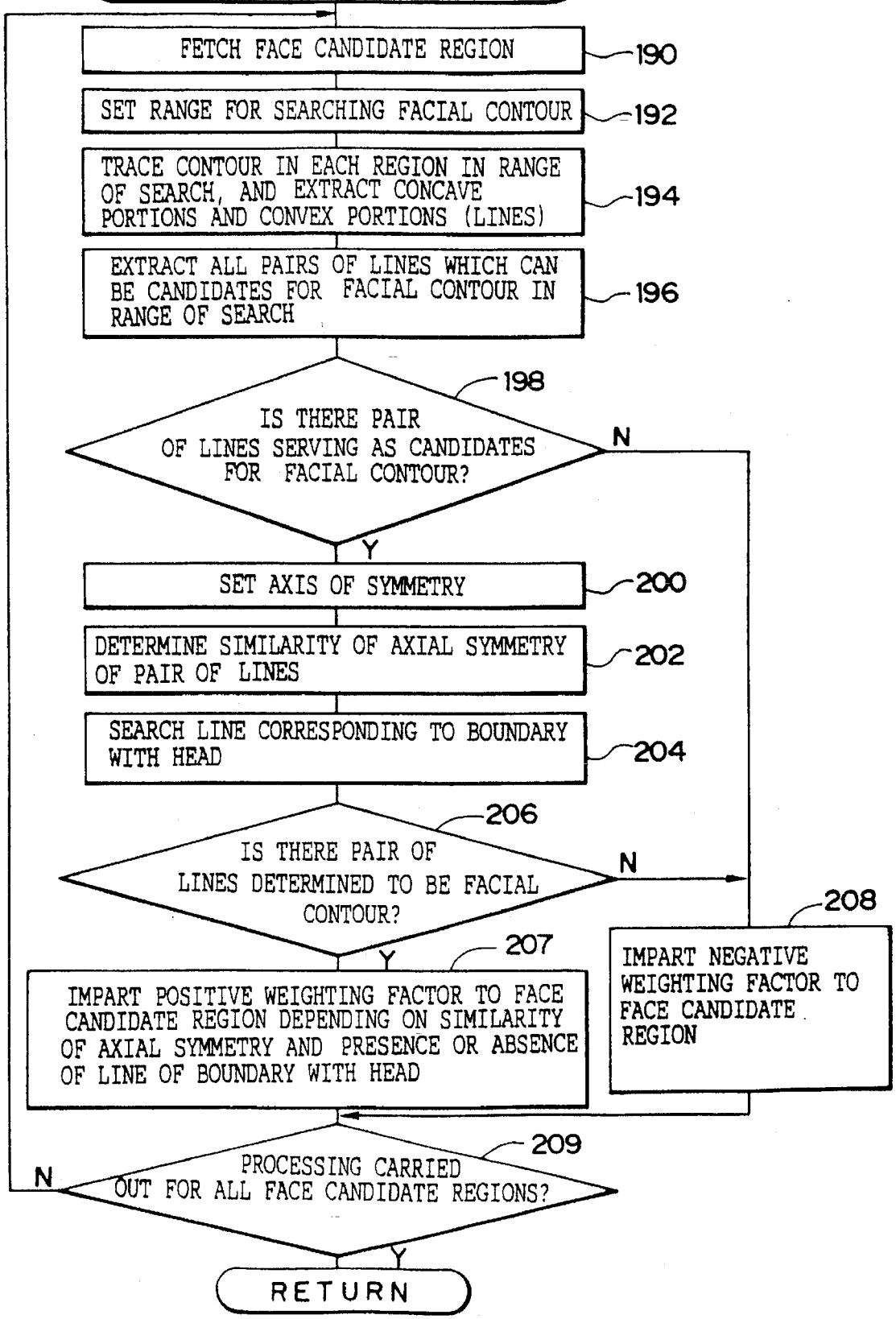
FIG. 5 is a flowchart illustrating consistency determination processing based on the facial contour.

In Step 108, consistency determination processing based on the facial contour is carried out. In this processing, as a shape pattern (a second shape pattern) peculiar to the face as a second portion of a human figure, a shape pattern representing the contour of the face of a human figure is searched so as to determine a face candidate region having a high probability of being a region corresponding to the face of a human figure. Hereafter, a description will be given with reference to the flowchart shown in FIG. 5.

Figure 10A:
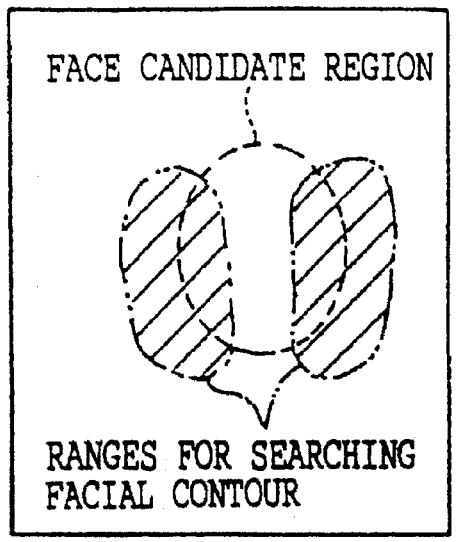
FIG. 10A is an image diagram explaining the setting of ranges for searching a facial contour for illustrating the details of the consistency determination processing based on the facial contour.

In Step 190, one of the face candidate regions, which has been set by the above-described face-candidate-region setting processing by the extraction of the head, is fetched. In an ensuing Step 192, a range for searching a shape pattern representing the contour of the face is set in correspondence with the size and direction of the fetched face candidate region as well as the positional relationship between the face of a human figure and the second portion (facial contour). For example, if the fetched face candidate region is in the range surrounded by the broken line in FIG. 10A, it can be estimated that a shape pattern representing the facial contour (here, contours of sides of the face) is present with respect to this face candidate region. Thus, the ranges shown by hatching in FIG. 10A are set as the ranges of search.

Figure 4:
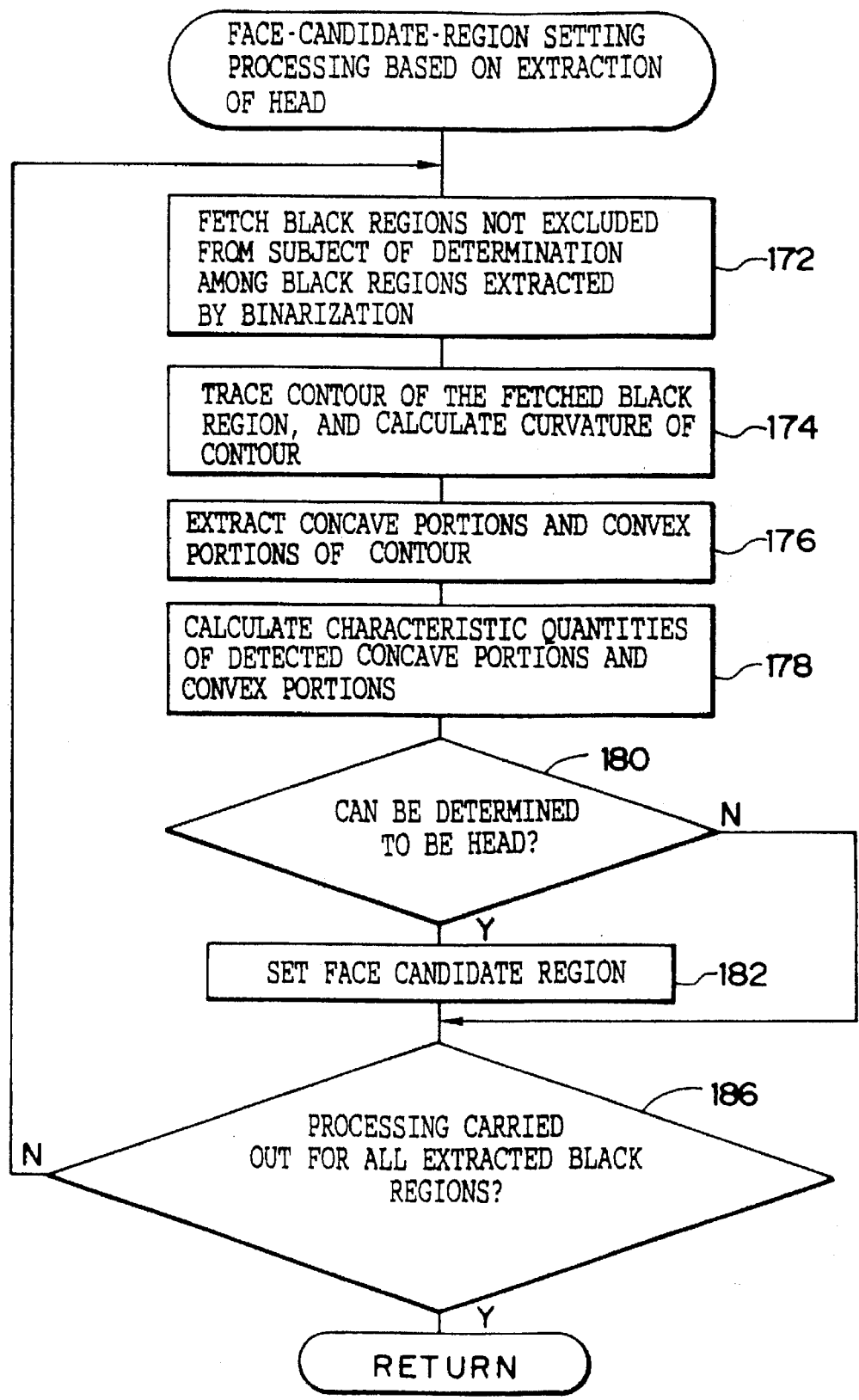
FIG. 4 is a flowchart illustrating face-candidate-region setting processing based on the extraction of the head.
Figure 10B:
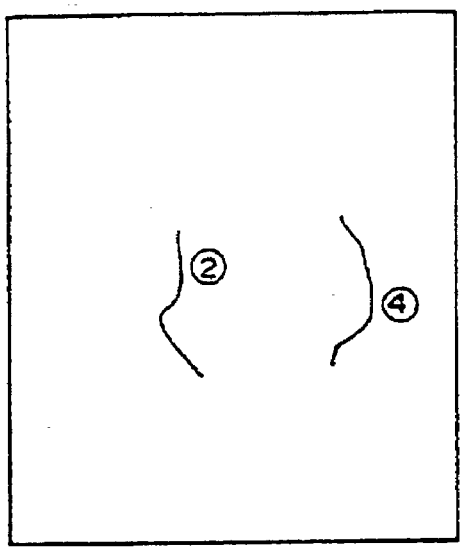
FIG. 10B is an image diagram explaining the extraction of a concave portion and a convex portion for illustrating the details of the consistency determination processing based on the facial contour.

In an ensuing Step 194, with respect to regions which are present in the aforementioned ranges of search among the multiplicity of regions (black regions and white regions) extracted by binarization, the contours of the respective regions are traced, the curvatures of the contours are calculated, and concave portions and convex portions are extracted, in the same way as in Steps 174 and 176 of the flowchart shown in FIG. 4 explained before. As a result, with respect to an original image shown in, for example, FIG. 8A, a multiplicity of concave portions and convex portions, including a concave portion and a convex portion indicated at ② and ④ in FIG. 10B, are extracted as concave portions and convex portions which are present in the ranges of search shown in FIG. 10A.

Figure 10C:
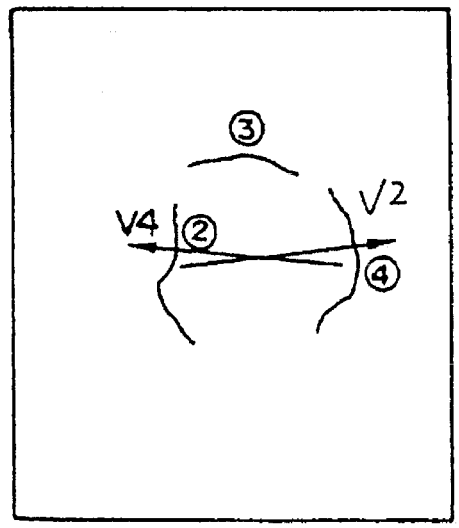
FIG. 10C is an image diagram explaining the extracting a pair of lines which can be candidates for the facial contour, for illustrating the details of the consistency determination processing based on the facial contour.

Incidentally, after the concave portions and the convex portions have been extracted, by preferentially focusing attention on a curve having a long length among the curves extracted as the concave or convex portions, that curve may be further divided such that its curvature (angle θ) falls within a predetermined range, or the degree of a circular curve assumes a predetermined value or less, or by a rough classification of the angle of the normal direction of the curve. For example, in a case where both curves ② and ③ in FIG. 10C are in the ranges of search, and they are extracted as a continuous curve, since their degrees of a circular curve are large, these two curves are further divided into two curves, respectively. Hereafter, curves which are obtained by dividing the contour of each region extracted as described above will be generally referred to as "lines."

In Step 196, as a shape pattern representing the contour of the face of a human figure, all the pairs of lines estimated to correspond to sides of the face of a human figure, i.e., the pairs of lines which can be candidates for the facial contour, are extracted from among the multiplicity of concave portions and convex portions (lines) extracted in Step 194. Specifically, of the lines extracted above, all the pairs of lines having the following conditions are extracted as pairs of lines which can be candidates for the facial contour: Their directional vectors V are oriented toward each other; the magnitude of the angle of intersection between their directional vectors V (or their extension lines) is less than or equal to a predetermined value; and similarities in the length and the degree of a circular curve between them are greater than or equal to predetermined values. For instance, in the example shown in FIG. 10C, of the multiplicity of lines extracted in Step 194, the pair of lines ② and ④ and the like are extracted as pairs of lines which can be candidates for the facial contour. It should be noted that V2 and V4 denote directional vectors of the respective lines.

In an ensuing Step 198, a determination is made as to whether or not there has been any pair of lines which can be candidates for the facial contour. If lines conforming to the above-described conditions have been extracted from the ranges of search, YES is given as the answer in the determination in Step 198, and the operation proceeds to Step 200.

Figure 10D:
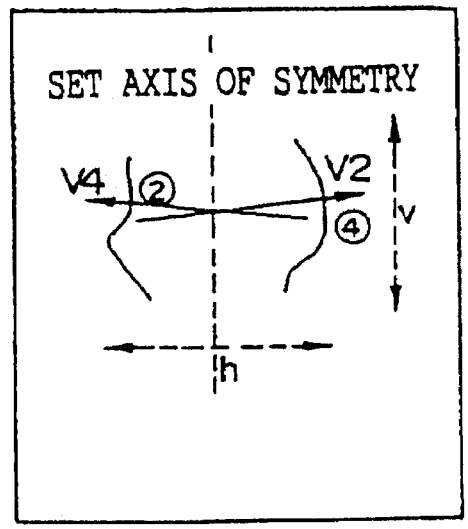
FIG. 10D is an image diagram explaining the determination of the similarity of axial symmetry, for illustrating the details of the consistency determination processing based on the facial contour.
Figure 11A:
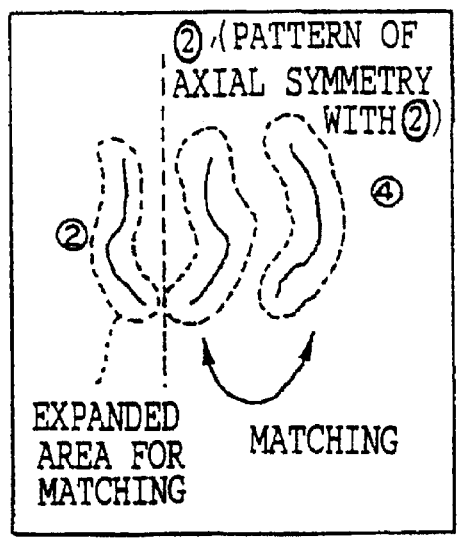
FIG. 11A is an image diagram explaining the determination of the similarity of axial symmetry, for illustrating the details of the consistency determination processing based on the facial contour.

In Step 200, an axis of symmetry is set between the pair of lines with respect to every pair of lines extracted in Step 196. In an ensuing Step 202, the similarity of axial symmetry of the pair of lines is determined for each pair of lines. In the determination of the similarity of axial symmetry, first, as shown in FIG. 10D, it is assumed that the composite length of the two lines along a direction parallel to the axis of symmetry is v, and the interval between the two lines along a direction perpendicular to the axis of symmetry is h, and a determination is made as to whether the aspect ratio v/h is a value falling within a predetermined range corresponding to the aspect ratio of a human face. Next, as shown in FIG. 11A, an expanded area for matching is set for each line (such as the processing for expanding the area centering on the line). Then, a pattern of a curvilinear area symmetrical about the axis of symmetry with respect to one line of the pair of lines is determined (in the drawing, a line ②, symmetrical with the line ②), and the similarity of the pattern of the curvilinear area thus obtained and the other pattern of the line-expanded area is determined.

As a method of determining the similarity, a calculation is made of an accumulated value of absolute values of differences or squared values of differences between pixel data which are present at corresponding positions in the area patterns subject to matching, and it can be determined that the smaller the accumulated value, the larger the similarity between the areas. In addition, the image data themselves, the binary data, data obtained by differentiating the image data, and so on can be used as the data on the pixels.

Figure 11B:
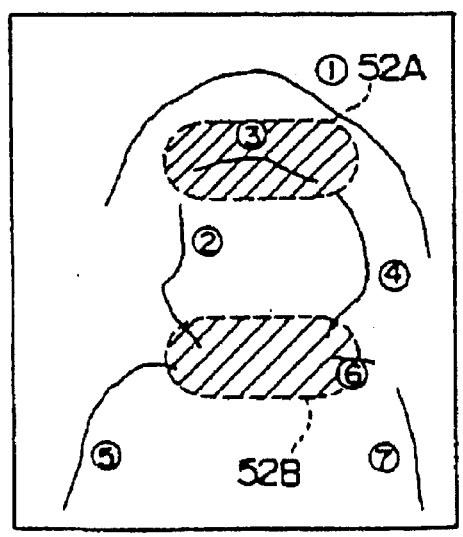
FIG. 11B is an image diagram explaining the search of a boundary with the head, for illustrating the details of the consistency determination processing based on the facial contour.

Further, in an ensuing Step 204, assuming that a line in each pair of lines is a line corresponding to a side of the face of a human figure, a search is made as to whether a line whose directional vector is close to a vertical line is present at a position corresponding to a boundary with the head. For example, with respect to the pair of line ② and line ④ described above, a range 52A shown in FIG. 11B is searched as the position corresponding to the boundary with the head, and a line ③ is extracted as a line whose directional vector located in this range 52A is close to a vertical line.

In an ensuing Step 206, on the basis of the result of the determination of the aforementioned similarity in axial symmetry and on the basis of the presence or absence of the line corresponding to the boundary with the head, a determination is made of the probability of each pair of lines being a pair of lines representing the contour of the face of a human figure, thereby determining whether or not there is a pair of lines which can be decided to be a pair of lines corresponding to the contour of the face, among the pairs of lines extracted in Step 196. If No is the answer in the determination in Step 206, the operation proceeds to Step 208. On the other hand, if YES is the answer in the determination in Step 206, the pair of lines determined to have the highest probability of being a pair of lines representing the contour of the face of a human figure are considered to be lines corresponding to both sides of the face of a human figure. Thus, in Step 207, a weighting factor with a positive sign is imparted to the face candidate region fetched in Step 190.

On the basis of the pair of lines determined to have the highest probability of being a pair of lines representing the contour of the face of a human figure, the weighting factor can be set such that its value becomes higher as the similarity of axial symmetry of that pair of lines becomes higher, and such that the value becomes high when a line corresponding to the boundary with the head is extracted with respect to the pair of lines. When the processing in Step 207 is executed, the operation proceeds to Step 209. Meanwhile, if NO is the answer in the determination in Step 198 or Step 206, this is the case in which the pair of lines having a high probability of being a pair of lines representing the contour of the face of a human figure was not detected with respect to the face candidate region fetched in Step 190. Therefore, in Step 208, a weighting factor with a negative sign is imparted to that face candidate region, and the operation proceeds to Step 209.

in Step 209, a determination is made as to whether or not the above processing has been effected with respect to all the face candidate regions. If a plurality of face candidate regions have been set by the above-described face-candidate-region setting processing based on the extraction of the head, NO is given as the answer in the determination in Step 209. Hence, Steps 190 to 209 are repeated until YES is given as the answer in the determination in Step 190, and a weighting factor with a positive or negative sign is imparted to all the face candidate regions, depending on the presence or absence of the detected pair of lines having a high probability of being a pair of lines representing the contour of the face of a human figure. This weighting factor corresponds to the consistency (i.e., probability) as a region corresponding to the face of a human figure with respect to the face candidate region. If YES is given as the answer in the determination in step 209, the consistency determination processing based on the facial contour ends, and the operation proceeds to Step 110 in the flowchart shown in FIG. 2.

Figure 6:
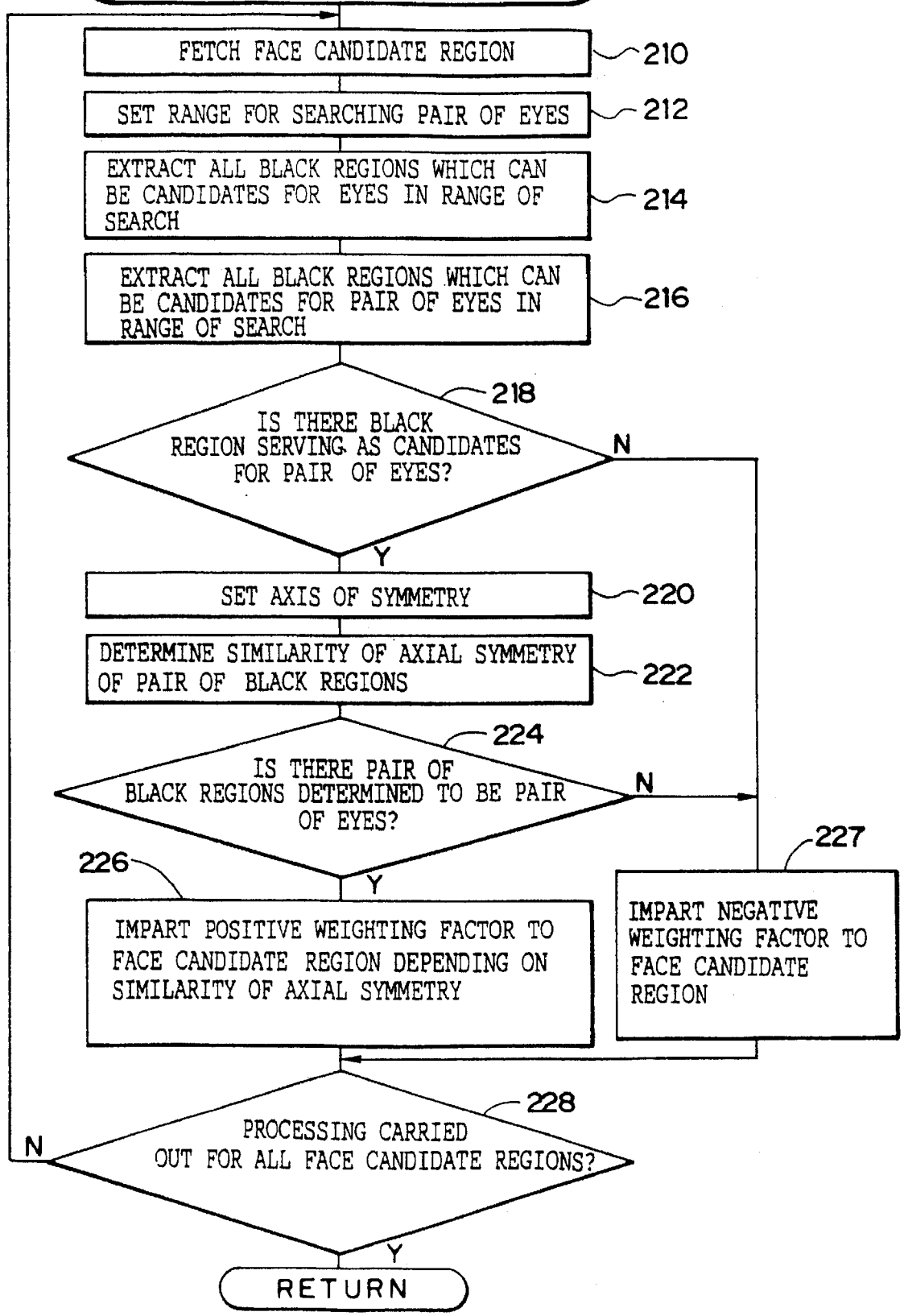
FIG. 6 is a flowchart illustrating consistency determination processing based on an internal structure of the face.

In Step 110, the consistency determination processing based on the internal structure of the face is carried out. In this processing, a shape pattern representing a pair of eyes which are present inside the face of a human figure is searched as a shape pattern (a second shape pattern) peculiar to the internal structure of the face as a second portion of a human figure, so as to determine a face candidate region having a high probability of being a region corresponding to the face of a human figure. Hereafter, a description will be given with reference to the flowchart shown in FIG. 6.

Figure 12A:
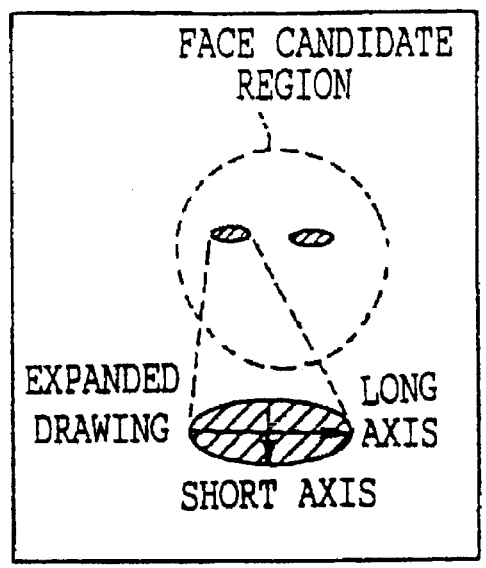
FIG. 12A is an image diagram explaining the extraction of black regions which can be candidates for eyes, for illustrating the details of the consistency determination processing based on the facial structure.

In Step 210, one of the face candidate regions is fetched. In an ensuing Step 212, a range for searching the shape pattern representing a pair of eyes is set. Since the pair of eyes is present inside the face, the searching range is set in such a manner as to match the fetched face candidate region. In Step 214, of the multiplicity of black regions extracted by binarization, those black regions which can be candidates for the eyes which are present in the searching range, i.e., elliptical black regions whose ratio (ratio between the long axis and the short axis) between the dimension in the longitudinal direction (the direction of the long axis) and the dimension in the widthwise direction (the direction of the short axis falls within a predetermined range as shown in FIG. 12A, are all extracted. In Step 216, of the black regions extracted in Step 214, all the black regions which can be candidates for the pair of eyes are extracted. Specifically, the angle in the direction of the long axis is determined on the basis of the primary moment of inertia of each of the black regions extracted in Step 214, and all the pairs of black regions whose difference in the angle in the direction of the long axis falls within a predetermined range are extracted.

Figure 12B:
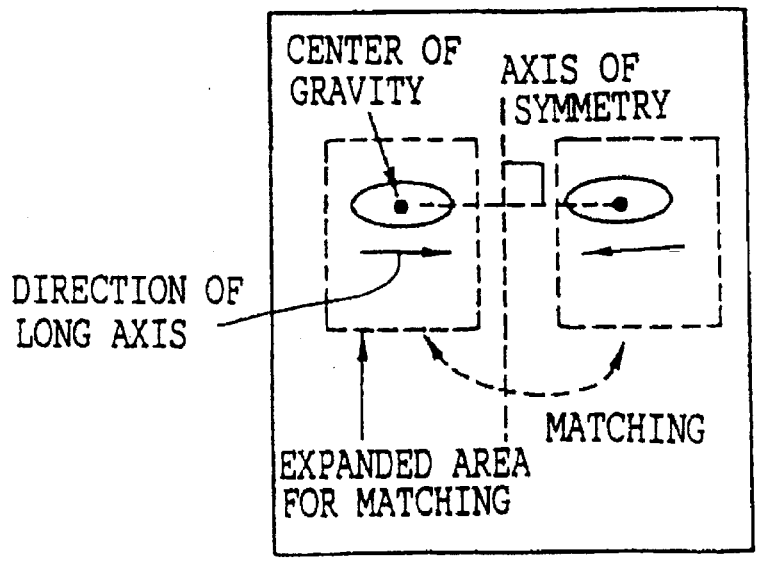
FIG. 12B is an image diagram explaining the determination of the similarity of axial symmetry of a pair of black regions, for illustrating the details of the consistency determination processing based on the facial structure.

In an ensuing Step 218, a determination is made as to whether or not there has been any pair of black regions which can be candidates for the pair of eyes as a result of the above-described extraction processing. If YES is the answer in the determination in Step 218, the operation proceeds to Step 220, in which an axis of symmetry which is perpendicular to a line connecting the centers of gravity of the two black regions is set for each pair of black regions extracted in Step 216, as shown in FIG. 12B, and an expanded area for matching is set centering on each black area. Then, in Step 222, the similarity of axial symmetry of the pair of black regions is determined. In an ensuing Step 224, on the basis of the result of determination of the similarity of axial symmetry of each pair of black regions, a determination is made on the probability of each pair of black regions being a pair of black regions representing the pair of eyes, so as to determine whether or not there is a pair of black regions which can be determined to be the pair of blacks regions corresponding to the pair of eyes among the pairs of black regions extracted in Step 216.

If NO is the answer in the determination in Step 224, the operation proceeds to Step 227. On the other hand, if YES is the answer in the determination in Step 224, the pair of black regions determined to have the highest probability of being a pair of black regions representing the pair of eyes of a human figure is regarded as the pair of black regions corresponding to the pair of eyes of a human figure. Then, in Step 226, a weighting factor with a positive sign is imparted to the face candidate region fetched in Step 210. This weighting factor can be set such that its value becomes higher as the similarity of axial symmetry of the pair of black regions becomes higher, on the basis of the pair of blacks regions determined to have the highest probability of being the pair of black regions representing the pair of eyes of a human figure. After the processing in Step 226 is executed, the operation proceeds to Step 228.

On the other hand, if NO is the answer in the determination in Step 218 or Step 224, this is the case in which the pair of black regions having a high probability of being the pair of black regions representing the pair of eyes of a human figure was not detected with respect to the face candidate region fetched in Step 210. Therefore, in Step 227, a weighting factor with a negative sign is imparted to that face candidate region, and the operation proceeds to Step 228.

In Step 228, a determination is made as to whether or not the above processing has been carried out with respect to all the face candidate regions. If a plurality of face candidate regions have been set, NO is given as the answer in the determination in Step 228. Hence, Steps 210 to 228 are repeated until YES is given as the answer in the determination in Step 228, and a weighting factor with a positive or negative sign is imparted to all the face candidate regions, depending on the presence or absence of the detected pair of black regions having a high probability of being the pair of black regions representing the pair of eyes of a human figure. This weighting factor corresponds to the consistency (i.e., probability) as a region corresponding to the face of a human figure with respect to each face candidate region. If YES is given as the answer in the determination in Step 228, the consistency evaluation processing based on the internal structure of the face ends, and the operation proceeds to Step 112 in the flowchart shown in FIG. 2.

Figure 7A:
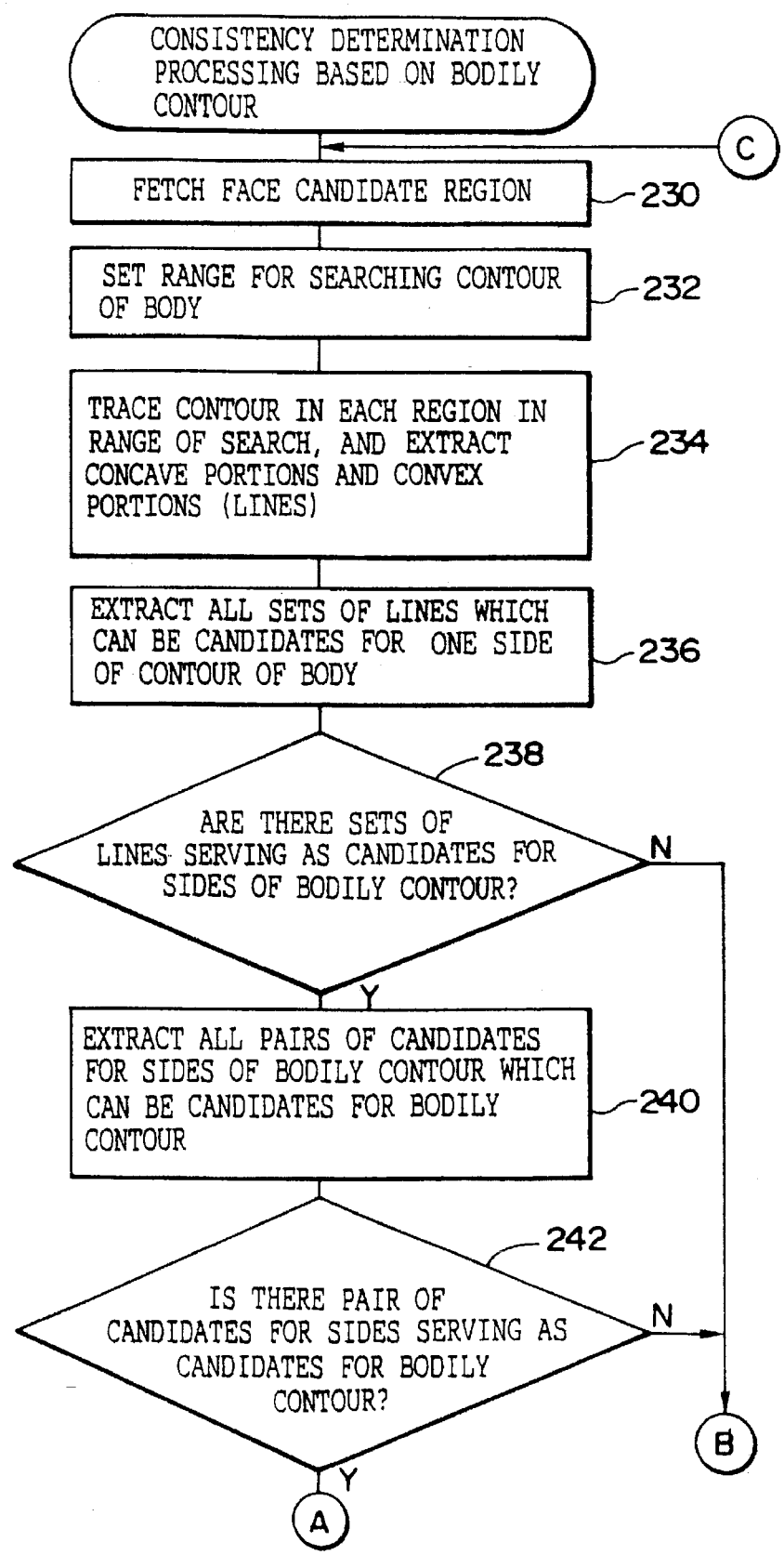
FIGS. 7A and 7B are flowcharts illustrating consistency determination processing based on a bodily contour.
Figure 7B:
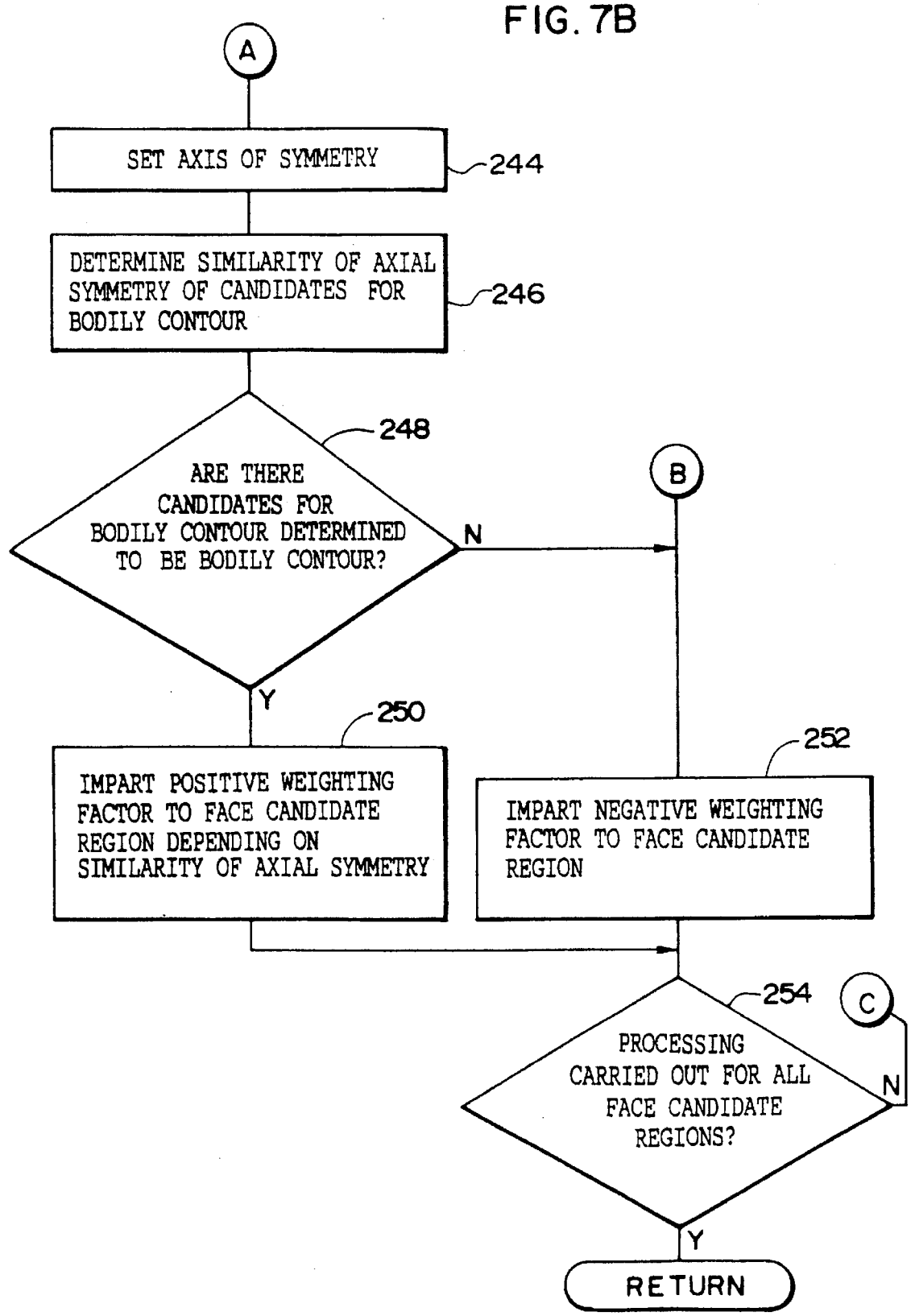

In Step 112, the consistency evaluation processing based on the bodily contour is carried out. In this processing, a shape pattern representing the contour of the body or trunk of a human figure (more specifically, a contour continuing from the neck to each shoulder of the human figure, and from each shoulder to an arm portion or to a lower portion of the body) is searched as a shape pattern (a second shape pattern) peculiar to the body as a second portion of a human figure, so as to determine a face candidate region having a high probability of being a region corresponding to the face of a human figure. Hereafter, a description will be given with reference to the flowchart shown in FIGS. 7A and 7B.

Figure 13A:
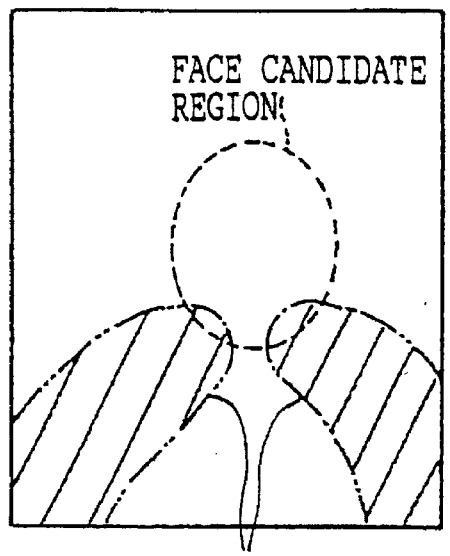
FIG. 13A is an image diagram explaining the setting of a range for searching a bodily contour, for illustrating the details of the consistency determination processing based on the bodily contour.

In Step 230, one of the face candidate regions is fetched. In Step 232, a range for searching the shape pattern representing the contour of the body is set in correspondence with the size and direction of the face candidate region fetched in Step 232 as well as the positional relationship between the face of a human figure and the second portion (the contour of the body). For example, if the fetched face candidate region is in the range surrounded by the broken line in FIG. 13A, it can be estimated that a shape pattern representing the contour of the body (here, a contour continuing from the neck to each shoulder of the human figure, and from each shoulder to an arm portion or to a lower portion of the body) is present with respect to this face candidate region. Thus, the ranges shown by hatching in FIG. 13A are set as the ranges of search.

Figure 13B:
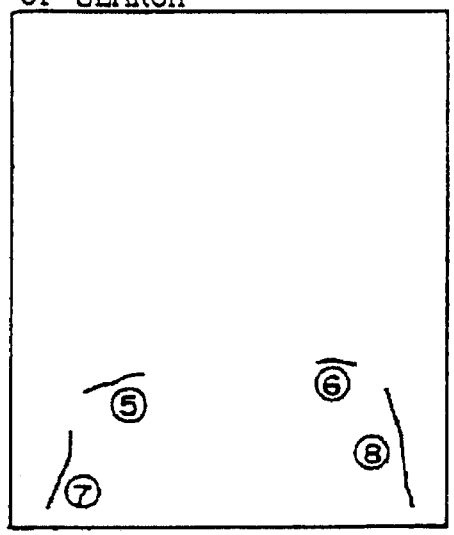
FIG. 13B is an image diagram explaining the extraction of a concave portion and a convex portion, for illustrating the details of the consistency determination processing based on the bodily contour.

In an ensuing Step 234, with respect to regions which are present in the aforementioned ranges of search among the multiplicity of regions extracted by binarization, the contours of the respective regions are traced, the curvatures of the contours are calculated, and concave portions and convex portions (lines) are extracted, in the same way as in Steps 174 and 176 of the flowchart shown in FIG. 4. As a result, with respect to the original image shown in, for example, FIG. 8A, a multiplicity of lines, including lines indicated at ⑤ to ⑧ in FIG. 13B, are extracted as lines which are present in the ranges of search shown in FIG. 13A.

Figure 13C:
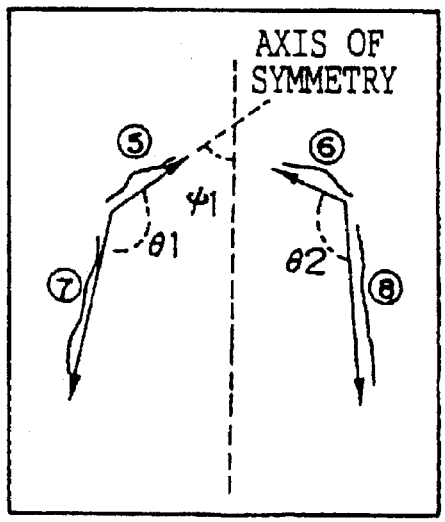
FIG. 13C is an image diagram explaining the determination of the similarity of axial symmetry, for illustrating the details of the consistency determination processing based on the bodily contour.

In Step 236, all the sets of lines which can be candidates for one side of the contour of the body are extracted. Specifically, pairs of lines in which the distance between end points of both lines is short, and in which an angle of intersection between both lines falls within a predetermined range are searched, and all the sets of lines which conform to the above-mentioned conditions are extracted as sets of lines which can be candidates for one side of the contour of the body. For example, in a case where lines such as those shown in FIG. 13B have been extracted, the set of lines ⑤ and ⑦ and the set of lines ⑥ and ⑧ whose angles of intersection (θ1 and θ2) fall within a predetermined range are extracted, respectively, as shown in FIG. 13C. In addition, with respect to the extracted sets of lines, both lines are extended and are connected to each other, and candidates for sides of the contour of the body are generated.

In Step 238, a determination is made as to whether or not sets of lines which can be candidates for sides of the contour of the body have been extracted. If YES is the answer in the determination in Step 238, the operation proceeds to Step 240. In Step 240, pairs of candidates for sides of the contour of the body, with their concave portions facing each other, are searched with respect to the candidates for sides of the contour of the body generated above. Then, all the pairs of candidates for sides which conform to the above condition are extracted as pairs of candidates for sides of the contour of the body which can be candidates for the contour of the body. In Step 242, a determination is made as to whether or not there has been a pair of candidates for sides which can be candidates for the contour of the body.

If YES is the answer in the determination in Step 242, the operation proceeds to Step 244, in which an axis of symmetry is set with respect to each of the pairs of candidates for sides of the contour of the body (candidates for the contour of the body) extracted in Step 240, as shown in FIG. 13C. In an ensuing Step 246, the similarity of axial symmetry of the candidates for the contour of the body is determined. In addition, with respect to lines estimated to correspond to the contour of a human figure extending from the neck to the shoulder (e.g., lines ⑤ and ⑥ in FIG. 13B), a determination is made as to whether or not an angle with respect to the axis of symmetry (e.g., $\phi 1$ in the case of line ⑤ in FIG. 13C) falls within a predetermined line.

In Step 248, on the basis of the result of determination of the similarity of axial symmetry, the probability of the respective candidates for the contour of the body being pairs of lines representing the contour of the body of a human figure is determined, and a determination is made as to whether or not there are candidates for the contour of the body which can be determined to be pairs of lines corresponding to the contour of the body, among the respective candidates for the contour of the body extracted in Step 240. If YES is the answer in the determination in Step 248, the candidates for the contour of the body which have been determined to have the highest probability of being a pair of lines representing the contour of the body of a human figure are regarded as lines corresponding to the contour of the body of a human figure. Thus, in an ensuing Step 250, a weighting factor with a positive sign is imparted to the face candidate region fetched in Step 230. This weighting factor can be set such that its value becomes higher as the similarity of axial symmetry of the candidates for the contour of the body becomes higher, on the basis of the pair of lines (candidates for the contour of the body) determined to have the highest probability of being the pair of lines representing the contour of the body of a human figure. After the processing in Step 250 is executed, the operation proceeds to Step 254.

On the other hand, if NO is the answer in the determination in Step 238, Step 242, or Step 248, this is the case in which the pair of lines having a high probability of being the pair of lines representing the contour of the body of a human figure was not detected with respect to the face candidate region fetched in Step 230. Therefore, in Step 252, a weighting factor with a negative sign is imparted to that face candidate region, and the operation proceeds to Step 254.

In Step 254, a determination is made as to whether or not the above processing has been carried out with respect to all the face candidate regions. If a plurality of face candidate regions have been set, NO is given as the answer in the determination in Step 254. Hence, Steps 230 to 254 are repeated until YES is given as the answer in the determination in Step 254, and a weighting factor with a positive or negative sign is imparted to all the face candidate regions, depending on the presence or absence of the detected pair of lines having a high probability of being the pair of lines representing the contour of the body of a human figure. This weighting factor corresponds to the consistency (i.e., probability) as a region corresponding to the face of a human figure with respect to each face candidate region. If YES is given as the answer in the determination in Step 254, the consistency evaluation processing based on the bodily contour ends, and the operation proceeds to Step 118 in the flowchart shown in FIG. 2.

In Step 118, an overall determination of the facial region is made. That is, weighting factors respectively imparted in Steps 108 to Steps 122 to the face candidate regions set in Step 106 are totalized (or the weighting factors imparted in the respective steps of processing are multiplied separately for the positivity and negativity of the sign, and are then added), so as to calculate an overall weighting factor of the face candidate regions. Then, a region having the highest overall weighting factor is determined as being a region having the highest probability of being a region corresponding to the facial region of a human figure.

In an ensuing Step 120, a determination is made as to whether or not the processing in Steps 102 to 118 has been executed a predetermined number of times. If NO is the answer in the determination in Step 120, values of various parameters (a threshold used for binarization, the length of a vector for calculating the curvature of the contour (see FIG. 8C), and the like) are varied in Step 122, and the processing in and after Step 102 is executed again. In addition, in Step 122, various control parameters may be varied so as to change the relative fineness of the division of the image in Step 102. After the processing in Steps 102 to 118 is executed the predetermined number of times, YES is given as the answer in the determination in Step 120, and the operation proceeds to Step 124.

In Step 124, on the basis of the facial regions determined in the predetermined number of times of processing and the weighting factors respectively imparted thereto, a region having the highest probability of being a region corresponding to the facial region of a human figure is finally decided in the same way as in Step 118 described earlier. Then, in an ensuing Step 126, the photometric data on R, G, and B of the finally decided region is outputted as a result of determination, and the facial-region extraction processing ends.

In the above-described facial-region extraction processing, the face candidate region estimated to correspond to the face of a human figure is not judged on the basis of the density or color of that region. Accordingly, even if the color balance of that region should change depending on the type of the negative film 12 as well as photographing conditions such as the type of light source and the use of rear light, the result of the facial-region extraction processing does not change by being affected by them. In addition, the above-described facial-region extraction processing is also applicable to cases where the original image is a monochromatic image. Further, in the above-described facial-region extraction processing, each of the processing for detecting a shape pattern peculiar to each part of a human figure (part of the processing in Steps 106 to 112 in the flowchart shown in FIG. 2) is basically comprised of the extraction of various concave portions and convex portions and the determination of the similarity of axial symmetry. Therefore, if software and hardware are provided with common parts by making use of this feature, it is possible to simplify the software and realize a simplified hardware configuration.

In addition, as described above, the ranges subject to processing are limited by performing the non-human area exclusion processing, and after the setting of the face candidate regions on the basis of a shape pattern representing the contour of the head of a human figure, searches are made of a shape pattern representing the contour of the face, a shape pattern representing the internal structure of the face, and a shape pattern representing the contour of the body, which are present in the ranges of search set in correspondence with the face candidate regions. Therefore, as compared with a case where a search is made of each shape pattern with respect to the overall image, the processing time can be reduced, and it is possible to extract at high speed a region having a high probability of being a region corresponding to the face of a human figure.

Meanwhile, the exposure-amount calculating unit 44 calculates an appropriate exposure amount $E_i$ in accordance with the formula below, by using the photometric data on R, G, and B extracted by the facial-region extracting unit 40 as described above and an image-plane average density $D_i$ (i=one of R, G, and B) of one frame calculated by the average-density calculating unit 42, and then the exposure-amount calculating unit 44 outputs the appropriate exposure amount $E_i$ to the driver 46. On the basis of the appropriate exposure amount $E_i$ the driver 46 moves the color compensating filter 18 to a position corresponding to the appropriate exposure amount.

$$\log E_i = LM_i \cdot CS_i \cdot (DN_i - D_i) + PB_i + LB_i + MB_i + NB_i + K_1 + K_2 \quad (1)$$

where the respective symbols mean as follows:

LM: coefficient of a magnification slope. This coefficient is set in advance in accordance with an enlarging magnification determined by the type of negative film and a print size.

CS: coefficient of a color slope. This coefficient is prepared for each type of negative film, and includes one for underexposure and another for overexposure. By determining whether the average density of an image frame to be printed is underexposed or overexposed relative to the density value of a standard negative, either a coefficient of a color slope for underexposure or one for overexposure is selected.

DN: density value of a standard negative.

D: density value of an image frame to be printed.

PB: correction balance value with respect to standard color paper. The correction balance value is determined in correspondence with the type of color paper.

LB: correction balance value with respect to a standard printing lens. This correction balance value is determined in correspondence with the type of lens used in printing.

MB: correction value (master balance value) with respect to fluctuations in the quantity of light from a light source and a change in the developing performance of the paper.

NB: negative balance (color balance) determined by the characteristics of the negative film.

$K_2$: color correction amount $K_1$: density correction amount expressed by the following formula:

$$Ka \left\{ \frac{D_R + D_G + D_B}{3} - \frac{FD_R + FD_G + FD_B}{3} \right\} + Kb$$

where Ka and Kb are constants, and FD is an average density of a facial region.

Alternatively, the density correction amount $K_1$ in Formula (1) above may be set as a correction value determined by a film inspecting apparatus, and the color correction amount $K_2$ may be expressed as shown below by using the average density of a facial region.

$$(K_2)_i = Kc \left\{ \left( FD_i - \frac{FD_R + FD_G + FD_B}{3} \right) - \left( DN_i - \frac{DN_R + DN_G + DN_B}{3} \right) \right\}$$

where Kc is a constant.

Furthermore, the density correction amount $K_1$ and the color correction amount $K_2$ in Formula (1) above may be set as correction values determined by the film inspection apparatus, and the image-plane average density $D_i$ of one frame in Formula (1) may be replaced by the average density $FD_i$ of a facial region, so as to determine an exposure amount.

In addition, although, in the above, a description has been given of the example in which a pair of eyes is used as a shape pattern representing the internal structure of the face, the present invention is not limited to the same. For instance, a face candidate region may be set by alternatively using a nose, a mouth, a pair of eyebrows, or the like, or comprehensively by combining them.

Further, although, in the above, a description has been given of the example in which pairs of lines corresponding to a contour continuing from the neck to each shoulder of the human figure, and from each shoulder to an arm portion or to a lower portion of the body are detected, the present invention is not limited to the same. For instance, pairs of lines corresponding to the contour from the neck to each shoulder of the human figure and pairs of lines corresponding to the contour from each shoulder of the human figure to an arm portion may be separately detected, respectively.

In addition, although, in the above, a description has been given of the example in which a shape pattern representing the contour of the head of a human figure is used as a first shape pattern, and a shape pattern representing the contour of the face of a human figure, a shape pattern representing the internal structure of the face of a human figure, and a shape pattern representing the structure of the body of a human figure are used as second shape patterns, the present invention is not limited to the same. For instance, a plurality of shape patterns, such as a shape pattern representing the contour of the head of a human figure and a shape pattern representing the internal structure of the face, may be used as the first shape patterns.

Although the first embodiment has been described above, the above-described embodiment further includes the following aspects of embodiment of technical matters.

(1) The search of a shape pattern representing the contour of the head of a human figure as a first shape pattern or a second shape pattern includes: detecting concave portions and convex portions from contours of regions divided according to the above-described third aspect of the present invention or from a center line of an edge obtained according to the above-described fourth aspect of the present invention; and determining whether or not at least one concave or convex portion thus detected corresponds to the contour of the head of a human figure, on the basis of characteristic quantities (the degree of a circular curve, position, size, and direction) of the at least one concave or convex portion.

(2) The search of a shape pattern representing the contour of the face of a human figure as a first shape pattern or a second shape pattern includes: detecting concave portions and convex portions from contours of the regions divided according to the above-described third aspect of the present invention or from a center line of an edge obtained according to the above-described fourth aspect of the present invention; and determining whether or not at least two concave and/or convex portions thus detected correspond to the contour of the face of a human figure according to the degree of axial symmetry, on the basis of the relationships of characteristic quantities (the degree of a circular curve, position, size, and direction) of the at least two concave and/or convex portions.

(3) The search of a shape pattern representing a pair of eyes among shape patterns representing the contour of the facial structure of a human figure as a first shape pattern or a second shape pattern includes: extracting elliptical regions from among regions divided according to the above-described third aspect of the present invention or from among regions divided by a center line of an edge obtained according to the above-described fourth aspect of the present invention; detecting a pair of elliptical regions whose similarity is greater than or equal to a predetermined value, on the basis of matching processing using characteristic quantities (shape, density) of the detected plurality of elliptical regions; and determining whether or not the pair of elliptical regions corresponds to a pair of eyes of the face of a human figure, according to the degree of axial symmetry of the detected pair of elliptical regions.

(4) The search of a shape pattern representing the contour of the body of a human figure as a first shape pattern or a second shape pattern includes: detecting concave portions and convex portions from contours of regions divided according to the above-described third aspect of the present invention or from a center line of an edge obtained according to the above-described fourth aspect of the present invention; detecting a plurality of sets of concave or convex portions corresponding to a contour continuing from the neck to each shoulder of the human figure and a contour from each shoulder to an arm portion or to a lower portion of the body, on the basis of the relationships of characteristic quantities (the degree of a circular curve, position, size, and direction) of at least two concave and/or convex portions;

and determining whether or not the sets of concave or convex portions thus detected correspond to the contour of the body of a human figure according to the degree of axial symmetry of the sets.

(5) Of the regions divided according to the above-described third aspect of the present invention or the regions divided by a center line of an edge obtained according to the above-described fourth aspect of the present invention, the following regions are excluded as regions having a low probability of corresponding to a human figure in an original image: a region in which the ratio of a linear portion occupied in the contour of the region is greater than or equal to a predetermined value; a region whose axial symmetry is less than or equal to a predetermined value; a region in which the number of concave and/or convex portions is greater than or equal to a predetermined value; a region whose ratio of contact with an outer edge of the image is greater than or equal to a predetermined value; a region whose contrast in the density within the region is less than or equal to a predetermined value; and a region whose density changes with a predetermined pattern or whose density shows a repetition of a predetermined pattern of change.

Next, a description will be given of a second embodiment. This embodiment is carried out by the apparatus shown in FIG. 1 referred to in the above-described first embodiment. However, the processing executed by a CPU 41 of the apparatus differs from that executed according to the first embodiment. Accordingly, a description will be given of the second embodiment by referring to FIG. 1, as necessary.

Referring to the flowchart shown in FIG. 15, a description will be given of the facial-region extraction processing which is executed by the CPU 41 of the facial-region extracting unit 40. Since Steps 1000 and 1020 are the same as Steps 100 and 102 in the first embodiment, a description thereof will be omitted.

Figure 16:
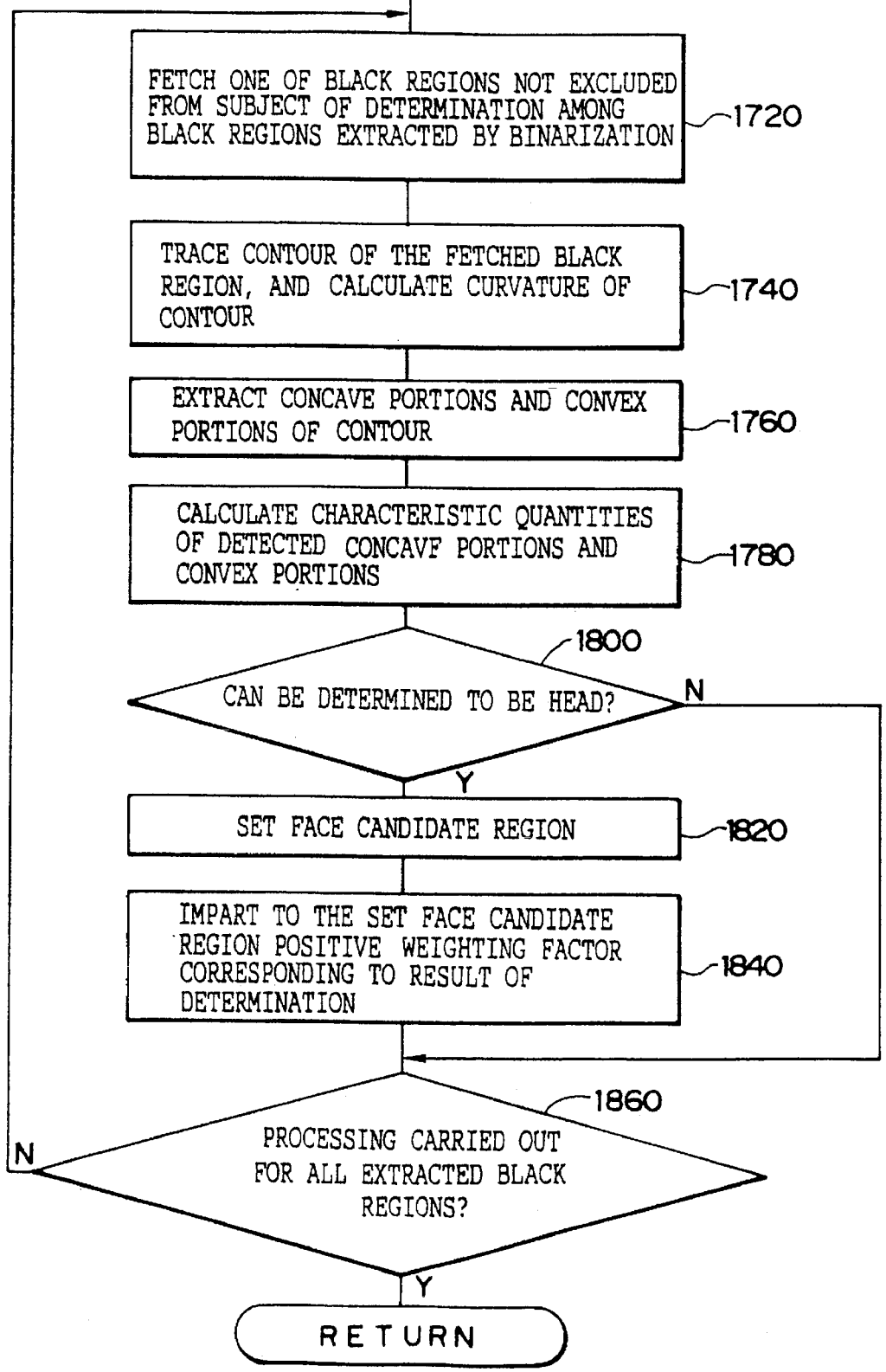
FIG. 16 is a flowchart illustrating the face-candidate-region setting processing based on the extraction of the head in accordance with the second embodiment.

In an ensuing Step 1040, face-candidate-region setting processing based on the extraction of the head is carried out. A description will be given of this processing by referring to the flowchart shown in FIG. 16. In Step 1720, one of the plurality of black regions which were extracted by the binarization described earlier is fetched. Since, in Steps 1740 to 1800, the same processing as that in Steps 174 to 180 used in the first embodiment, a description thereof will be omitted.

It should be noted that, in Step 1780, the shape pattern is a partial shape pattern described in the 11th aspect of the present invention. However, a figure subject to extraction in this case is a human figure.

Then, if YES is the answer in the determination in Step 1800, since in a boundary portion between the hair and the face of a human figure, the hair is formed in a concave shape in most cases, an elliptical region inscribing the concave portion is set as a face candidate region (a region estimated to correspond to the face of a human figure, i.e., a candidate region in which a particular portion (the face of a human figure) of a figure subject to extraction described in the 11th aspect of the present invention is estimated to be present) on the basis of the size of the concave portion of the contour of the black region and its central position. In Step 1840, a weighting factor with a positive sign is imparted to the face candidate region set above. This weighting factor can be set such that the weight becomes heavier as the evaluation becomes higher in accordance with the result of the above-described evaluation of the black region as the head of a human figure.

After Step 1840 is executed, the operation proceeds to Step 1860. On the other hand, if NO is the answer in the determination in Step 1800, the operation proceeds to Step 1860 without performing processing. In Step 1860, a determination is made as to whether or not the aforementioned processing has been effected with respect to all the black regions extracted by binarization. If NO is the answer in the determination in Step 1860, the operation returns to Step 1720 to repeat Steps 1720 to 1860. If YES is the answer in the determination in Step 1860, the face-candidate-region setting processing based on the extraction of the head ends, and the operation proceeds to Step 1060 in the flowchart shown in FIG. 15.

Figure 17:
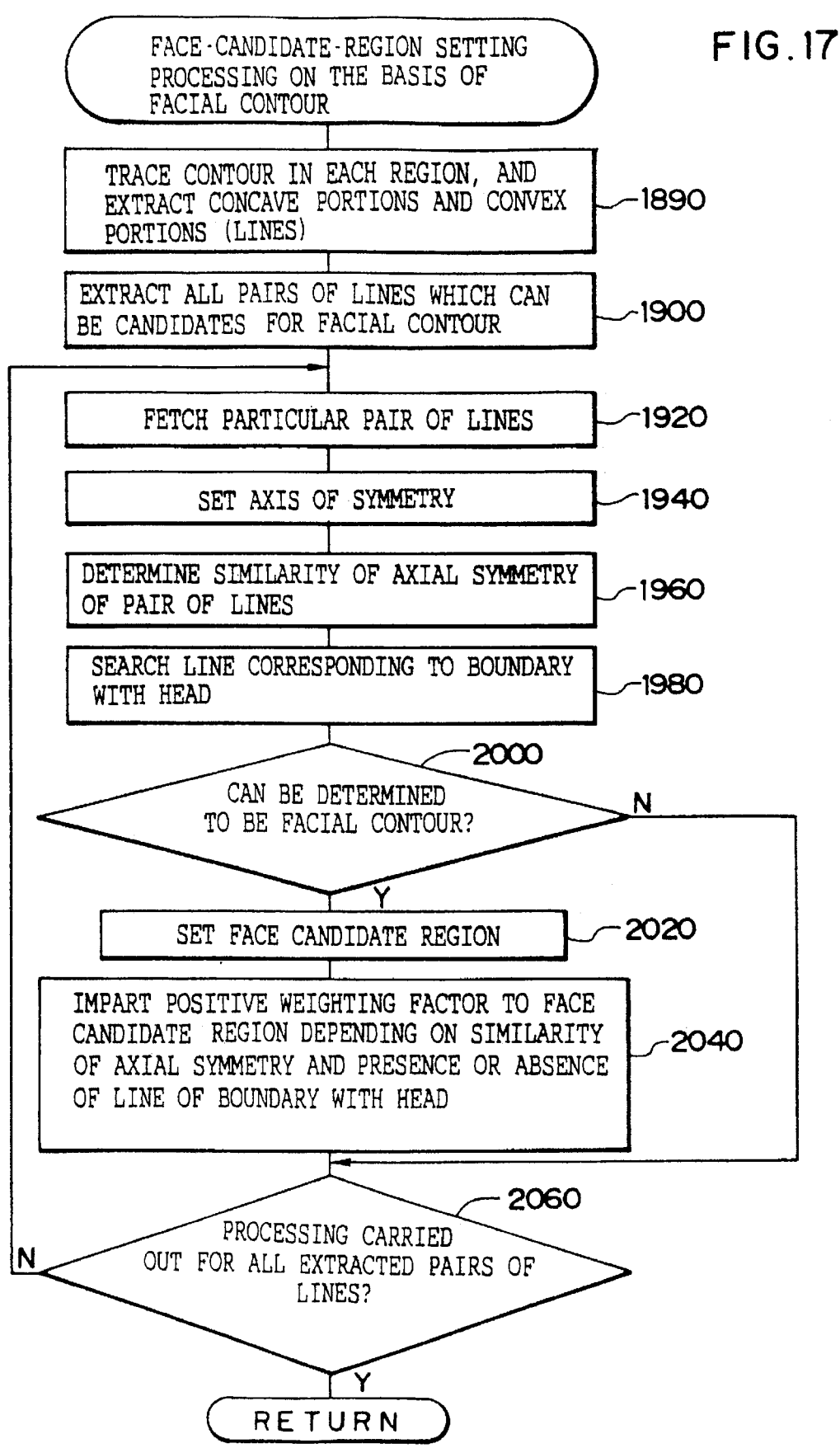
FIG. 17 is a flowchart illustrating the face-candidate-region setting processing based on the facial contour in accordance with the second embodiment.
Figure 21A:
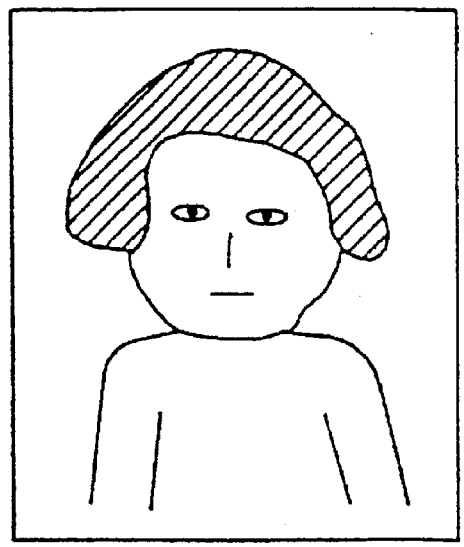
FIG. 21A is an image diagram explaining an original image for illustrating the details of the face-candidate-region setting processing based on the facial contour.
Figure 21B:
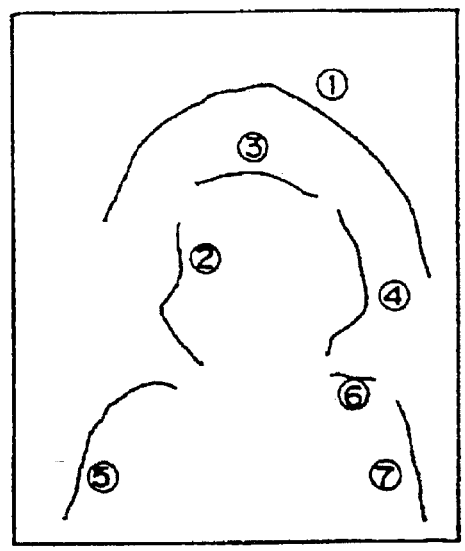
FIG. 21B is an image diagram explaining the extraction and division of a concave portion and a convex portion, for illustrating the details of the face-candidate-region setting processing based on the facial contour.

In Step 1060, the face-candidate-region setting processing based on the facial contour is carried out. A description will be given of this processing by referring to the flowchart shown in FIG. 17. In Step 1890, with respect to each of the plurality of black regions and white regions obtained by dividing the original image by binarization in Step 1020 in the flowchart shown in FIG. 15, the contours of the respective regions are traced, the curvatures of the contours are calculated, and concave portions and convex portions are extracted, in the same way as in Steps 1740 and 1760 of the flowchart shown in FIG. 16 explained before. As a result, with respect to an original image shown in, for example, FIG. 21A, concave portions and convex portions, such as those shown in FIG. 21B, are extracted.

In addition, after the concave portions and the convex portions have been extracted, by preferentially focusing attention on a curve having a long length among the curves extracted as the concave or convex portions, that curve may be further divided such that its curvature (angle θ) falls within a predetermined range, or the degree of a circular curve assumes a predetermined value or less, or by a rough classification of the angle of the normal direction of the curve. For example, in a case where both curves ② and ③ in FIG. 21B are extracted as a continuous curve, since their degrees of a circular curve are large, these two curves are further divided into two curves, respectively. In FIG. 21B, the curve ① is also subject to division. Hereafter, curves which are obtained by dividing the contour of each region extracted as described above will be generally referred to as "lines."

Figure 21C:
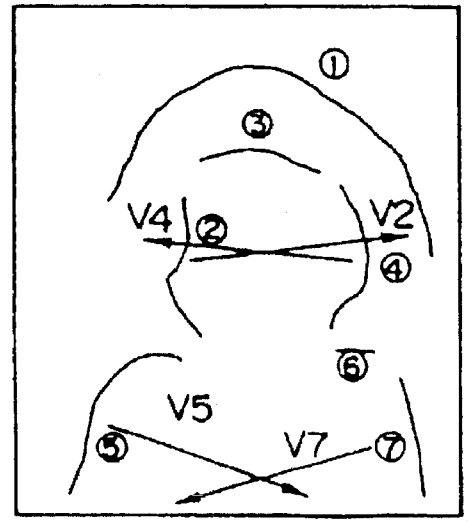
FIG. 21C is an image diagram explaining the extraction of pairs which can be candidates for the facial contour, for illustrating the details of the face-candidate-region setting processing based on the facial contour.

In Step 1900, as a shape pattern (a partial shape pattern described in the 11th aspect of the present invention) representing the contour of the face of a human figure, pairs of lines estimated to correspond to sides of the face of a human figure are extracted. Specifically, of the lines extracted above, all the pairs of lines having the following conditions are extracted as pairs of lines which can be candidates for the facial contour: Their directional vectors V are oriented toward each other; the magnitude of the angle of intersection between their directional vectors V (or their extension lines) is less than or equal to a predetermined value; and similarities in the length and the degree of a circular curve between them are greater than or equal to predetermined values. For instance, in a case where lines ① to ⑦ shown in FIG. 21B have been extracted, the pair of lines ② and ④ and the pair of lines ⑤ and ⑦ are extracted as pairs of lines which can be candidates for the facial contour, as shown in FIG. 21C. It should be noted that V2, V4, V5, and V7 denote directional vectors of the respective lines.

In an ensuing Step 1920, a particular pair of lines is fetched from the pairs of lines extracted above. In Step 1940, an axis of symmetry is set between the pair of lines. In an ensuing Step 1960, the similarity of axial symmetry of the pair of lines is determined. Since the determination of the similarity of axial symmetry is executed in the same way as in Step 202 in the first embodiment, a description of this step will be omitted.

Step 1980 is executed in the same way as Step 204 in the first embodiment. Incidentally, in this Step 1980, with respect to the pair of lines ⑤ and ⑦, since a range 52B shown in FIG. 11B in the first embodiment is searched as the position corresponding to a boundary with the head, so that a line corresponding to the boundary with the head is not extracted.

Figure 22:
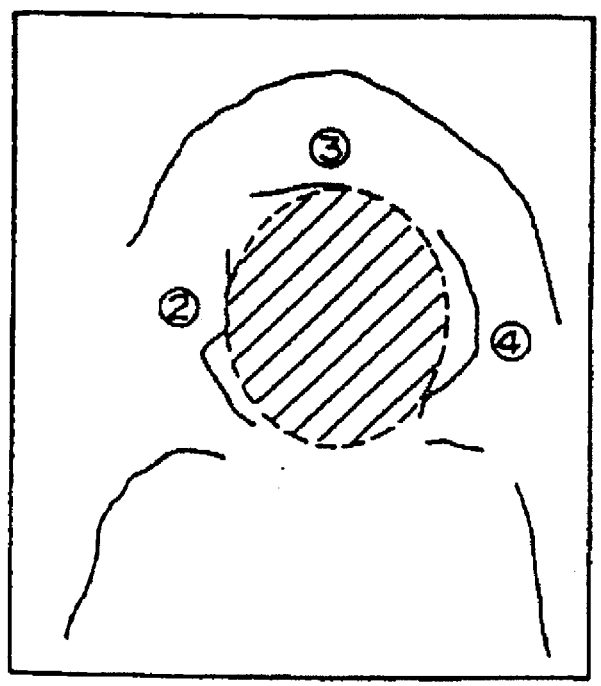
FIG. 22 is an image diagram explaining the setting of a face candidate region, for illustrating the details of the face-candidate-region setting processing based on the facial contour.

In an ensuing Step 2000, a determination is made as to whether or not the pair of lines fetched in Step 1920 can be determined to be the pair of lines corresponding to the facial contour, on the basis of the result of determination of the above-described similarity of axial symmetry. If YES is the answer in the determination in Step 2000, the pair of lines is regarded as the lines corresponding to the sides of the face of a human figure. Hence, as is also shown in FIG. 22, an elliptical face candidate region (a face candidate region in which a particular portion of the figure subject to extraction described in the 11th aspect of the present invention is estimated to be present) of a size corresponding to the composite length v of the two lines and the interval h between the two lines is set in the region located between the pair of lines in FIG. 10D.

In Step 2020, a weighting factor with a positive sign is imparted to the face candidate region set above. This weighting factor can be set such that its value becomes higher as the similarity of axial symmetry of that pair of lines becomes higher, and such that the value becomes high when a line corresponding to the boundary with the head is extracted. After the processing of Step 2020 is executed, the operation proceeds to Step 2060. On the other hand, if NO is the answer in the determination in Step 2000, the operation proceeds to Step 2060 without performing processing.

In Step 2060, a determination is made as to whether or not the above processing has been carried out for all the pairs of lines extracted in Step 1900. If NO is the answer in the determination in Step 2060, the operation returns to Step 1920 to repeat Steps 1920 to 2060. If YES is given as the answer in the determination in Step 2060, the face-candidate-region setting processing based on the facial contour ends, and the operation proceeds to Step 1080 in the flowchart shown in FIG. 15.

Figure 18:
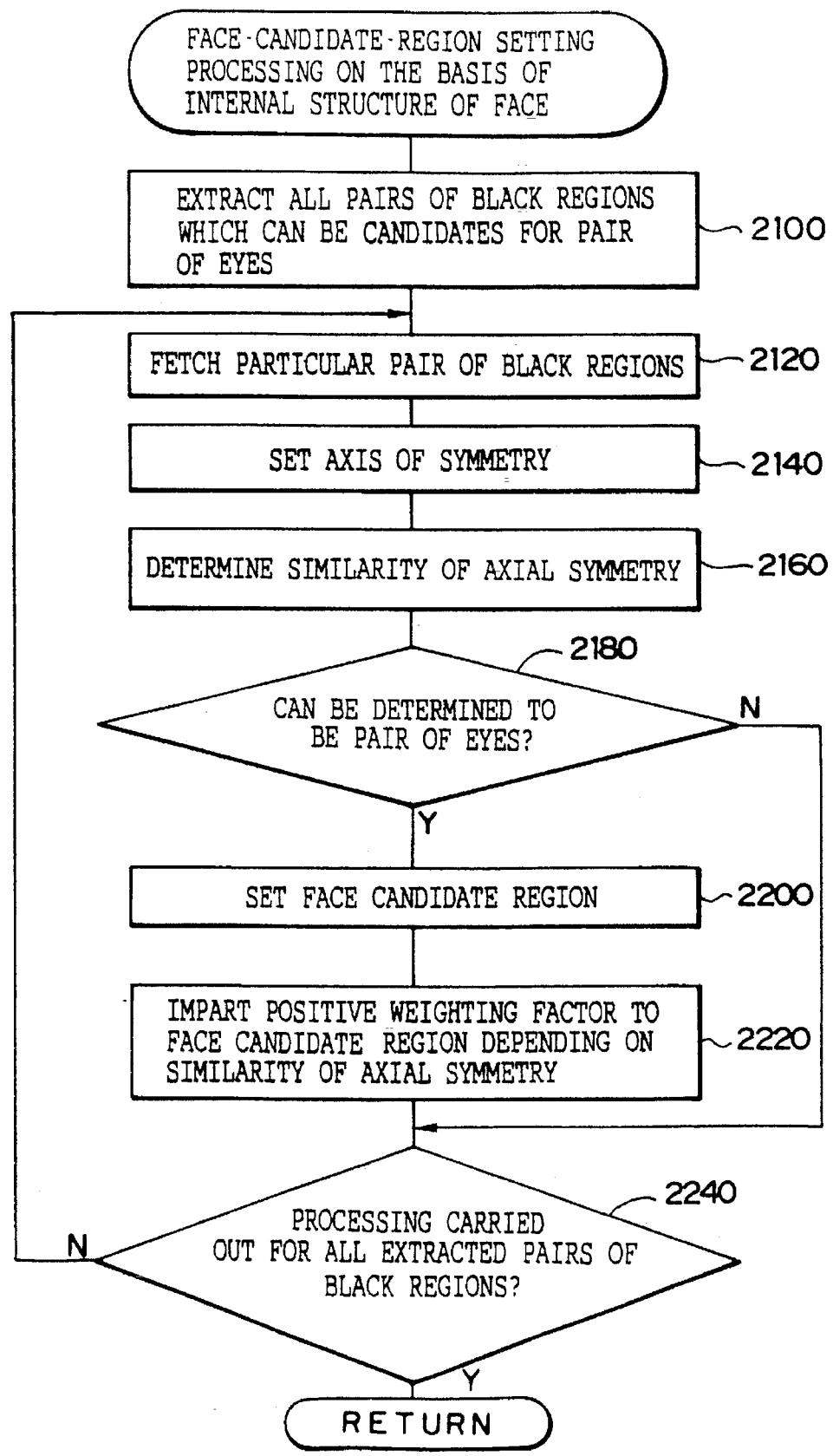
FIG. 18 is a flowchart illustrating the face-candidate-region setting processing based on the internal structure of the face in accordance with the second embodiment.
Figure 23A:
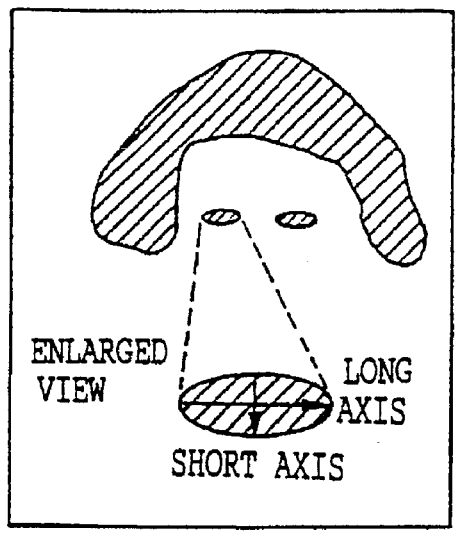
FIG. 23A is an image diagram explaining the extraction of black regions which can be candidates for the eyes, for illustrating the details of the face-candidate-region setting processing based on the facial structure.

In Step 1080, the face-candidate-region setting processing based on the internal structure of the face is carried out. A description will be given of this processing by referring to the flowchart shown in FIG. 18. In this embodiment, as a shape pattern (a partial shape pattern described in the 11th aspect of the present invention) representing the internal structure of the face of a human figure, a pair of black regions estimated to correspond to a pair of eyes in the face is extracted. That is, in Step 2100, of the black regions obtained by the binarization explained above, those pairs of black regions which can be candidates for the pair of eyes are extracted. In the extraction of the pairs of black regions, among the black regions, a plurality of elliptical black regions whose ratio (ratio between the long axis and the short axis) between the dimension in the longitudinal direction (the direction of the long axis) and the dimension in the widthwise direction (the direction of the short axis falls within a predetermined range as shown in FIG. 23A, are first extracted. Then, the angle in the direction of the long axis is determined on the basis of the primary moment of inertia of each of the black regions searched, and the pairs of black regions whose difference in the angle in the direction of the long axis falls within a predetermined range are extracted as pairs of black regions which can be candidates for the pair of eyes.

In Step 2120, a particular pair of black regions is fetched from the pairs of black regions extracted above. In an ensuing Step 2140, an axis of symmetry which is perpendicular to a line connecting the centers of gravity of the two black regions is set, as shown in FIG. 12B referred to in the first embodiment, and an expanded area for matching is set centering on each black area. Then, in Step 2160, the similarity of axial symmetry of the pair of black regions is determined. In an ensuing Step 2180, on the basis of the result of determination of the similarity of axial symmetry of the pair of black regions determined above, a determination is made as to whether or not the pair of black regions fetched in Step 2120 can be determined to be the pair of eyes.

Figure 23B:
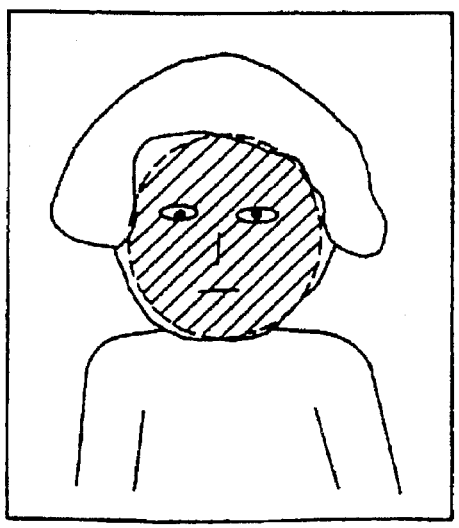
FIG. 23B is an image diagram explaining the setting of a face candidate region, for illustrating the details of the face-candidate-region setting processing based on the facial structure.

If YES is the answer in the determination in Step 2180, the operation proceeds to Step 2200 to set an elliptical face candidate region (a candidate region in which a particular portion of the figure subject to extraction described in the 11th aspect of the present invention is estimated to be present) on the basis of the positions of the black regions, their sizes, and the direction of the axis of symmetry, as shown in FIG. 23B. In an ensuing Step 2220, a weighting factor with a positive sign is imparted to the face candidate region set above. This weighting factor can be set such that its value becomes higher as the similarity of axial symmetry becomes higher. After the processing of Step 2220 is executed, the operation proceeds to Step 2240. On the other hand, if NO is the answer in the determination in Step 2180, the operation proceeds to Step 2240 without performing processing.

In Step 2240, a determination is made as to whether or not the above processing has been carried out for all the pairs of black regions extracted in Step 2100. If NO is the answer in the determination in Step 2240, the operation returns to Step 2120 to repeat Steps 2120 to 2240. If YES is the answer in the determination in Step 2240, the face-candidate-region setting processing based on the internal structure of the face ends, and the operation proceeds to Step 1100 in the flowchart shown in FIG. 15.

Figure 19:
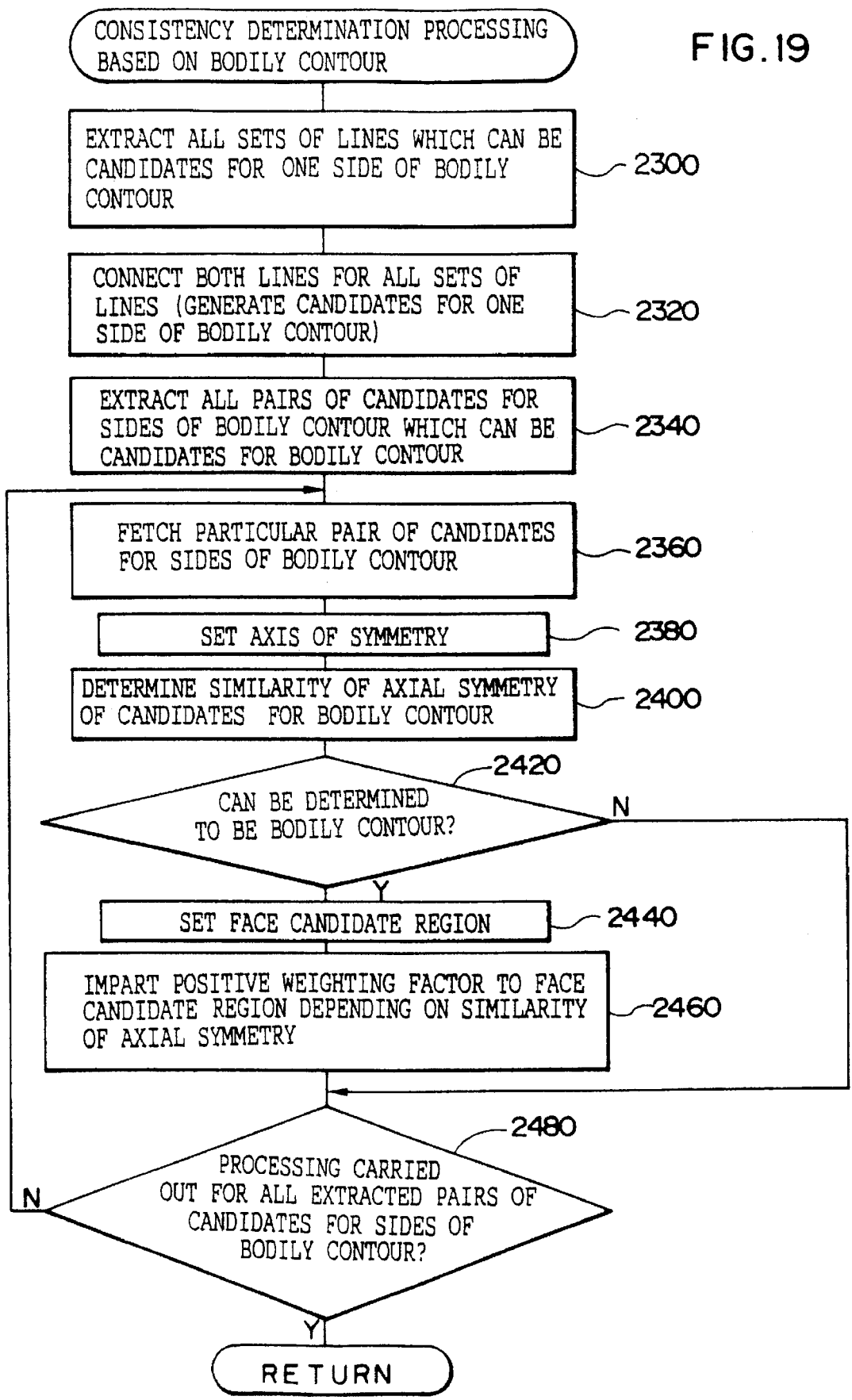
FIG. 19 is a flowchart illustrating the face-candidate-region setting processing based on the bodily contour in accordance with the second embodiment.
Figure 24A:
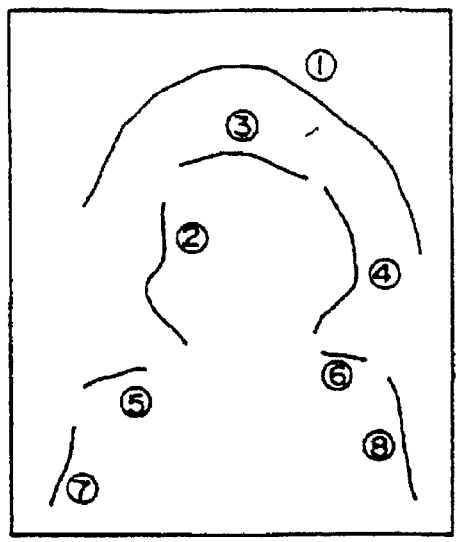
FIG. 24A is an image diagram illustrating lines extracted in preprocessing, and show details of the face-candidate-region setting processing based on the bodily contour.

In Step 1100, the face-candidate-region setting processing based on the bodily contour is carried out. A description will be given of this processing by referring to the flowchart shown in FIG. 19. In this embodiment, a pair of lines estimated to correspond to a contour continuing from the neck to each shoulder of the human figure, and from each shoulder to an arm portion or to a lower portion of the body is extracted as a shape pattern (a partial shape pattern described in the 11th aspect of the present invention) representing the contour of the body. That is, in Step 2300, sets of lines which can be candidates for one side of the contour of the body are extracted from the lines extracted by the face-candidate-region setting processing based on the facial contour explained above. Specifically, pairs of lines in which the distance between end points of both lines is short, and in which an angle of intersection between both lines falls within a predetermined range can be extracted as sets of lines which can be candidates for one side of the contour of the body. For example, in a case where lines such as those shown in FIG. 24A have been extracted, the set of lines ⑤ and ⑦ and the set of lines ⑥ and ⑧ whose angles of intersection (θ1 and θ2) fall within a predetermined range are extracted, respectively, as shown in FIG. 13B referred to in the first embodiment.

In an ensuing Step 2320, with respect to each of the sets of lines extracted above, both lines are extended and are connected to each other, and candidates for sides of the contour of the body are generated. Then, in Step 2340, all the pairs of candidates for sides of the contour of the body, which can be candidates for the bodily contour, (e.g., pairs in which both concave portions of the candidates for sides of the bodily contour face each other) are extracted from the candidates for sides of the bodily contour generated above.

In Step 2360, a particular pair is fetched from the candidates for sides of the bodily contour extracted above. In Step 2380, an axis of symmetry is set with respect to the fetched pairs of candidates for sides of the contour of the body, as shown in FIG. 13C referred to in the first embodiment. In an ensuing Step 2400, the similarity of axial symmetry of the pair of candidates for sides of the bodily contour is determined. In addition, with respect to lines estimated to correspond to the contour of a human figure extending from the neck to the shoulder (e.g., lines ⑤ and ⑥ in FIG. 13B), a determination is made as to whether or not an angle with respect to the axis of symmetry (e.g., $\phi1$ in the case of line ⑤ in FIG. 13C) falls within a predetermined line. In Step 2420, on the basis of the result of determination of the similarity of axial symmetry determined above, a determination is made as to whether or not the pair of candidates for sides of the bodily contour can be determined to be the contour of the bodily contour.

Figure 24B:
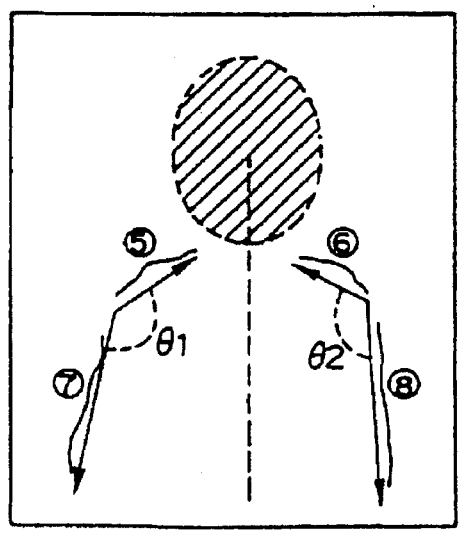
FIG. 24B is an image diagram explaining the setting of a face candidate region.

If YES is the answer in the determination in Step 2420, the operation proceeds to Step 2440 to set an elliptical face candidate region (a candidate region in which a particular portion of the figure subject to extraction described in the 11th aspect of the present invention is estimated to be present) on the basis of the positions of the candidates for sides constituting candidates for the bodily contour, their sizes, the distance between them, and the direction of the axis of symmetry, as shown in FIG. 24B. In Step 2500, a weighting factor with a positive sign is imparted to the face candidate region set above. This weighting factor can be set such that its value becomes higher as the similarity of axial symmetry determined in Step 2400 becomes higher. After the processing of Step 2400 is completed, the operation proceeds to Step 2480. On the other hand, if NO is the answer in the determination in Step 2420, the operation proceeds to Step 2480 without performing processing.

In Step 2480, a determination is made as to whether or not the above processing has been carried out for all the pairs of candidates for sides of the bodily contour extracted in Step 2340. If NO is the answer in the determination in Step 2480, the operation returns to Step 2360 to repeat Steps 2360 to 2480. If YES is the answer in the determination in Step 2480, the face-candidate-region setting processing based on the bodily contour ends, and the operation proceeds to Step 1120 in the flowchart shown in FIG. 15.

Figure 15:
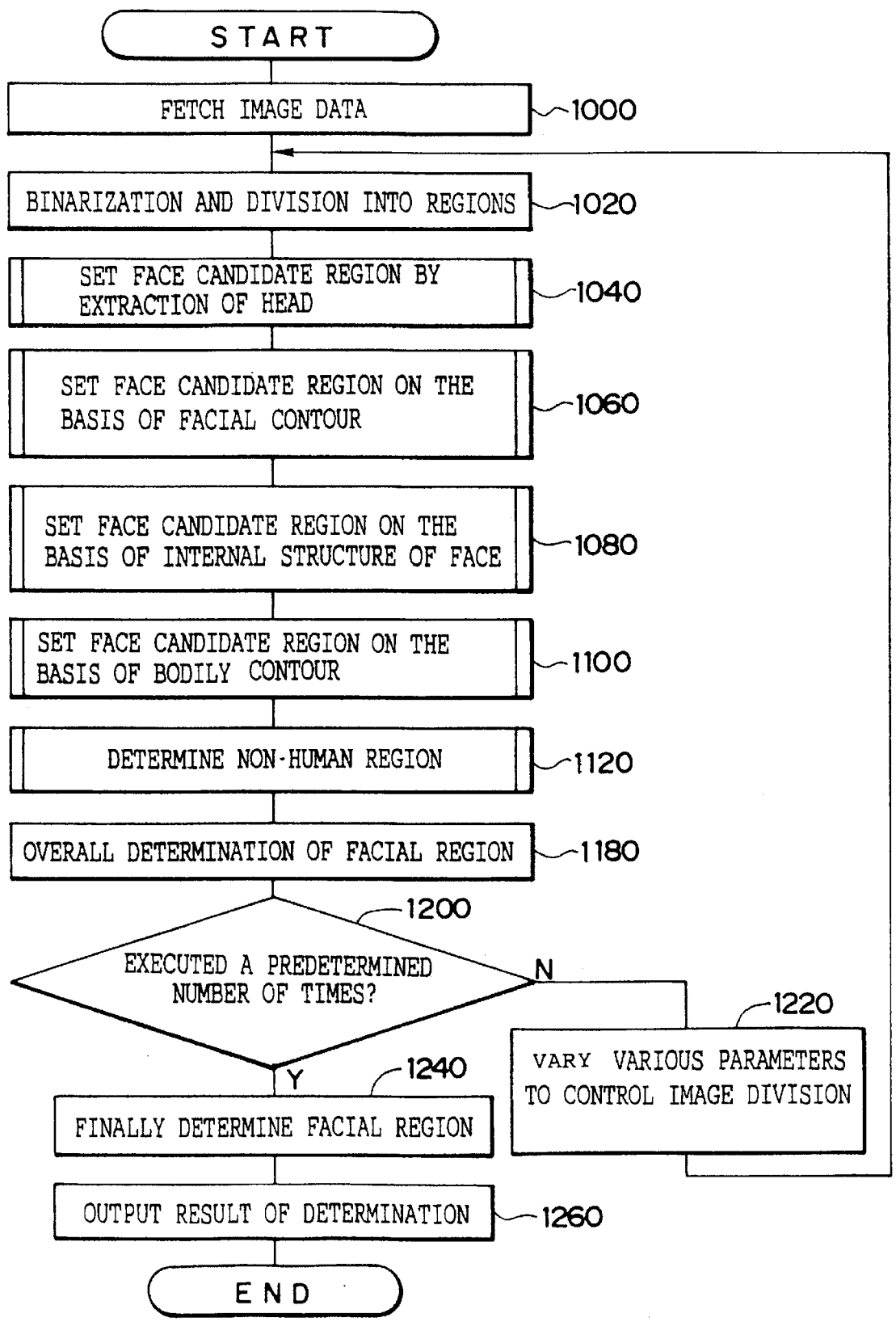
FIG. 15 is a flowchart illustrating a main routine of the facial-region extraction processing which is executed by a facial-region extracting unit in accordance with a second embodiment.

In Step 1120 of the flowchart in FIG. 15, the non-human region determination processing is carried out. A description will be given of the non-human region determination processing by referring to the flowchart shown in FIGS. 20A and 20B. In Step 1300, linear portions of contours are respectively detected with respect to the regions obtained by dividing the original image in Step 1020 of the flowchart in FIG. 15. In Steps 1320 and 1340, the same processing as that of Steps 132 and 134 in the first embodiment is carried out, so that a description thereof will be omitted. If YES is the answer in the determination in Step 1340, in Step 1360 a weighting factor with a negative sign is imparted to a region whose ratio of the linear portion is not less than a predetermined value, and the operation proceeds to Step 1380.

In Steps 1380, 1400, and 1420, the same processing as that of Steps 138, 140, and 142 in the first embodiment is carried out, so that a description thereof will be omitted. If YES is the answer in the determination in Step 1420, in Step 1440 a weighting factor with a negative sign is imparted to a region whose axial symmetry is not more than a predetermined value, and the operation proceeds to Step 1460.

In Steps 1460 and 1480, the same processing as that of Steps 146 and 148 in the first embodiment is carried out, so that a description thereof will be omitted. If YES is the answer in the determination in Step 1480, in Step 1500 a weighting factor with a negative sign is imparted to a region whose ratio of contact with an outer edge of the image is not less than a predetermined value, and the operation proceeds to Step 1520.

In Steps 1520 and 1540, the same processing as that of Steps 152 and 154 in the first embodiment is carried out, so that a description thereof will be omitted. If YES is the answer in the determination in Step 1540, in Step 1560 a weighting factor with a negative sign is imparted to a region whose density contract in the image is not more than a predetermined value, and the operation proceeds to Step 1580.

In Steps 1580 and 1600, the same processing as that of Steps 158 and 160 in the first embodiment is carried out, so that a description thereof will be omitted. If YES is the answer in the determination in Step 1600, in Step 1620 a weighting factor with a negative sign is imparted to a region whose differential values change regularly. This completes the non-human region determination processing ends, and the operation proceeds to Step 1180 in the flowchart shown in FIG. 15.

In Step 1180, an overall determination of the facial region is made. That is, an overall weighting factor is calculated for each portion of the image by using the ranges set as the face candidate regions and positive weighting factors imparted to the respective face candidate regions in Steps 1040 to 1100, respectively, and on the basis of the range of a region and a negative weighting factor imparted thereto if there was a region to which a negative weighting factor was imparted in Step 1120. Specifically, if there were portions to which weighting factors were imparted in the image in the plurality of steps of processing, the range of those portions and an overall weighting factor (obtained by adding or multiplying the weighting factors imparted in the respective steps of processing) are determined, and the image is divided into units of regions having identical weighting factors. Then, the region having the highest overall weighting factor is determined to be the region having the highest probability of being a region corresponding to the facial region of a human figure.

In Step 1200, a determination is made as to whether or not the processing in Steps 1020 to 1180 has been executed a predetermined number of times. If NO is the answer in the determination in Step 1200, in Step 1220, various control parameters are updated to change the relative fineness of the division of the image in Step 1020, or the threshold for binarization in Step 1020 is updated, and the processing in and after Step 1020 is executed again. If Steps 1020 to 1180 are executed the predetermined number of times, YES is given as the answer in the determination in Step 1200, and the operation proceeds to Step 1240.

It should be noted that the reason for repeating the processing by changing the relative fineness of the division of the image as described above is that appropriate sizes of various regions differ when the original image is divided into a plurality of regions owing to the relative size of the area of the region corresponding to the face of a human figure which is present in the original image (the relative area of the region corresponding to one human figure which is present in the original image).

That is, in a case where the area of the region corresponding to the face of a human figure which is present in the original image is large, if the original image is divided finely (such that the size of each region becomes small), the region corresponding to the actual face is divided too finely, and regions corresponding to various portions of the human figure are also divided too finely. As a result, the regions corresponding to the various portions of the human figure are not separately properly as a whole. However, if the original image is divided coarsely (such that the size of each region becomes large), it is possible to obtain a divided region having a high degree of matching with respect to the region corresponding to the face, and the regions corresponding to the various portions of the human figure can be separated properly.

Meanwhile, in a case where the area of the region corresponding to the face of a human figure which is present in the original image is small, if the original is divided coarsely, the region corresponding to the actual face is mixed in or blurred with the region corresponding to the background, so that the regions corresponding to the face and other various portions of the human figure cannot be separated properly. However, if the original image is divided finely, the regions corresponding to the face and other various portions of the human figure can be respectively separated properly. Accordingly, by repeating the processing for extracting the facial region a plurality of times while changing the relative fineness of the division of the image in steps, it is possible to extract the region corresponding to the face of the human figure with a high probability irrespective of the size of the region corresponding to the face of the human figure which is present in the original image.

As for the alteration of parameters for controlling the division of the image, in a case where the division of the original image is carried out by clustering using a unidimensional or two-dimensional histogram, if the step width of the threshold is made coarse (large) at the time of quantizing data during the preparation of the histogram, the result of division of the original image using that histogram also becomes coarse (the size of the divided region becomes large). Meanwhile, if the step width of the threshold is made fine (small), the result of division of the original image using that histogram also becomes fine (the size of the divided region becomes small). Hence, the relative fineness of the division of the image can be altered by using a step width of a threshold during quantization as a parameter for controlling the division of the image, and by varying the step width of that threshold.

In addition, in a case where the division of the original image is effected by using as a boundary of a region those pixels which have a large difference in the density or color difference with neighboring pixels, among the pixels constituting the original image, if the threshold for determining that the density difference or the color difference is large is made large, the result of division of the original image becomes coarse (the size of the divided region becomes large), whereas if the threshold is made small, the result of division of the original image becomes fine (the size of the divided region becomes small). Hence, it is possible to use that threshold as a parameter for controlling the division of the image.

In addition, in the division of the original image, if the resolution of the original image is made coarse irrespective of the manner of its division, the result of division of the original image becomes coarse, whereas if the resolution is made fine, the result of division of the original image becomes fine. Hence, the resolution of the image may be used as a parameter for controlling the division of the image. As an example of a change in the image resolution, in a case where the image resolution is made low, with respect to each block of pixels consisting of m×n pixels, an average density or an average color of the entire pixels constituting each block may be set as a typical value of each block. Incidentally, in the system in which the relative fineness of the division of the image is altered by changing the image resolution as described above, if the image resolution is made low, the number of data subject to processing decreases, so that there if an advantage in that the processing time can be reduced. In addition, a similar effect can be obtained if smoothing processing is carried out instead of the change in the image resolution. In the smoothing processing, the greater the degree of smoothing is made, the more the averaging of the density and color progresses with the neighboring pixels, and the result of division of the original image becomes coarse in the same way as the case in which the resolution is lowered.

In Step 1240, on the basis of the facial regions determined in a predetermined number of times of processing and the weighting factors imparted thereto, a region having the highest probability of being a region corresponding to the facial region of a human figure is finally determined in the same way as in Step 1180 described above. Then, as a result of determination in an ensuing Step 1260, the photometric data on R, G, and B of the finally determined region is outputted to the exposure-amount calculating unit 44, and the facial-region extraction processing ends.

In the above-described facial-region extraction processing, the face candidate region estimated to correspond to the face of a human figure is not judged on the basis of the density or color of that region. Accordingly, even if the color balance of that region should change depending on the type of the negative film 12 as well as photographing conditions such as the type of light source and the use of rear light, the result of the facial-region extraction processing does not change by being affected by them. In addition, the above-described facial-region extraction processing is also applicable to cases where the original image is a monochromatic image. Further, in the above-described facial-region extraction processing, each of the processing for detecting a shape pattern peculiar to each part of a human figure (part of the processing in Steps 1040 to 1100 in the flowchart shown in FIG. 15) is basically comprised of the extraction of various concave portions and convex portions and the determination of the similarity of axial symmetry. Therefore, if software and hardware are provided with common parts by making use of this feature, it is possible to simplify the software and realize a simplified hardware configuration.

Meanwhile, the exposure-amount calculating unit 44 calculates the appropriate exposure amount $E_i$ in accordance with Formula 1 of the first embodiment (see Formula 1 in the first embodiment) by using the photometric data on R, G, and B extracted by the facial-region extracting unit 40 as described above and the image-plane average density $D_i$ (i=one of R, G, and B) of one frame calculated by the average-density calculating unit 42. On the basis of the appropriate exposure amount $E_i$ the driver 46 moves the color compensating filter 18 to a position corresponding to the appropriate exposure amount.

In addition, the density (or color) of each pixel in the region determined to be the facial region in the facial-region extraction processing may be subjected to weighting in correspondence with the weighting factor, so as to obtain a weighted means value. Then, the weighting factor imparted to the region determined to be the facial region may be reflected on the exposure amount $E_i$ by calculating the exposure amount $E_i$ by using the weighted mean value.

Although, in the above, a description has been given by citing the negative film 12 as a medium for recording the original image, it is possible to use as an original image an image recorded on other film, such as a positive film, and various other recording media such as paper. Also, a description has been given by citing color paper as an example of copying material, it is possible to use other materials such as paper.

In addition, in the face-candidate-region setting processing based on the extraction of the head, a convex portion corresponding to the top of the head of a human figure and a concave portion corresponding to a boundary between the head and the face of a human figure are used a shape patterns peculiar to the head of a human figure, the present invention is not limited to the same. For example, in order to extract the head without hair or the head having a low density of the hair, the head may be extracted by using only a convex portion as a shape pattern peculiar to the head, by performing the division into regions by a method other than binarization or by performing the detection of an edge of the image.

Figures 14A, 14B:
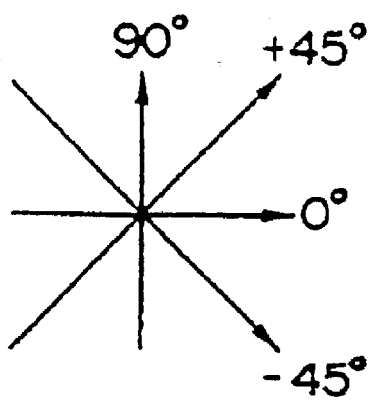
FIG. 14A is a conceptual diagram illustrating an example of differentiating directions in edge detection.
FIG. 14B is a conceptual diagram illustrating an example of differential filters for performing differentiation in the respective directions.

Further, although, in the above-described first and second embodiments, binarization has been cited as an example of the method of dividing the image into a plurality of regions, the present invention is not limited to the same, and the image may be divided by using a histogram as described in Japanese Patent Application Laid-Open No. 346332/1992. In addition, edges of the image may be detected by differentiating density values of the respective pixels of the image along a plurality of mutually different directions (e.g., the left-and-right direction (0°) in the image, the vertical direction (90°), and directions inclined by ±45° with respect to the left-and-right direction, as shown in FIG. 14A). Then, processing may be effected by using a center line of each edge obtained by performing a known thinning process with respect to that edge, instead of the line explained in the foregoing embodiments.

Incidentally, the differentiation along the various directions can be realized by using four kinds of differential filters shown in FIG. 14B, and as for the detection of an edge of the image, a pixel on which the attention is being focused can be regarded as being an edge when the magnitude of the output of the differential filter is greater than a predetermined threshold. In addition, the edge extraction processing may be executed repeatedly while varying in steps the threshold for determining an edge.

In addition, although, in the above, a description has been given of the example in which a pair of eyes is used as a shape pattern representing the internal structure of the face, the present invention is not limited to the same. For instance, a face candidate region may be set by alternatively using a nose, a mouth, a pair of eyebrows, or the like, or comprehensively by combining them.

Further, although, in the above, a description has been given of the example in which pairs of lines corresponding to a contour continuing from the neck to each shoulder of the human figure, and from each shoulder to an arm portion or to a lower portion of the body are detected, the present invention is not limited to the same. For instance, pairs of lines corresponding to the contour from the neck to each shoulder of the human figure and pairs of lines corresponding to the contour from each shoulder of the human figure to an arm portion may be separately detected, respectively.

In the above-described second embodiment, the face-candidate-region setting processing and non-human-region determination processing (Steps 1040 to 1120 in the flowchart of FIG. 15) based on shape patterns peculiar to various portions of a human figure are executed consecutively. Since these steps of processing are not affected by the result of other processing, processing units for effecting the respective steps of processing may be provided separately, and after the division of the image into a plurality of regions or the detection of edges of the image and the extraction of concave portions and convex portions are effected by way of preprocessing, the respective steps of may be carried out in parallel by the processing units. If this arrangement is adopted, the processing time can be reduced substantially.

Although the second embodiment of the present invention has been described above, the above-described second embodiment further includes the following aspects of the embodiment of technical matters.

(6) In a case where a shape pattern representing the contour of the head of a human figure is set as a subject of search, the search of the shape pattern includes: detecting concave portions and convex portions from contours of regions divided according to the eighth aspect of the present invention or from a center line of an edge obtained according to the above-described ninth aspect of the present invention; and determining whether or not at least one concave or convex portion thus detected corresponds to the contour of the head of a human figure, on the basis of characteristic quantities (the degree of a circular curve, position, size, and direction) of the at least one concave or convex portion.

(7) In a case where a shape pattern representing the contour of the face of a human figure is set as a subject of search, the search of the shape pattern includes: detecting concave portions and convex portions from contours of the regions divided according to the above-described eighth aspect of the present invention or from a center line of an edge obtained according to the above-described ninth aspect of the present invention; and determining whether or not at least two concave and/or convex portions thus detected correspond to the contour of the face of a human figure according to the degree of axial symmetry, on the basis of the relationships of characteristic quantities (the degree of a circular curve, position, size, and direction) of the at least two concave and/or convex portions.

(8) In a case where a shape pattern representing a pair of eyes among shape patterns representing the contour of the facial structure of a human figure is set as a subject of search, the search of the shape pattern includes: extracting elliptical regions from among regions divided according to the above-described eighth aspect of the present invention or from among regions divided by a center line of an edge obtained according to the above-described ninth aspect of the present invention; detecting a pair of elliptical regions whose similarity is greater than or equal to a predetermined value, on the basis of matching processing using characteristic quantities (shape, density) of the detected plurality of elliptical regions; and determining whether or not the pair of elliptical regions corresponds to a pair of eyes of the face of a human figure, according to the degree of axial symmetry of the detected pair of elliptical regions.

(9) In a case where a shape pattern representing the contour of the body of a human figure is set as a subject of search, the search of the shape pattern includes: detecting concave portions and convex portions from contours of regions divided according to the above-described eighth aspect of the present invention or from a center line of an edge obtained according to the above-described ninth aspect of the present invention; detecting a plurality of sets of concave or convex portions corresponding to a contour continuing from the neck to each shoulder of the human figure and a contour from each shoulder to an arm portion or to a lower portion of the body, on the basis of the relationships of characteristic quantities (the degree of a circular curve, position, size, and direction) of at least two concave and/or convex portions; and determining whether or not the sets of concave or convex portions thus detected correspond to the contour of the body of a human figure according to the degree of axial symmetry of the sets.

(10) Of the regions divided according to the above-described eighth aspect of the present invention or the regions divided by a center line of an edge obtained according to the above-described ninth aspect of the present invention, the following regions are excluded as regions having a low probability of corresponding to the face of a human figure in an original image: a region in which the ratio of a linear portion occupied in the contour of the region is greater than or equal to a predetermined value; a region whose axial symmetry is less than or equal to a predetermined value; a region in which the number of concave and/or convex portions is greater than or equal to a predetermined value; a region whose ratio of contact with an outer edge of the image is greater than or equal to a predetermined value; a region whose contrast in the density within the region is less than or equal to a predetermined value; and a region whose density changes with a predetermined pattern or whose density shows a repetition of a predetermined pattern of change.

Hereafter, a description will be given of a third embodiment of the present invention. It should be noted that since the third embodiment has a configuration similar to that of the second embodiment, so that identical portions will be denoted by the same reference numerals, and a description thereof will be omitted. Hereafter, a description will be given of the operation of the third embodiment.

In the third embodiment, the states of a figure representing a person in an image (corresponding to a figure subject to extraction in the 11th aspect of the present invention) are classified in advance into a plurality of states. Incidentally, as the states of the human figure, it is possible to cite, among others, the following: the size (or area) of the figure in the image; the direction of the figure in the image plane (the direction in which the longitudinal direction of the human figure is oriented in the image plane); and the angle of a person as the subject with respect to the visual line during photographing (which direction along the horizontal direction of the person the person is facing—according to this direction, the orientation of the face of the human figure changes among the frontal, angled, and lateral directions).

In a case where the states of the human figure are classified according to the size L or area S of the human figure in the image, the states can be classified according to whether the size L of the human figure in the image is large (between L1 and L2), medium (between L2 and L3), and small (between L3 and L4), or whether the area S of the human figure in the image is large (between S1 and S2), medium (between S2 and S3), and small (between S3 and S4). In addition, in a case where the states are classified according to the direction of the human figure in the image, the states can be classified in the aforementioned units of 90° or 45° in terms of the inclination. Further, in a case where the states are classified according to the angle with respect to the visual line during the photographing of the person represented by the figure, the states can be classified according to whether the angle is frontal or angled. Still further, the states may be classified by combining the size and the direction of the human figure and the angle of the person represented by the figure with respect to the visual line during photographing. Consequently, the states of the figure representing the person in the image can be classified into a plurality of states.

In addition, in this third embodiment, with respect to each of shape patterns (corresponding to partial shape patterns in the 11th aspect of the present invention) constituting a figure representing a person, such as the contour of the head of the human figure, the contour of the face, the internal structure of the face, and the contour of the body, a plurality of search parameters defining search conditions for searching each shape pattern are provided in correspondence with the plurality of classified states.

For example, in the case where the states of the human figure in the image are classified according to the size or area of the figure, as search parameters which are varied according to the size or area, it is possible to cite the image resolution (or the relative fineness of the division of the image), the length of vectors (the length of the vectors P1P0 and P0P2 shown in FIG. 8C) for calculating the curvature of the contour of a black region when searching a shape pattern representing the contour of the head, an allowable range of the length of the contour to be searched as the contour of the head, the contour of the face, and the contour of the body, and an allowable range of the distance between a pair of candidates used for calculation when calculating the similarity of axial symmetry.

As for the image resolution, as also described above, it suffices to increase the resolution if the size or area of the figure representing a person is small, and to decrease (coarsen) the resolution if the size or area is large. In addition, as for the length of a vector, it suffices to shorten the vector if the size or area is small, and to lengthen the vector if the size or area is large. Also, as for the allowable length of the length of the contour and the allowable range of the distance between a pair of candidates used for calculating the similarity of axial symmetry, it suffices to shorten these ranges if the size or area is small, and to lengthen them if the size or area is large.

In addition, in the case where the states of the figure representing a person in the image are classified according to the direction of the figure, as search parameters which are varied according to the direction, it is possible to cite, among others, the direction of the axis of symmetry when searching a shape pattern representing a facial contour (see FIG. 10D), the direction of the axis of symmetry when searching a shape pattern representing a pair of eyes as the internal structure of the face (see FIG. 12B), and the direction of the axis of symmetry when searching a shape pattern representing the contour of the body (see FIG. 13C). By varying the aforementioned parameters according to the above-described direction, the number of combinations of pairs of candidates used for calculating the similarity of axial symmetry can be narrowed down.

In addition, in the case where the states of the figure representing a person in the image are classified according to the angle of a person represented by the figure with respect to the visual line during photographing, as search parameters which are varied according to the angle, it is possible to cite, among others, the distance between candidates for eyes when searching a shape pattern representing the pair of eyes (see FIG. 12B) and the like.

Figure 25:
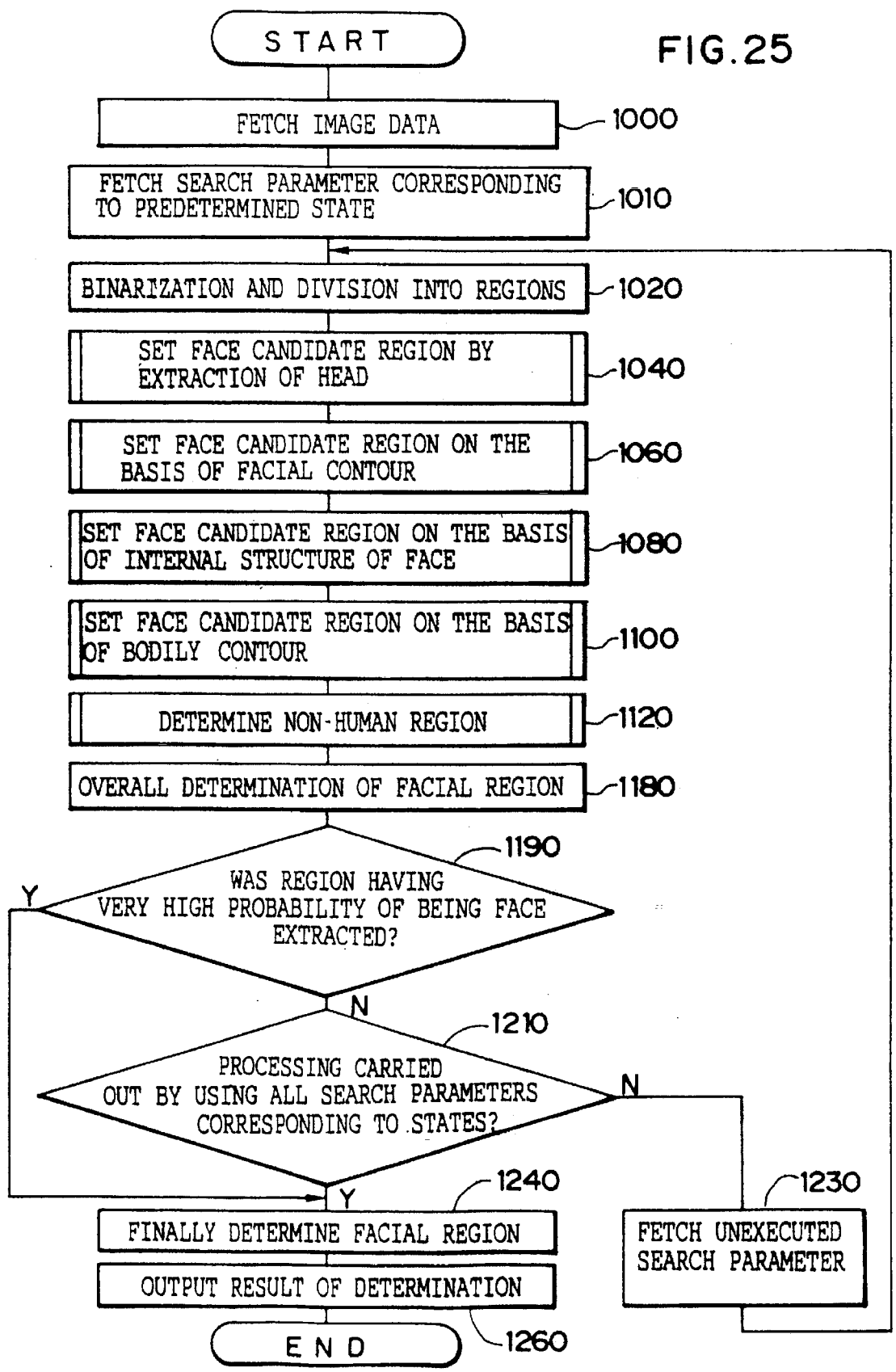
FIG. 25 is a flowchart illustrating the facial-region extraction processing in accordance with a third embodiment.

Referring now to the flowchart shown in FIG. 25, only those portions which differ from the flowchart shown in FIG. 15 will be described concerning the facial-region extraction processing in accordance with the third embodiment.

In the third embodiment, after image data is fetched in Step 1000, search parameters corresponding to a predetermined state among the plurality of classified states is fetched in Step 1010. Incidentally, this predetermined state is set to be a state having the highest frequency of appearance in the images recorded in the negative films 12 (e.g., the size of the human figure: medium, the direction of the figure: the direction in which the longitudinal direction of the human figure coincides with the longitudinal direction of the image, the angle of the person represented by the figure with respect to the visual line during photographing: front) among the plurality of classified states.

In ensuing Steps 1020 to 1120, the setting of a face candidate region is set on the basis of the search parameters fetched in Step 1010 in the same way as in the second embodiment. Since, as described above, the search parameters used in the processing in Steps 1020 to 1120 are search parameters corresponding to a predetermined state among the plurality of states already classified, the range of shape patterns subject to search are narrowed down. Hence, as compared with the second embodiment, the processing is completed in a short time. In Step 1180, a determination is made of a region having a high probability of being a region corresponding to the facial region of a human figure in the same way as in the second embodiment. Incidentally, the processing in Step 1180 corresponds to the determination of a candidate region having a high probability that the face of a human figure as a particular portion of a figure subject to extraction is present, by determining the consistency for each candidate region, as described in the 11th aspect of the present invention.

In an ensuing Step 1190, on the basis of the above-described processing, a determination is made of whether or not a region having a very high probability of being a region corresponding to the face of a human figure. This determination can be made on the basis of whether or not there has been a face candidate region whose the overall weighting factor (consistency in the 11th aspect of the present invention) calculated by the overall determination of the facial region in Step 1180 is greater than or equal to a predetermined value. If YES is the answer in that determination, the operation proceeds to Step 1240 in which that region is determined to be a facial region having a very high probability of being a region corresponding to the face of the extracted human figure. Hence, the result of determination is outputted in Step 1260, and the processing ends.

Meanwhile, if NO is the answer in the determination in Step 1190, the operation proceeds to Step 1210, and a determination is made as to whether or not processing has been effected by using all the search parameters corresponding to the respective states. If NO is the answer in that determination, the operation proceeds to Step 1230 to fetch a parameter which has not been executed and corresponds to a state of a high frequency of appearance. Then, the operation returns to Step 1020. Consequently, the processing in and after Step 1020 is repeated according to the newly fetched search parameter.

Thus, since the processing is repeated by consecutively using parameters corresponding to states of a high frequency of appearance, NO is given as the answer in the determination in Step 1910 before YES is given as the answer in the determination in Step 1210. Namely, there is a high possibility that a region having a very high probability of being a region corresponding to the face of the human figure is extracted before all the search parameters corresponding to the respective classified states are used. Hence, the average processing time in the facial-region extraction processing can be reduced. Then, if YES is given as the answer in the determination in Step 1190 or 1210, an overall determination of the facial region is made in Step 1240 in the same way as in the second embodiment. Then, the result of determination is outputted in Step 1260, and the processing ends.

In the above-described embodiment, the distance between eye-candidate regions is used as an example of a search parameter which is varied according to the angle of the person with respect to the visual line during photographing. However, in a case where regions estimated to correspond to a pair of eyes are searched with respect to a face candidate region set in advance, and the consistency as the face of the human figure is determined, as search parameters which are varied according to the aforementioned angle, it is possible to use the offset of the position of the eye-candidate regions or the position of the axis of symmetry in the face candidate region, a ratio of the distance between the pair of eye-candidate regions to the width of the face candidate region, and the like, and the allowable range of each of the search parameters may be varied according to the aforementioned angle.

In addition, although, in the above, processing is effected by consecutively using a plurality of kinds of search parameters, the present invention is not limited to the same. For example, an arrangement may be provided such that the facial-region extracting unit 40 is provided with a plurality of processing units for effecting the processing in Steps 1020 to 1180 in the flowchart shown in FIG. 25 (see FIG. 26), and the processing is effected in parallel by the respective processing units by using respective ones of the plurality of kinds of search parameters corresponding to the respective states. In the example shown in FIG. 26, the states of a figure representing a person are classified into n states ranging from a state 1 to a state n, and n processing units $60_1$ to $60_n$ are provided correspondingly, and the overall determination of a facial region in Step 1240 and the outputting of the result of determination in Step 1260 in the flowchart shown in FIG. 25 are effected by a facial-region overall determining unit 62. If the above-described arrangement is provided, the processing by the processing units $60_1$ to $60_n$ is completed in a very short time, so that the processing time in the facial-region extraction processing can be reduced substantially irrespective of the state of the figure representing a person in the image.

Furthermore, although, in the above, a description has been given of the example in which a region corresponding to the face of a human figure is extracted as a particular portion of a figure subject to extraction, the present invention is not limited to the same. For example, the overall figure subject to extraction (the overall region corresponding to the human figure in the above example) may be extracted.

Figure 20A:
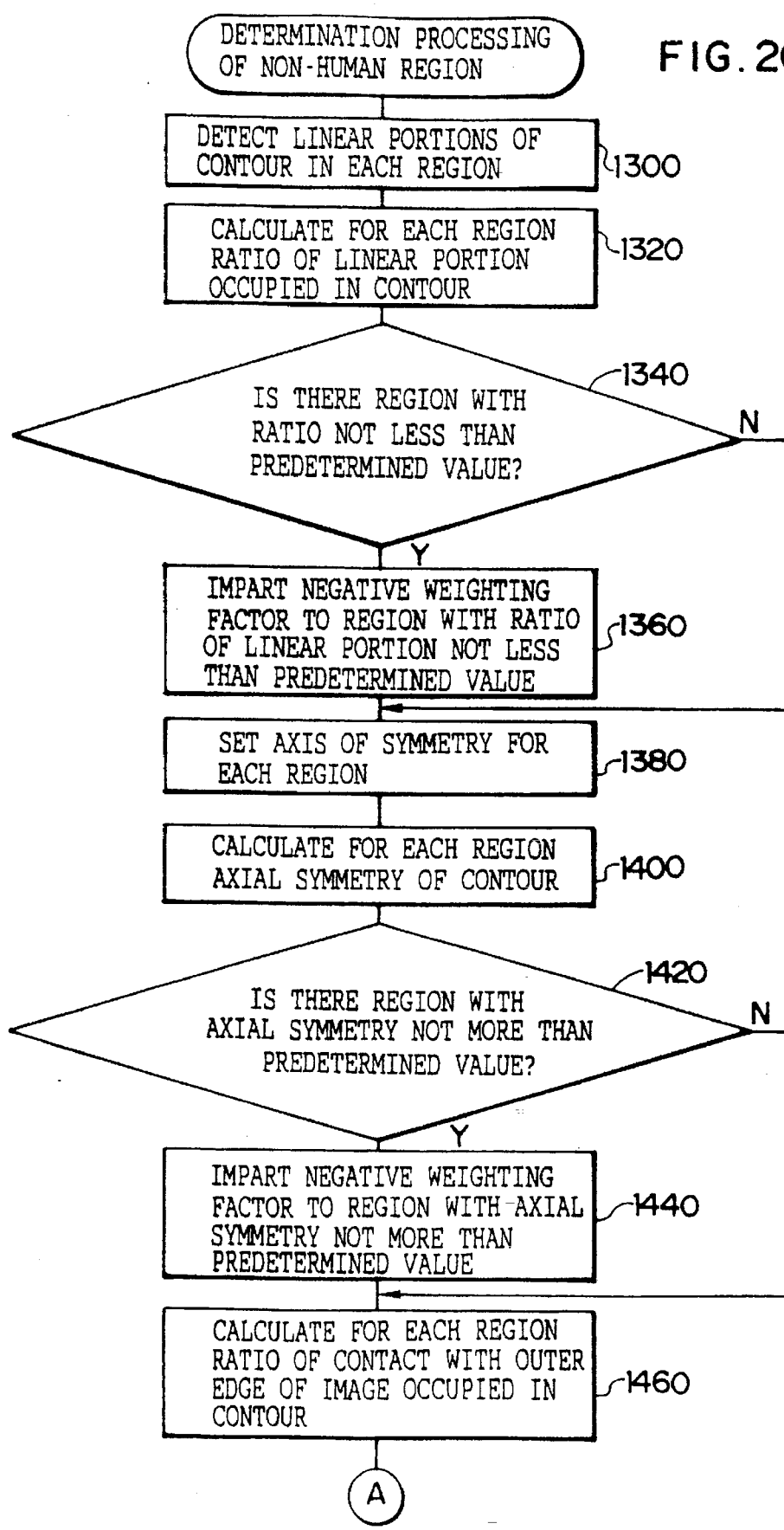
FIGS. 20A and 20B are flowcharts illustrating the non-human region determination processing in accordance with the second embodiment.
Figure 20B:
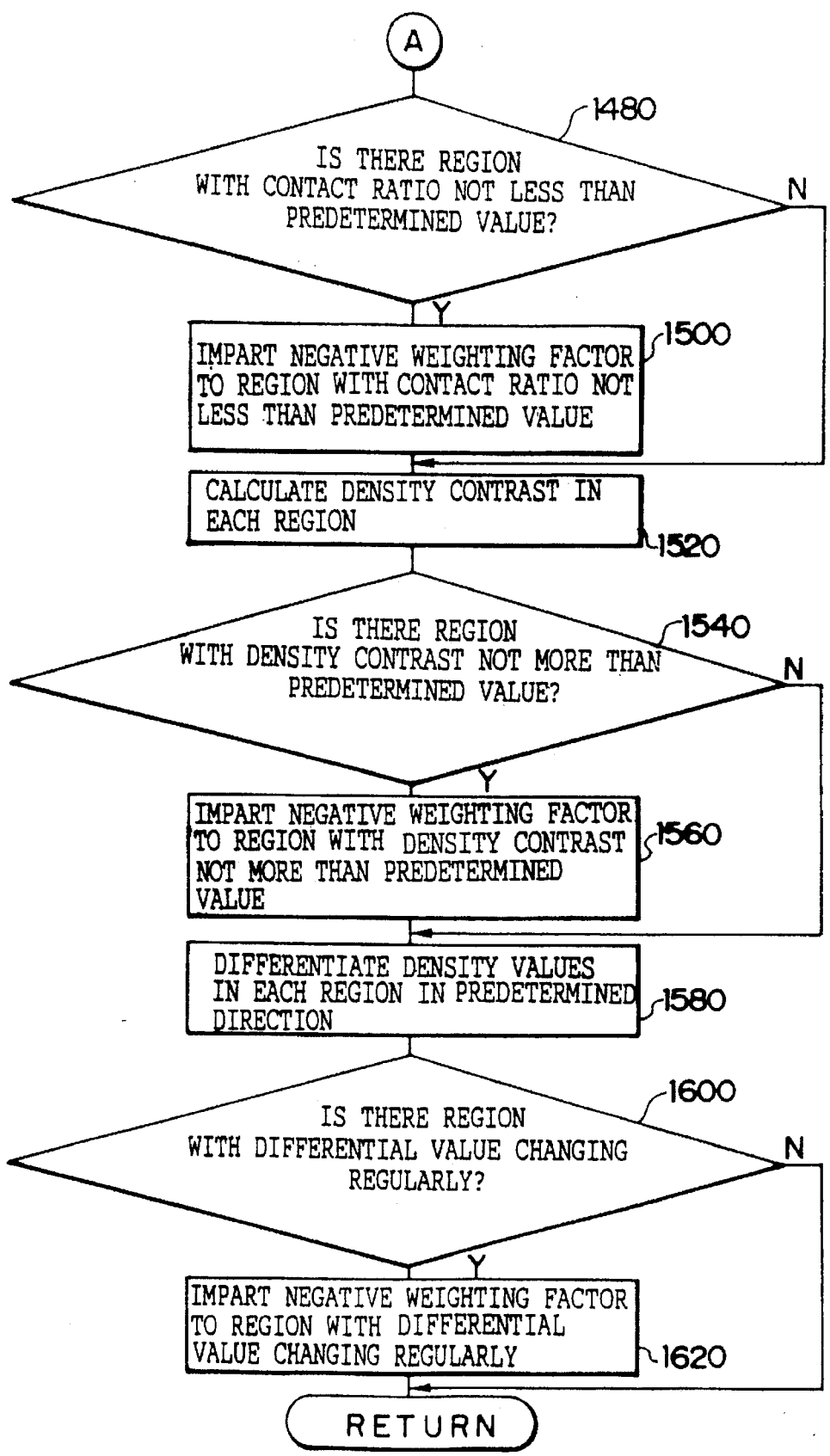

In addition, although, in the above, a figure representing a person is used as a figure subject to extraction, the present invention is not limited to the same. For example, a figure representing an artificial object may be used as the figure subject to extraction. Shapes and the like of artificial objects which are present in images recorded on photographic films are generally unknown, but it is experientially known that partial shapes of figures representing artificial objects are in many cases composed of straight lines, circular arcs having fixed curvatures, and so on, as described in reference to the non-human region determination processing (FIGS. 20A and 20B). For this reason, if their patterns are used as partial shape patterns, it is possible to extract the figure representing an artificial object as a figure subject to extraction. Then, when an image recorded on a photographic film is printed onto a copying material, an exposure amount for the copying material can be determined such that a small weight is imparted to a region determined to have a high probability that a figure representing an artificial object is present.

Furthermore, images subject to the extraction of figures by the application of the present invention are not limited to images recorded on photographic films. For example, in the mass production of parts, products, and the like, a situation in which the manufactured parts, products, and the like are being consecutively conveyed may be imaged, an image representing the situation of conveyance may be extracted from image signals at a predetermined timing, and a figure representing each of the parts, products, and the like as a figure subject to extraction may be extracted from the extracted image. In this case, since the configurations of parts, products, and the like are known in advance, the patterns of the shapes of the parts, products, and the like can be set easily. In addition, regions in which figures subject to extraction in accordance with the present invention are present may be used for, for instance, automatically inspecting the manufactured parts, products, and the like.

What is claimed is:

1. A method of determining an exposure amount, comprising the steps of:

searching a first shape pattern which is present in an original image and is peculiar to a first portion of a human figure;

setting a region estimated to correspond to a face of the human figure, in accordance with a size and a direction of the searched first shape pattern and a positional relationship between the face of the human figure and the first portion;

determining a region having a high probability of being a region corresponding to the face of the human figure in the original image, by searching whether or not a second shape pattern peculiar to at least one second portion different from the first portion of the human figure is present in a range of search set in accordance with the set size and direction of the first shape pattern in the original image and a positional relationship between the face of the human figure and the second portion; and determining an exposure amount for printing the original image onto a printing material on the basis of at least one of a color and a density of the determined region.

2. A method of determining an exposure amount according to claim 1, wherein the first shape pattern and the second shape pattern include at least one of a shape pattern representing a contour of the head of the human figure, a shape pattern representing a contour of the face of the human figure, a shape pattern representing an internal structure of the face of the human figure, and a shape pattern representing a contour of the body of the human figure.

3. A method of determining an exposure amount according to claim 1, wherein the search of the first shape pattern and the second shape pattern is effected by dividing the original image into a plurality of regions each consisting of a plurality of pixels whose densities or colors are identical or similar, and by using contours of the plurality of regions.

4. A method of determining an exposure amount according to claim 1, wherein the search of the first shape pattern and the second shape pattern is effected by detecting an edge which is present in the original image, by determining a center line of the detected edge, and by using the determined center line.

5. A method of determining an exposure amount according to claim 1, wherein, prior to the search of the first shape pattern, a region having a low probability of corresponding to the human figure in the original image is excluded from a subject of search of the first shape pattern.

6. A method of determining an exposure amount according to claim 2, wherein the search of the shape pattern representing the contour of the head of the human figure as the first shape pattern or the second shape pattern is effected by: dividing the original image into a plurality of regions each consisting of a plurality of pixels whose densities or colors are identical or similar; detecting at least one concave or convex portion on the basis of contours of the plurality of regions; determining whether or not the at least one concave or convex portion detected corresponds to the contour of the head of the human figure, on the basis of characteristic quantities of the at least one concave or convex portion.

7. A method of determining an exposure amount according to claim 2, wherein the search of the shape pattern representing the contour of the head of the human figure as the first shape pattern or the second shape pattern is effected by: detecting an edge which is present in the original image; determining a center line of the detected edge; detecting at least one concave or convex portion on the basis of the determined center line; and determining whether or not the at least one concave or convex portion detected corresponds to the contour of the head of the human figure, on the basis of characteristic quantities of the at least one concave or convex portion.

8. A method of determining an exposure amount according to claim 2, wherein the search of the shape pattern representing the contour of the face of the human figure as the first shape pattern or the second shape pattern is effected by: dividing the original image into a plurality of regions each consisting of a plurality of pixels whose densities or colors are identical or similar; detecting at least two concave and/or convex portions on the basis of contours of the plurality of regions; and determining whether or not the at least two concave and/or convex portions detected correspond to the contour of the face of the human figure according to a degree of axial symmetry, on the basis of relationships of characteristic quantities of the at least two concave and/or convex portions.

9. A method of determining an exposure amount according to claim 2, wherein the search of the shape pattern representing the contour of the face of the human figure as the first shape pattern or the second shape pattern is effected by: detecting an edge which is present in the original image; determining a center line of the detected edge; detecting at least two concave and/or convex portions on the basis of the determined center line; and determining whether or not the at least two concave and/or convex portions detected corresponds to the contour of the face of the human figure according to a degree of axial symmetry, on the basis of characteristic quantities of the at least two concave and/or convex portions.

10. A method of determining an exposure amount according to claim 2, wherein the search of a shape pattern representing a pair of eyes among shape patterns representing the contour of the internal structure of the human figure as the first shape pattern or the second shape pattern is effected by: dividing the original image into a plurality of regions each consisting of a plurality of pixels whose densities or colors are identical or similar; extracting a plurality of elliptical regions from among regions divided by contours of the plurality of regions; detecting a pair of elliptical regions whose similarity is greater than or equal to a predetermined value, on the basis of matching processing using characteristic quantities of the detected plurality of elliptical regions; and determining whether or not the pair of elliptical regions corresponds to the pair of eyes of the face of the human figure, according to the degree of axial symmetry of the detected pair of elliptical regions.

11. A method of determining an exposure amount according to claim 2, wherein the search of a shape pattern representing a pair of eyes among shape patterns representing the contour of the internal structure of the human figure as the first shape pattern or the second shape pattern is effected by: detecting an edge which is present in the original image; determining a center line of the detected edge; extracting a plurality of elliptical regions from among regions divided by the determined center line; detecting a pair of elliptical regions whose similarity is greater than or equal to a predetermined value, on the basis of matching processing using characteristic quantities of the detected plurality of elliptical regions; and determining whether or not the pair of elliptical regions corresponds to the pair of eyes of the face of the human figure, according to the degree of axial symmetry of the detected pair of elliptical regions.

12. A method of determining an exposure amount according to claim 2, wherein the search of the shape pattern representing the contour of the body of the human figure as the first shape pattern or the second shape pattern is effected by: dividing the original image into a plurality of regions each consisting of a plurality of pixels whose densities or colors are identical or similar; detecting at least two concave and/or convex portions on the basis of contours of the plurality of regions; detecting a plurality of sets of concave and/or convex portions corresponding to a contour continuing from the neck to each shoulder of the human figure, and a contour from each shoulder to an arm portion or to a lower portion of the body, on the basis of relationships of characteristic quantities of the at least two concave and/or convex portions; and determining whether the at least two concave and/or convex portions detected corresponds to the contour of the body of the human figure according to a degree of axial symmetry of the sets.

13. A method of determining an exposure amount according to claim 2, wherein the search of the shape pattern representing the contour of the body of the human figure as the first shape pattern or the second shape pattern is effected by: detecting an edge which is present in the original image; determining a center line of the detected edge; detecting at least two concave and/or convex portions on the basis of the determined center line; detecting a plurality of sets of concave and/or convex portions corresponding to a contour continuing from the neck to each shoulder of the human figure, and a contour from each shoulder to an arm portion or to a lower portion of the body, on the basis of relationships of characteristic quantities of the at least two concave and/or convex portions; and determining whether the at least two concave and/or convex portions detected corresponds to the contour of the body of the human figure according to a degree of axial symmetry of the sets.

14. A method of determining an exposure amount according to claim 5, wherein, among regions obtained by dividing the original image into a plurality of regions each consisting of a plurality of pixels whose densities or colors are identical or similar, the following regions are excluded as regions having a low probability of corresponding to the human figure in the original image: a region in which the ratio of a linear portion occupied in the contour of the region is greater than or equal to a predetermined value; a region whose axial symmetry is less than or equal to a predetermined value; a region in which the number of concave and/or convex portions is greater than or equal to a predetermined value; a region whose ratio of contact with an outer edge of the image is greater than or equal to a predetermined value; a region whose contrast in the density within the region is less than or equal to a predetermined value; and a region whose density changes with a predetermined pattern or whose density shows a repetition of a predetermined pattern of change.

15. A method of determining an exposure amount according to claim 5, wherein, among regions obtained by detecting an edge which is present in the original image, by determining a center line of the detected edge, and by being divided by the determined center line of the edge, the following regions are excluded as regions having a low probability of corresponding to the human figure in the original image: a region in which the ratio of a linear portion occupied in the contour of the region is greater than or equal to a predetermined value; a region whose axial symmetry is less than or equal to a predetermined value; a region in which the number of concave and/or convex portions is greater than or equal to a predetermined value; a region whose ratio of contact with an outer edge of the image is greater than or equal to a predetermined value; a region whose contrast in the density within the region is less than or equal to a predetermined value; and a region whose density changes with a predetermined pattern or whose density shows a repetition of a predetermined pattern of change.

16. A method of determining an exposure amount, comprising the steps of:

searching a plurality of kinds of shape patterns which are present in an original image and are peculiar to particular portions of a human figure;

setting a plurality of regions estimated to correspond to a face of the human figure, in accordance with a size and a direction of each of the searched shape patterns and a positional relationship between the face of the human figure and each of the particular portions;

weighting the set regions by using as subjects of search the plurality of shape patterns peculiar to the particular portions of the human figure;

determining a region having a highest probability of being a region corresponding to the face of the human figure in the original image, on the basis of ranges of the plurality of regions set as regions to be estimated to correspond to the face of the human figure and weighting factors imparted to the respective regions; and determining an exposure amount for printing the original image onto a printing material on the basis of at least one of a color and a density of the determined region.

17. A method of determining an exposure amount according to claim 16, wherein the shape patterns peculiar to the particular portions of the human figure include a shape pattern representing a contour of the head of the human figure, a shape pattern representing a contour of the face of the human figure, a shape pattern representing an internal structure of the face of the human figure, and a shape pattern representing a contour of the body of the human figure.

18. A method of determining an exposure amount according to claim 16, wherein the search of each of the shape patterns is effected by dividing the original image into a plurality of regions each consisting of a plurality of pixels whose densities or colors are identical or similar, and by using contours of the plurality of regions.

19. A method of determining an exposure amount according to claim 16, wherein the search of each of the shape patterns is effected by detecting an edge which is present in the original image, by determining a center line of the detected edge, and by using the determined center line.

20. A method of determining an exposure amount according to claim 16, wherein a weighting factor with a positive sign is imparted to the set region estimated to correspond to the face of the human figure, a region having a low probability of corresponding to the face of the human figure in the original image is determined, and a weighting factor with a negative sign is imparted to the determined region.

21. A method of determining an exposure amount according to claim 17, wherein the search of the shape pattern representing the contour of the head of the human figure as the shape pattern is effected by: dividing the original image into a plurality of regions each consisting of a plurality of pixels whose densities or colors are identical or similar; detecting at least one concave or convex portion on the basis of contours of the plurality of regions; determining whether or not the at least one concave or convex portion detected corresponds to the contour of the head of the human figure, on the basis of characteristic quantities of the at least one concave or convex portion.

22. A method of determining an exposure amount according to claim 17, wherein the search of the shape pattern representing the contour of the head of the human figure is effected by: detecting an edge which is present in the original image; determining a center line of the detected edge; detecting at least one concave or convex portion on the basis of the determined center line; and determining whether or not the at least one concave or convex portion detected corresponds to the contour of the head of the human figure, on the basis of characteristic quantities of the at least one concave or convex portion.

23. A method of determining an exposure amount according to claim 17, wherein the search of the shape pattern representing the contour of the face of the human figure is effected by: dividing the original image into a plurality of regions each consisting of a plurality of pixels whose densities or colors are identical or similar; detecting at least two concave and/or convex portions on the basis of contours of the plurality of regions; and determining whether or not the at least two concave and/or convex portions detected correspond to the contour of the face of the human figure according to a degree of axial symmetry, on the basis of relationships of characteristic quantities of the at least two concave and/or convex portions.

24. A method of determining an exposure amount according to claim 17, wherein the search of the shape pattern representing the contour of the face of the human figure is effected by: detecting an edge which is present in the original image; determining a center line of the detected edge; detecting at least two concave and/or convex portions on the basis of the determined center line; and determining whether or not the at least two concave and/or convex portions detected corresponds to the contour of the face of the human figure according to a degree of axial symmetry, on the basis of characteristic quantities of the at least two concave and/or convex portions.

25. A method of determining an exposure amount according to claim 17, wherein the search of a shape pattern representing a pair of eyes among shape patterns representing the contour of the internal structure of the human figure is effected by: dividing the original image into a plurality of regions each consisting of a plurality of pixels whose densities or colors are identical or similar; extracting a plurality of elliptical regions from among regions divided by contours of the plurality of regions; detecting a pair of elliptical regions whose similarity is greater than or equal to a predetermined value, on the basis of matching processing using characteristic quantities of the detected plurality of elliptical regions; and determining whether or not the pair of elliptical regions corresponds to the pair of eyes of the face of the human figure, according to the degree of axial symmetry of the detected pair of elliptical regions.

26. A method of determining an exposure amount according to claim 17, wherein the search of a shape pattern representing a pair of eyes among shape patterns representing the contour of the internal structure of the human figure is effected by: detecting an edge which is present in the original image; determining a center line of the detected edge; extracting a plurality of elliptical regions from among regions divided by the determined center line; detecting a pair of elliptical regions whose similarity is greater than or equal to a predetermined value, on the basis of matching processing using characteristic quantities of the detected plurality of elliptical regions; and determining whether or not the pair of elliptical regions corresponds to the pair of eyes of the face of the human figure, according to the degree of axial symmetry of the detected pair of elliptical regions.

27. A method of determining an exposure amount according to claim 17, wherein the search of the shape pattern representing the contour of the body of the human figure is effected by: dividing the original image into a plurality of regions each consisting of a plurality of pixels whose densities or colors are identical or similar; detecting at least two concave and/or convex portions on the basis of contours of the plurality of regions; detecting a plurality of sets of concave and/or convex portions corresponding to a contour continuing from the neck to each shoulder of the human figure, and a contour from each shoulder to an arm portion or to a lower portion of the body, on the basis of relationships of characteristic quantities of the at least two concave and/or convex portions; and determining whether the at least two concave and/or convex portions detected corresponds to the contour of the body of the human figure according to a degree of axial symmetry of the sets.

28. A method of determining an exposure amount according to claim 17, wherein the search of the shape pattern representing the contour of the body of the human figure is effected by: detecting an edge which is present in the original image; determining a center line of the detected edge; detecting at least two concave and/or convex portions on the basis of the determined center line; detecting a plurality of sets of concave and/or convex portions corresponding to a contour continuing from the neck to each shoulder of the human figure, and a contour from each shoulder to an arm portion or to a lower portion of the body, on the basis of relationships of characteristic quantities of the at least two concave and/or convex portions; and determining whether the at least two concave and/or convex portions detected corresponds to the contour of the body of the human figure according to a degree of axial symmetry of the sets.

29. A method of extracting a figure, comprising the steps of:

setting in advance a plurality of partial shape patterns on the basis of a plurality of characteristic partial shapes constituting a figure subject to extraction;

effecting for each of the plurality of partial shape patterns the searching of the partial shape pattern which is present in an image and the setting of a candidate region in which a particular portion or the whole of the figure subject to extraction is estimated to be present in the image, in accordance with a size and a direction of the searched partial shape pattern and a position of the partial shape represented by the partial shape pattern in the figure subject to extraction;

determining for each of the set candidate regions the consistency as a region in which the particular portion or the whole of the figure subject to extraction is present, on the basis of a relationship with each of the detected partial shape patterns;

determining a candidate region having a high probability of the particular portion or the whole of the figure subject to extraction being present, on the basis of the consistency determined for each of the candidate regions; and extracting the candidate region determined to have the high probability of the particular portion or the whole of the figure subject to extraction being present.

30. A method of extracting a figure according to claim 29, wherein states of the figure subject to extraction in the image are classified in advance into a plurality of states;

a plurality of kinds of parameters are set in advance for each of the plurality of partial shape patterns in correspondence with respective ones of the plurality of classified states as parameters defining search conditions at the time of searching the partial shape patterns;

by using each of the plurality of kinds of parameters corresponding to the plurality of states, processing is effected for performing the search of a partial shape pattern and the setting of a candidate region for each of the plurality of partial shape patterns, for determining consistency for each of the set candidate regions, and for determining and extracting a candidate region having a high probability of the particular portion or the whole of the figure subject to extraction being present; or if it is determined that there is no candidate region having the high probability of the particular portion or the whole of the figure subject to extraction being present as a result of effecting the processing by using a parameter corresponding to a predetermined one of the plurality of states, the processing is repeated by using another one of the parameters corresponding to a state different from the predetermined state, and if is determined that there is a candidate region having the high probability of the particular portion or the whole of the figure subject to extraction being present, the processing ends.

31. A method of extracting a figure according to claim 30, wherein the states of the figure subject to extraction in the image include at least one of the size of the figure subject to extraction in the image, the direction of the figure subject to extraction in the image, and the direction of an object represented by the figure subject to extraction.

* * * * *